United States Patent
Oka

(10) Patent No.: US 10,803,609 B2
(45) Date of Patent: Oct. 13, 2020

(54) IMAGE DISTANCE CALCULATOR AND COMPUTER-READABLE, NON-TRANSITORY STORAGE MEDIUM STORING IMAGE DISTANCE CALCULATION PROGRAM

(71) Applicant: The Public University Corporation, The University of Aizu, Aizuwakamatsu-shi (JP)

(72) Inventor: Ryuichi Oka, Aizuwakamatsu (JP)

(73) Assignee: THE PUBLIC UNIVERSITY CORPORATION, THE UNIVERSITY AIZU, Aizuwakamatsu-Shi (JP)

( * ) Notice: Subject to any disclaimer, the term of this patent is extended or adjusted under 35 U.S.C. 154(b) by 0 days.

(21) Appl. No.: 15/752,892

(22) PCT Filed: Aug. 28, 2017

(86) PCT No.: PCT/JP2017/030813
§ 371 (c)(1),
(2) Date: Feb. 15, 2018

(87) PCT Pub. No.: WO2018/043437
PCT Pub. Date: Mar. 8, 2018

(65) Prior Publication Data
US 2020/0250846 A1     Aug. 6, 2020

(30) Foreign Application Priority Data

Sep. 1, 2016  (JP) ................... 2016-170795
Aug. 21, 2017  (JP) ................... 2017-158781

(51) Int. Cl.
G06K 9/00      (2006.01)
G06T 7/579     (2017.01)
(Continued)

(52) U.S. Cl.
CPC .............. *G06T 7/579* (2017.01); *G01C 3/085* (2013.01); *G06T 7/11* (2017.01); *G06T 7/90* (2017.01);
(Continued)

(58) Field of Classification Search
CPC combination set(s) only.
See application file for complete search history.

(56) References Cited

U.S. PATENT DOCUMENTS

2006/0115116 A1   6/2006  Iwasaki et al.
2013/0294655 A1  11/2013  Lim et al.
(Continued)

FOREIGN PATENT DOCUMENTS

JP   2007-293720   11/2007
JP   2008-103839    5/2008
(Continued)

OTHER PUBLICATIONS

International Search Report for corresponding International Application No. PCT/JP2017/030813, dated Nov. 21, 2017.
(Continued)

*Primary Examiner* — Alex Kok S Liew
(74) *Attorney, Agent, or Firm* — Mori & Ward, LLP

(57) ABSTRACT

In an image distance calculator (100), a CPU (104) extracts a frame image from moving images of an object captured by a camera, generates a slice image on the basis of a temporal change in a pixel line on a y-axis at a point x0 in the frame image, calculates a spotting point on the basis of correspondences between pixels in the slice image and pixels in the frame image, obtains pixels in the frame image corresponding to pixels in the slice image by a back-trace process, segments the frame image and slice image into regions, determines a corresponding region corresponding to a segmented region of the slice image, calculates a ratio value
(Continued)

from an average q of the numbers of pixels in the corresponding region in the frame image and an average p of the numbers of pixels in the segmented region of the slice image, and calculates the distance z from the camera to the object for each corresponding region using a predetermined distance function.

17 Claims, 28 Drawing Sheets

(51) Int. Cl.
    *G01C 3/08*    (2006.01)
    *G06T 7/90*    (2017.01)
    *G06T 7/11*    (2017.01)

(52) U.S. Cl.
    CPC ............... *G06T 2207/10024* (2013.01); *G06T 2207/10028* (2013.01)

(56) References Cited

U.S. PATENT DOCUMENTS

2016/0125617 A1* 5/2016 Yamaguchi ............... G06T 7/74 382/154
2017/0263054 A1* 9/2017 Yamasaki ............. G06T 19/006
2018/0012411 A1* 1/2018 Richey ................. G06T 19/006

FOREIGN PATENT DOCUMENTS

| JP | 2008-309519 | 12/2008 |
| JP | 2009-139995 | 6/2009 |
| JP | 2010-165104 | 7/2010 |
| WO | WO 2005/020152 | 3/2005 |

OTHER PUBLICATIONS

Bolles et al., "Epipolar-Plane Image Analysis: An approach to Determining Structure from Motion", International Journal of Computer Vision, 1987, Issue 1, pp. 7-55.

Oka et al., "General Scheme of Continuous Dynamic Programming—Optimal Full Pixel Matching for Spotting Image-", IEICE Technical Report, The Institute of Electronics, Information and Communication Engineers, Sep. 2010, PRMU2010-87, IBISML2010-59, pp. 245-252, English abstract included.

Torii et al., "Spotting Recognition of Motions From a Video Captured by a Moving Camera", IEICE Technical Report, Jun. 3, 2013, vol. 113, No. 75, 71 to 76, English abstract included, See Cite No. 9.

Yaguchi et al., "Full Pixel Matching between Images for Non-linear Registration of Objects" IPSJ Transactions on Computer Vision and Applications, Feb. 2010, vol. 2, 1-14.

\* cited by examiner

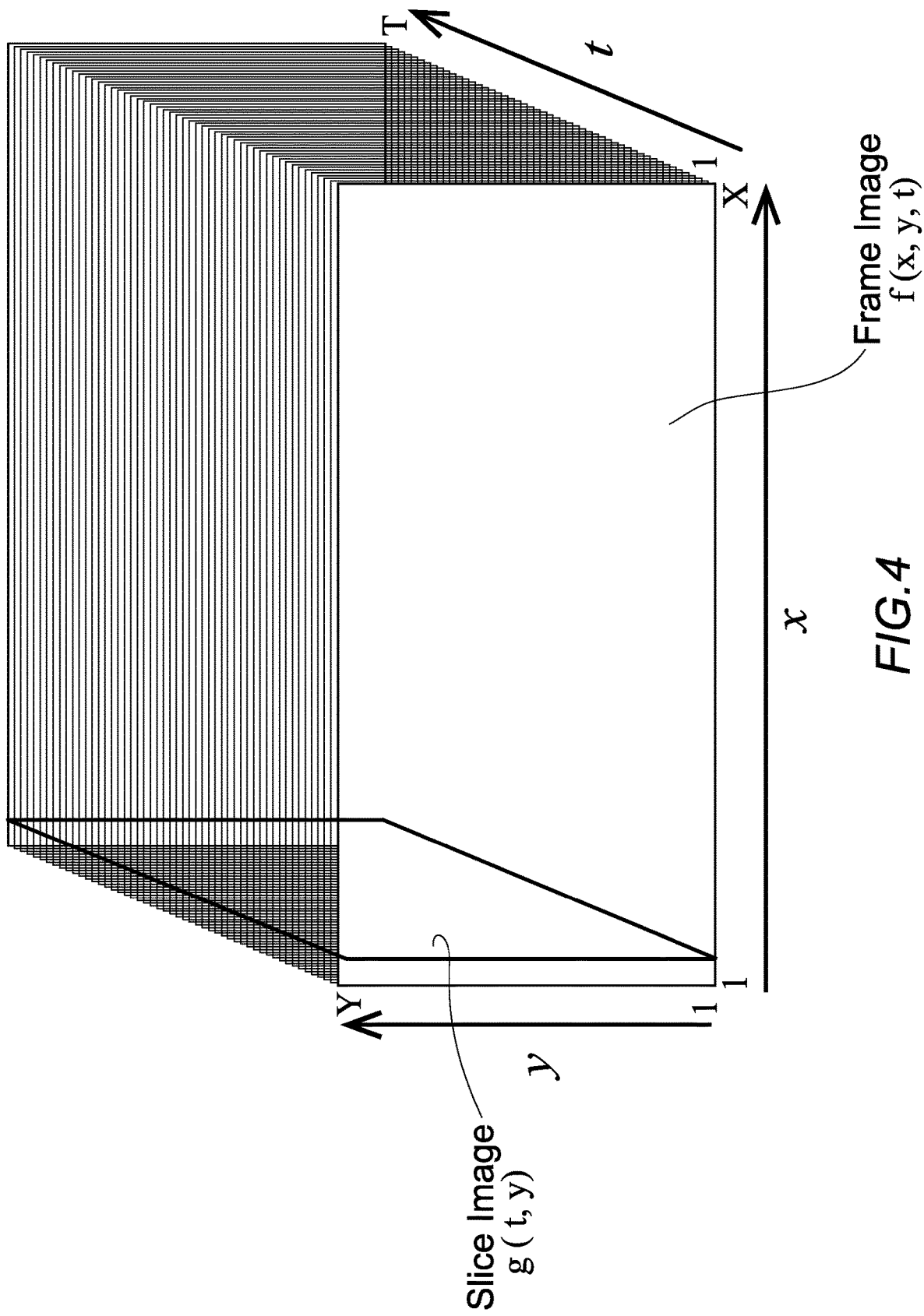

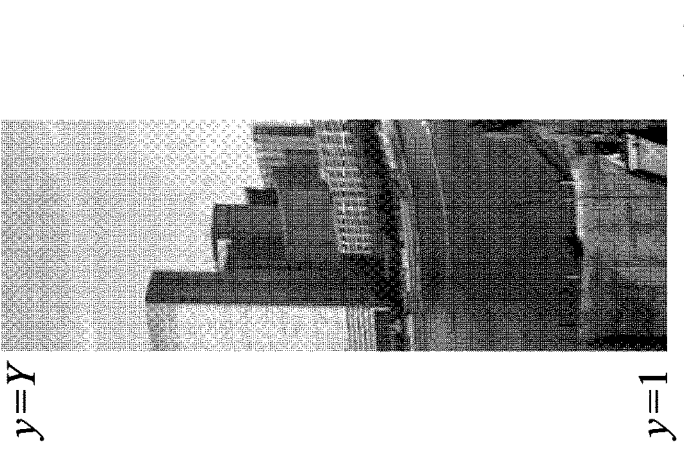
FIG.5(b) Slice Image (x=x0)
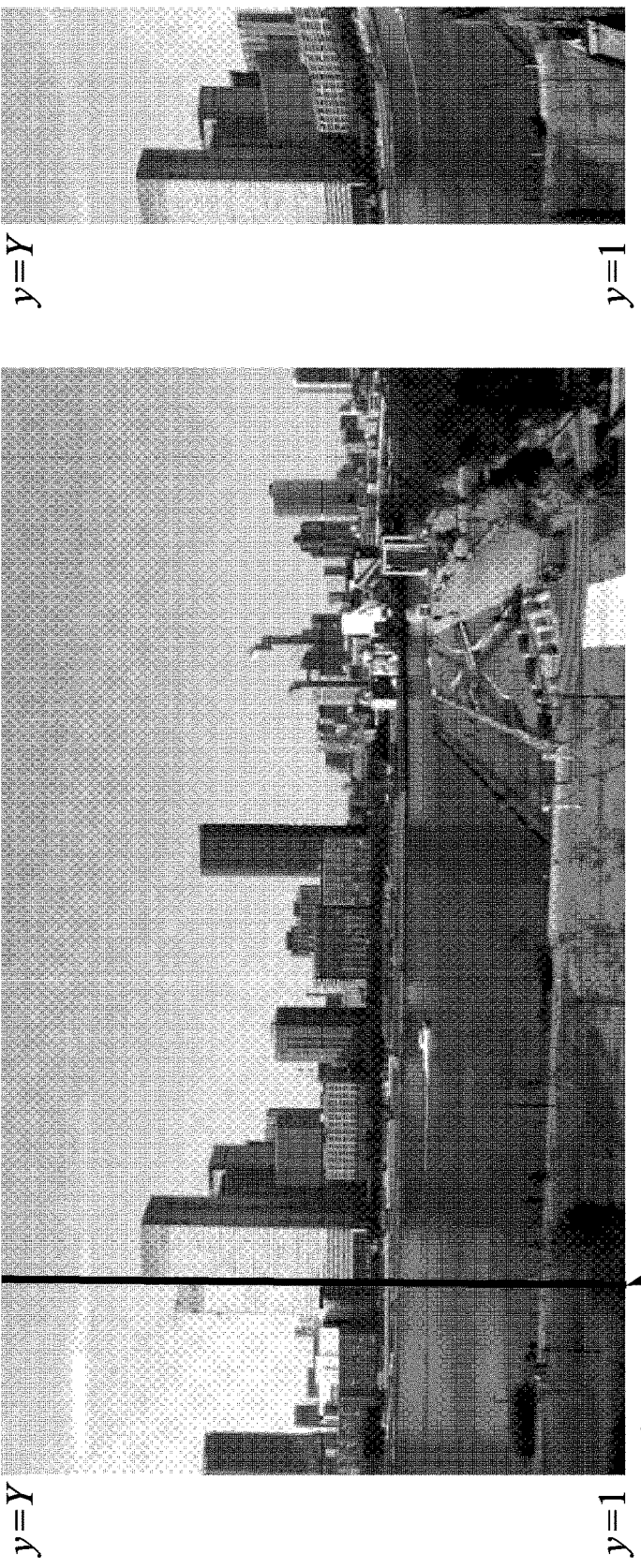
FIG.5(a) Frame Image (t=1)

| Method | Stereo vision method | Epipolar-plane-image (EPI) method | Accumulated motion parallax method |
|---|---|---|---|
| Matching | Characteristic correspondences between two static images are obtained, or line correspondences between images are obtained using dynamic programming. | The detection of lines in EPI corresponds to matching. The distance is detected from the inclinations of the obtained lines. | A frame image and a slice image are matched using dynamic programming (line-to-image DP). |
| Characteristics | Disparity is statically present between two static images. Since the inter-camera distance is short, the obtained distance range is narrow. Texture mapping is difficult. | The number of three-dimensional data points is fewer than the number of object points. Texture mapping is difficult. A wide region is difficult to convert into a three-dimenssional space. | A slice image is obtained by compressing a frame image on the basis of the difference in disparity. Accumulated motion parallax is obtained by providing the motion parallax of each of multiple adjacent object points. Texture mapping is easy. A distance image of a wide range is obtained. |

FIG. 6

FIG.8(a) Frame Image (t=1)

FIG.8(b) Slice Image (x=x0)

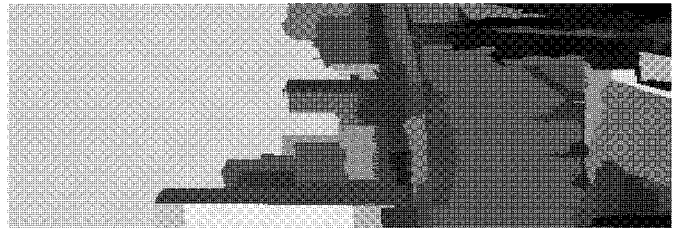
FIG. 11(b) Slice Image
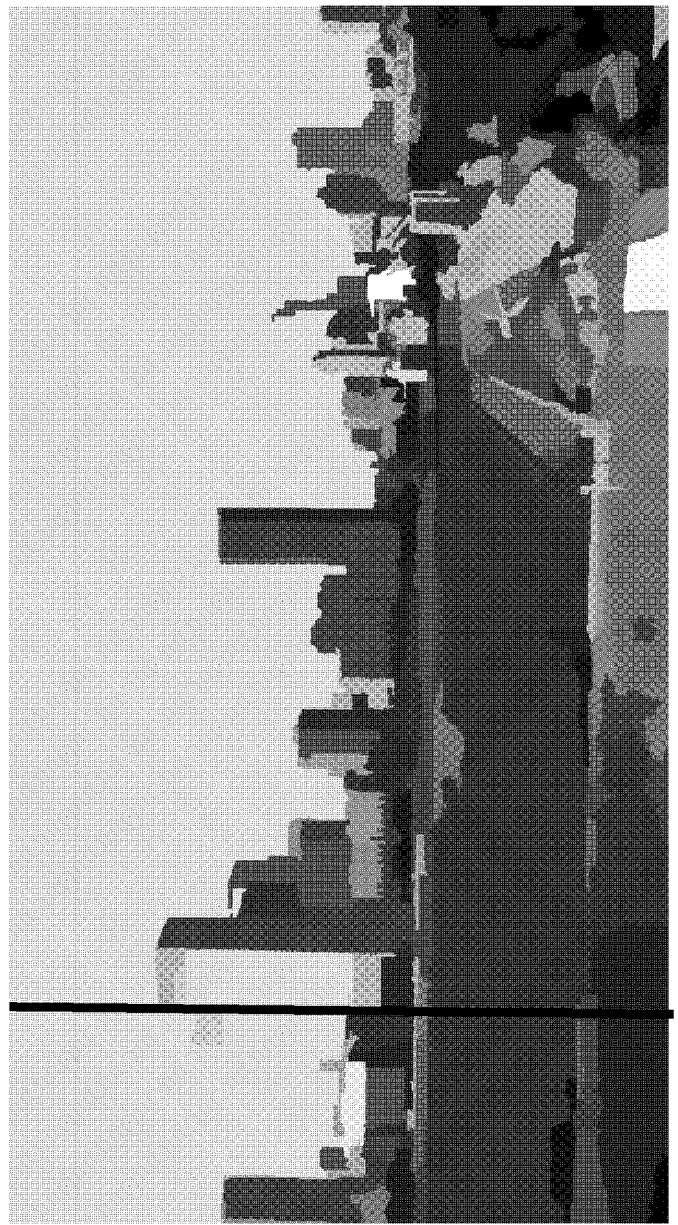
FIG. 11(a) Frame Image $x_0^1$ $x_0^2$ $x_0^3$ $x_0^4$ $x_0^5$ $x_0^6$ $x_0^7$ $x_0^8$

IMAGE DISTANCE CALCULATOR AND COMPUTER-READABLE, NON-TRANSITORY STORAGE MEDIUM STORING IMAGE DISTANCE CALCULATION PROGRAM

TECHNICAL FIELD

The present invention relates to an image distance calculator and a computer-readable, non-transitory storage medium storing an image distance calculation program.

BACKGROUND ART

A method called the stereo vision method has been known for calculating the distance from the camera position to an object using disparity on the basis of simultaneously captured two images (for example, see Patent Literatures 1 and 2). The stereo vision method involves simultaneously capturing images of the same object using two cameras with the horizontal distance between the two cameras kept constant. The images of the object captured by the two cameras slightly differ from each other, because the images have been captured in positions spaced by the inter-camera distance d. The difference between two images is caused by the disparity effect based on the distance d. Accordingly, the distance to the object can be calculated using an expression below by making a comparison between the objects shown in the two images and obtaining the difference between the horizontal pixel positions as disparity.

> Distance to object=(focal length of camera×inter-camera distance $d$)÷disparity (horizontal pixel difference)

This also applies to a case in which the distance to an object is obtained on the basis of moving images captured by cameras. A pair of frame images captured at the same timing (same time) are extracted from moving images captured by two cameras, and the disparity (horizontal pixel difference) is obtained on the basis of the extracted pair of frame images. By substituting the distance d between the cameras (the camera positions from which the two frame images have been captured) and the disparity into the above expression, the distance to the object at each image-capture time can be calculated.

CITATION LIST

Patent Literature

PTL1: Japanese Unexamined Patent Application Publication No. 2008-309519
PTL2: Japanese Unexamined Patent Application Publication No. 2009-139995

SUMMARY OF INVENTION

Technical Problem

However, the method of calculating the distance to the object using the disparity between the two images described above requires obtaining the pixel difference between the objects in the two images. That is, this method requires obtaining pixel-to-pixel correspondences between the same objects in the two images and clearly showing the differences as pixel differences. However, it is not easy to obtain pixel-to-pixel correspondences between the two images. Specifically, it is necessary to perform matching and pixel identification between the same objects in the two images. Implementing such matching and pixel identification requires using or applying various types of image processing technologies.

When the captured two images are compared, it is appreciated that the pixel difference between the images is small with respect to a distant object; the pixel difference is large with respect to a near object. However, if the distance between the two cameras is on the order of the distance between the left and right eyes of a human, the difference between the pixel difference with respect to a distant object and the pixel difference with respect to a near object would be on the order of several pixels (for example, a difference of one pixel with respect to a distant object; a difference of four pixels with respect to a near object). For this reason, the difference in calculation accuracy between the distance to a distant object and the distance to a near object is only four levels or so and therefore it is difficult to calculate these distances with sufficiently many levels of accuracy.

The pixel difference can be increased by increasing the inter-camera distance d. However, the same object has to be captured using the two cameras simultaneously and therefore there is a limit to increasing the inter-camera distance d, that is, it is difficult to obtain a long inter-camera distance. Also, if the inter-camera distance d is increased, the position or shape of the same object varies between the different two images. For this reason, it is difficult to match those images of the same object on a pixel basis. Increasing the inter-camera distance d has long been a challenge for the stereo vision method to solve. Currently, due to the difficulty with solving this challenge, images of one object are captured using a stereo camera several tens to several tens of thousand times.

Also, there are various limitations to capturing the same object using two cameras compared to capturing images using one camera under normal image-capture conditions and therefore the burden related to image capture is heavy.

The present invention has been made in view of the above problems, and an object thereof is to provide an image distance calculator that calculates the distance from a camera to an object shown in moving images and a computer-readable, non-transitory storage medium storing an image distance calculation program.

Solution to Problem

To solve the above-mentioned problems, a computer-readable, non-transitory storage medium storing image distance calculation program of an image distance calculator of one embodiment of the present invention that calculates a distance from a camera which is moved, to an object on the basis of moving images of the object captured by the camera. The program causes a controller of the image distance calculator to perform a frame image extraction function of extracting a frame image at any time from the moving images, a slice image generation function of, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generating a slice image having the y-axis as a longitudinal axis and a t-axis as a transverse axis, t being 1≤t≤T, a spotting point calculation function of, if a pixel in the slice image at a time t is represented by g(t, y), t being 1≤t≤T, and a pixel in an xyt space at a time t0 at a point y' on the y-axis of the frame image is represented by f(x, y', t0)=r(x), y' being 1≤y'≤Y, calculating coordinates of a pixel in the frame image corresponding to a pixel at a time T in the slice image as a spotting point by obtaining the pixel point r(x) in the frame image that is present at any point in a section [1, X] of x and corresponds to the pixel g(t, y) in the slice image, using a matching process based on dynamic programming, a pixel matching function of obtaining pixels in the frame image corresponding to pixels at t=1 to t=T on the t-axis of the slice image by performing a back-trace process from the spotting point calculated by the spotting point calculation function from the time t=T until the time t=1, a region segmentation function of segmenting the frame image and the slice image into regions on the basis of a common segmentation criterion by applying a mean-shift method to the frame image and the slice image, a corresponding region determination function of detecting the pixels in the frame image corresponding to the pixels in the slice image obtained by the pixel matching function on the basis of pixels present in each of the segmented regions of the slice image obtained by the region segmentation function and determining, as a corresponding region, each of the segmented regions of the frame image corresponding to each of the segmented regions of the slice image by obtaining a segmented region including the largest number of detected pixels in the frame image, and a global distance calculation function of detecting an average q of the numbers of pixels in a direction of the x-axis in each of the corresponding regions of the frame image determined by the corresponding region determination function, detecting an average p of the numbers of pixels in a direction of the t-axis in each of the corresponding segmented regions of the slice image, calculating a ratio value of each corresponding region, the ratio value being obtained on the basis of a ratio of q to p or a ratio of p to q, and calculating a distance from the camera to the object captured in the frame image corresponding to the calculated ratio value of each of the corresponding regions as a global distance by using a distance function. A correspondence between the distance and the ratio value is defined in advance.

Further, to solve the above-mentioned problems, an image distance calculator of another embodiment of the present invention includes a frame image extraction extractor configured to extract a frame image at any time from moving images of an object captured by a camera which is moved, a slice image generator configured to, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generate a slice image having the y-axis as a longitudinal axis and a t-axis as a transverse axis, t being 1≤t≤T, a spotting point calculator configured to, if a pixel in the slice image at a time t is represented by g(t, y), t being 1≤t≤T, and a pixel in an xyt space at a time t0 at a point y' on the y-axis of the frame image is represented by f(x, y', t0)=r(x), y' being 1≤y'≤Y, calculate coordinates of a pixel in the frame image corresponding to a pixel at a time T in the slice image as a spotting point by obtaining the pixel point r(x) in the frame image that is present at any point in a section [1, X] of x and corresponds to the pixel g(t, y) in the slice image, using a matching process based on dynamic programming, a pixel matching unit configured to obtain pixels in the frame image corresponding to pixels at t=1 to t=T on the t-axis of the slice image by performing a back-trace process from the spotting point calculated by the spotting point calculator from the time t=T until the time t=1, a region segmentation unit configured to segment the frame image and the slice image into regions on the basis of a common segmentation criterion by applying a mean-shift method to the frame image and the slice image, a corresponding region determination unit configured to detect the pixels in the frame image corresponding to the pixels in the slice image obtained by the pixel matching unit on the basis of pixels present in each of the segmented regions of the slice image obtained by the region segmentation unit and to determine, as a corresponding region, each of the segmented regions of the frame image corresponding to each of the segmented regions of the slice image by obtaining a segmented region including the largest number of detected pixels in the frame image, and a global distance calculator configured to detect an average q of the numbers of pixels in a direction of the x-axis in each of the corresponding regions of the frame image determined by the corresponding region determination unit, to detect an average p of the numbers of pixels in a direction of the t-axis in each of the corresponding segmented regions of the slice image, to calculate a ratio value of each corresponding region, the ratio value being obtained on the basis of a ratio of q to p or a ratio of p to q, and to calculate a distance from the camera to the object captured in the frame image corresponding to the calculated ratio value of each of the corresponding regions as a global distance by using a distance function. A correspondence between the distance and the ratio value is defined in advance.

Advantageous Effects of Invention

According to the image distance calculator and the computer-readable, non-transitory storage medium storing an image distance calculation program according to the one embodiment of the present invention, the distance from the camera to the object can be obtained for each segmented region of the frame image. Particularly, according to the image distance calculator and the computer-readable, non-transitory storage medium storing the image distance calculation program according to the one embodiment of the present invention, the distance of each segmented region or each pixel of the frame image can be obtained on the basis of moving images captured by one camera. Thus, the image capture device can be simplified and the image capture-related burden can be reduced compared to when capturing images using two cameras multiple times with the inter-camera distance d kept constant as is done in the stereo vision method.

Also, the distances of the corresponding regions or pixels of the frame image can be obtained on the basis of the moving images captured by the one camera. Thus, for example, on the basis of various types of moving images, such as moving images captured in the past or moving images captured for other purposes, the distance to the object in the image-capture situation or image-capture environment in which such moving images were captured can be calculated.

BRIEF DESCRIPTION OF DRAWINGS

FIG. 4 is a diagram showing moving images as a three-dimensional space.

FIG. 5(a) is a diagram showing one example of a frame image, and FIG. 5(b) is a diagram showing one example of a slice image.

FIG. 6 is a table showing the differences between an accumulated motion parallax method according to the embodiment, the stereo vision method, and the epipolar-plane-image method.

FIG. 11(a) is a diagram showing an image obtained by applying the mean-shift method to the frame image, and FIG. 11(b) is a diagram showing an image obtained by applying the mean-shift method to the slice image.

DESCRIPTION OF EMBODIMENTS

Figure 1:
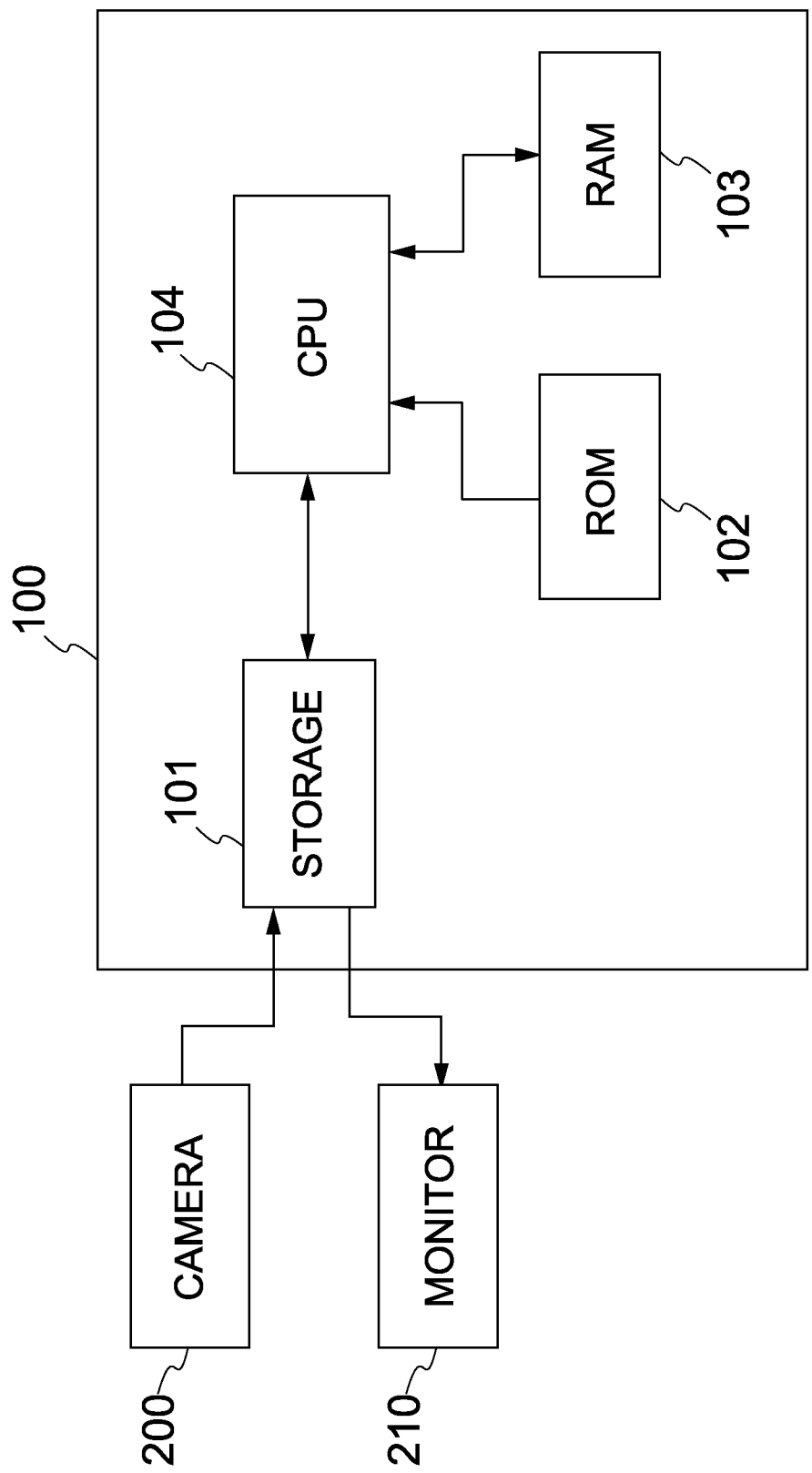
FIG. 1 is a block diagram showing a schematic configuration of an image distance calculator according to an embodiment.

Now, an example of an image distance calculator according to one embodiment of the present invention will be described in detail with reference to the drawings. FIG. 1 is a block diagram showing a schematic configuration of the image distance calculator. An image distance calculator 100 includes a storage (pixel information storage) 101, a ROM (read only memory) 102, a RAM (random access memory; pixel information storage) 103, and a CPU (central processing unit; frame image extractor, slice image generator, spotting point calculator, pixel matching unit, region segmentation unit, corresponding region determination unit, global distance calculator, local distance calculator, precise distance calculator, controller, code detector, pixel distance value extractor, code RGB value assignor, RGB value replacement unit, combination image generator, RGB value detector, distance information provider, RGB value changer, modified combination image generator, distance-provided combination image generator) 104. Connected to the image distance calculator 100 is a camera 200. Moving images captured by the camera 200 is stored in the storage 101. Also connected to the image distance calculator 100 is a monitor 210. The monitor 210 is able to display the moving images captured by the camera 200 and images shown in FIGS. 14, 16(a), 16(b), 19, 20, 21, and the like (to be discussed later).

The moving images captured by the camera 200 are stored in the storage 101. More specifically, the moving images captured by the camera 200 is stored as data in which multiple frame images are stored chronologically. For example, consider a case in which moving images are captured by the camera 200 from time 1 until time T. Assuming that moving images captured by the camera 200 can be stored at a rate of one frame image per time $\Delta t$, $T/\Delta t$ number of frame images are chronologically stored in the storage 101.

The following configuration may be used: a frame buffer, for example, is disposed in the image distance calculator 100 or camera 200; and each frame image of moving images captured by the camera 200 is temporarily stored in the frame buffer and then sequentially stored in the storage 101. Also, instead of storing moving images captured by the camera 200 in the storage 101 in real time, moving images previously captured by the camera 200 (moving images captured in the past) may be stored in the storage 101 as time-series data consisting of multiple frame images.

Moving images captured by the camera 200 need not be digital moving images. Even if captured moving images are, for example, analog moving images, the image distance calculator 100 can use the analog moving images in the distance calculation process as long as it can digitally convert the analog moving images and chronologically store the resulting frame images in the storage 101.

The storage 101 is a typical hard disk or the like. However, the configuration of the storage 101 need not be a hard disk and may be a flash memory, SSD (solid-state drive/solid-state disk), or the like. The storage 101 is not limited to any specific configuration as long as it can store moving images as multiple chronological frame images.

The CPU 104 calculates the distance from the camera position to an object for each pixel of multiple frame images (moving images) of the object chronologically stored in the storage 101. The CPU 104 performs this pixel-specific distance calculation process in accordance with a processing program (to be discussed later; a program based on flowcharts of FIGS. 2, 17, and 22).

Stored in the ROM 102 are the program for calculating the distance to the object for each pixel in the frame image, and the like. The CPU 104 performs the pixel-specific distance calculation process in accordance with the program read from the ROM 102. The RAM 103 serves as a work area used by the CPU 104 for processing.

While the image distance calculator 100 according to the embodiment is described as a configuration in which programs [the image distance calculation program (a flowchart shown in FIG. 2) and a combination process program (flowcharts shown in FIGS. 17 and 22)] executed by the CPU 104 are stored in the ROM 102, these programs may be stored in the storage 101.

The camera 200 is image capture means that is able to capture moving images of a scene or the like in front of the camera through lenses. The camera 200 may be of any type or configuration as long as it is able to capture moving images. For example, it may be a typical movie camera, or may be the camera function of a smartphone or the like.

The monitor 210 is able to display moving images captured by the camera 200, images showing pixel-specific distances obtained by the distance calculation process (e.g., images in FIGS. 14, 16(a) and 16(b) to be discussed later), and the like in such a manner that the user can visually recognize them. The monitor 210 is a typical display such as a liquid crystal or CRT display.

Figure 2:
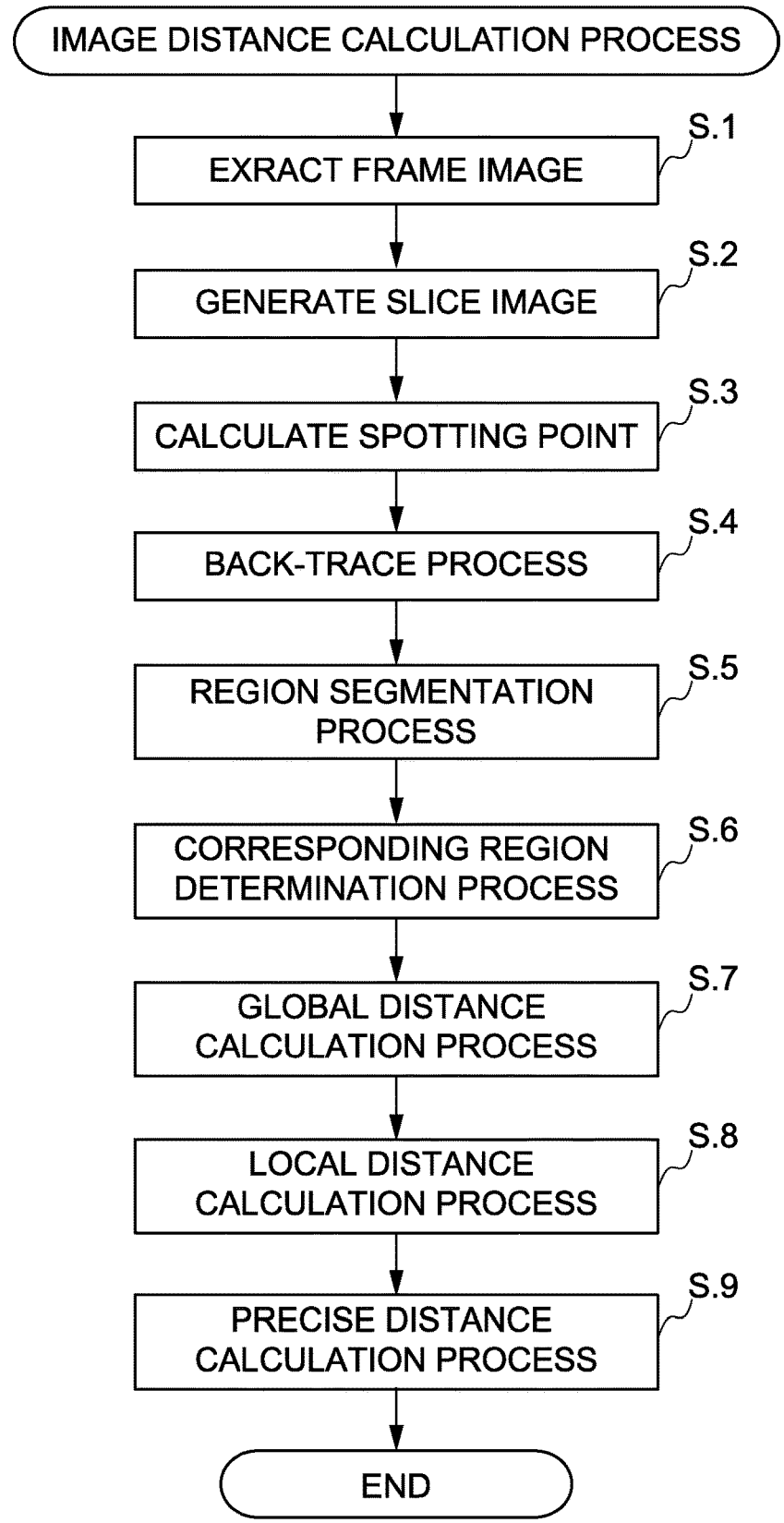
FIG. 2 is a flowchart showing a process performed by the image distance calculator according to the embodiment.

Next, there will be described a method by which the CPU 104 calculates the distance of each pixel of a frame image on the basis of time-series data consisting of multiple frame images stored in the storage 101. FIG. 2 is a flowchart showing an image distance calculation process (pixel-specific distance calculation process) performed by the CPU 104 of the image distance calculator 100.

Figure 3:
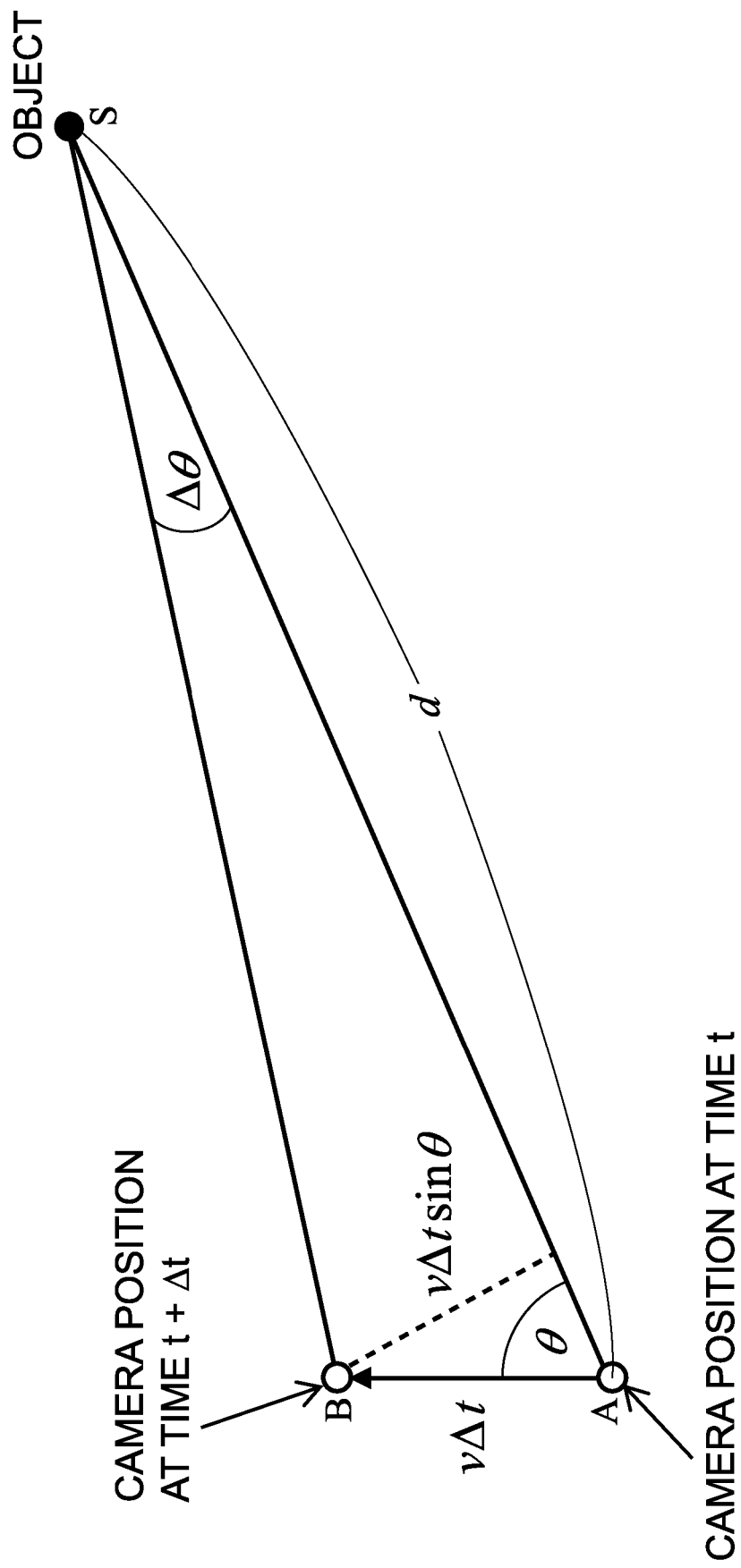
FIG. 3 is a diagram schematically showing the relationship between a camera and an object in motion parallax.

First, consider a case in which the camera 200 captures images of an object while moving at a constant velocity v. FIG. 3 is a diagram schematically showing the relationship between the camera 200 and the object. FIG. 3 shows a case in which the camera 200 captures images of the object while moving from a point A to a point B at the velocity v for a time Δt. Assume that the object is located at a point S. The distance from the point A to the point B can be represented by vΔt. The angle formed by SA (a line connecting the point S and point A) and SB (a line connecting the point S and point B) is represented by Δθ, and the angle formed by SA and AB (a line connecting the point A and point B) is represented by θ. Also, assume that SA and SB have the same length represented by d. Thus, as shown in FIG. 3, the length of a perpendicular line from the point B onto SA can be represented by vΔt sin θ. The length vΔt sin θ is a value approximate to dΔθ, which the product of the length d and the formed angle Δθ. Accordingly, the formed angle Δθ can be represented by Formula 1 below.

$$\Delta\theta = v\Delta t \sin\theta/d \qquad \text{Formula 1}$$

As is obvious in Formula 1, the formed angle Δθ becomes smaller (narrower) as the distance from the camera 200 to the object becomes longer (that is, as the object becomes more distant from the camera 200); the formed angle Δθ becomes greater (wider) as the distance from the camera 200 to the object becomes shorter (that is, as the object becomes closer to the camera 200). In other words, if a comparison is made between the moving speeds of a distant object and a near object located on a side of the moving direction of a moving person, the distant object makes a smaller movement and moves in the transverse direction less fast and, on the other hand, the near object makes a larger movement and moves in the transverse direction fast, as experienced in daily life.

For this reason, by obtaining the difference between movements of the object in the transverse direction shown in moving images captured by the camera 200, the distance from the camera to the object can be calculated for each pixel in a frame image. FIG. 3 schematically shows a configuration well known as a classical technique using motion parallax.

A technique obtained by horizontally separating the technique using motion parallax shown in FIG. 3 is generally called the stereo vision method. In the stereo vision method, A and B in FIG. 3 correspond to the left and right eyes of a human. In this case, the movement of the camera is not considered. However, as will be described later with reference to FIG. 6, this classical technique, that is, the stereo vision method has a limitation in obtaining distance data.

The CPU 104 of the image distance calculator 100 obtains changes in the position of the object shown in moving images (frame images) captured by the one moving camera in a time-series manner and thus obtains the distance to the object for each pixel in the frame images.

As described above, data in which multiple frame images are stored chronologically is stored in the storage 101 as moving images. The CPU 104 of the image distance calculator 100 regards moving images as a three-dimensional space (space-time pattern) having the longitudinal axis of a frame image as a y-axis, the transverse axis thereof as an x-axis, and the chronological element as a t-axis, as shown in FIG. 4. That is, the CPU 104 recognizes that each pixel of the frame images can be represented by coordinates f(x, y, t) in the three-dimensional space. In f(x, y, t), f has typical color elements R, G, B (red, green, blue); $1 \le x \le X$, $1 \le y \le Y$, and $1 \le t \le T$; X represents the maximum number of pixels in the transverse (width) direction of a frame image; Y represents the maximum number of pixels in the longitudinal (height) direction of the frame image; and T represents the time at which the frame image has been captured. It is assumed that the value of time T is equal to the number of the last frame image. The CPU 104 of the image distance calculator 100 according to the present embodiment extracts a frame image at any time from moving images captured by the camera 200 (S.1 in FIG. 2). As shown in FIG. 4, the extracted frame image is a frame image at time t=1. However, a frame image at any time is typically used. As will be described later, if the distance of each pixel is obtained with respect to a wide scene, frame images of several times have to be extracted.

If moving images are regarded as a three-dimensional space as described above, a slice image can be generated on the basis of an element on the y-axis of the frame image and an element on the t-axis with the x-coordinate of the frame image fixed to any value x=x0 (S.2). The slice image can be represented by $g(t, y)$ where $1 \leq y \leq Y$ and $1 \leq t \leq T$ [=f(x0, y, t)]. The frame image at time t=1 can be represented by $f(x, y, 1)$ where $1 \leq x \leq X$. For convenience, in the present embodiment, it is assumed that the image-capture time t is $1 \leq t \leq 175$.

FIG. 5(a) shows the frame image $f(x, y, 1)$ at t=1. FIG. 5(b) is a diagram showing the slice image $g(t, y)$ at x=x0 [x=x0 is shown in FIG. 5(a)]. The images in FIGS. 5(a) and 5(b) are images generated on the basis of moving images of the opposition side captured from the riverside by the camera 200 moving from the left to the right. Specifically, the moving images are moving images captured by the camera 200 from a window of a vehicle which was moving along the riverside. For this reason, while the camera 200 moved from the left to the right, vibration, displacement, or the like in the vertical direction occurred. Accordingly, the moving images captured by the camera 200 is not moving images captured by a camera moving completely in parallel.

The slice image shown in FIG. 5(b) is a slice image at x=x0. The left end of the transverse axis t is t=1, and the right end thereof is t=175(=T). A comparison is made between the frame image in FIG. 5(a) and the slice image in FIG. 5(b). Of the objects shown in the frame image, objects (e.g., buildings, bank, and the like on the opposition side) present in positions distant from the image-capture position of the camera 200 are stored (shown) in the slice image as in the frame image. Also, those objects (the inter-pixel distance) are not much compressed in the slice image in the t-axis direction. On the other hand, objects (e.g., the turf, ground, and the like before the river) present in positions close to the image-capture position of the camera 200 are stored (shown) in the slice image in such a manner that the objects (inter-pixel distance) are compressed compared to those in the frame image.

A comparison is made between FIGS. 5(a) and 5(b). The compression rate (image compression rate, inter-pixel distance compression rate) at which an object in the most distant position in the frame image is converted into that in the slice image is on the order of onefold. On the other hand, the compression rate (image compression rate, inter-pixel distance compression rate) of an object in the closest position in the frame image is on the order of four-fold. The compression rate difference is proportional to the distance from the camera 200. Specifically, the compression rate is determined in an analog manner, that is, in proportion to the distance continuously (in multiple steps) rather than being determined simply on the basis of the four steps from one-fold to four-fold. Accordingly, the distances from the camera to objects can be obtained in a wider dynamic range (measure) continuously (in multiple steps) on the basis of the compression state.

As described above, in the case of the stereo vision method (the method of calculating the distance to an object using the disparity between two images), if the inter-camera distance is short, the range of the disparity value becomes as narrow as four levels or so. For this reason, the stereo vision method has difficulty in obtaining sufficient distance calculation accuracy. If the inter-camera distance is increased, the disparity value can be increased in principle, but it is difficult to detect corresponding pixels in two images. On the other hand, the image distance calculator 100 according to the present embodiment is able to obtain the distances to distant and near objects continuously (in more steps) rather than in four or so steps. That is, the image distance calculator 100 is able to obtain the distances in a wider dynamic range with higher calculation accuracy.

A slice image indicates accumulated motion parallax explicitly and statically in accordance with the compression state of an object image. The image distance calculator 100 obtains the distance from the camera 200 to an object for each pixel of a frame image on the basis of the compression state of a slice image (the compression state of each pixel of the slice image) indicating accumulated motion parallax. In the present embodiment, the method of obtaining the distance from the camera 200 to an object for each pixel using the image distance calculator 100 is referred to as the "accumulated motion parallax method."

FIG. 6 is a table showing the differences between the stereo vision method (a method using the disparity between two images), the epipolar-plane-image (EPI) method, and the accumulated motion parallax method. The stereo vision method involves extracting feature points from two images simultaneously captured by two cameras or matching the two images using linear dynamic programming. The two images implicitly indicate disparity. By obtaining the disparity on the basis of the matching between the two images, the distance to the object is obtained. However, the stereo vision method is characterized in that the dynamic range of the obtained distance is relatively narrow.

The EPI method is a method of extracting lines from a slice image, associating the extracted lines with points of a target object, and associating the inclinations of the lines with the distances. However, the number of the extracted lines is much less than the number of points representing the object and therefore only a few points representing the captured target object can be obtained. For this reason, it is difficult to map a texture therefor on the surface.

The following literatures are referred to as ones relating to EPI:

[1] Masanobu Yamamoto, "Determining Three-Dimensional Structure from Image Sequences given by Horizontal and Vertical Moving Camera," IEICE Transactions on Information and Systems, Vol. J69-D, No. 11, pp. 1631-1638, Nov. 25, 1986.

[2] Robert C. Bolles, H. Harlyn Baker, David H. Marimont, "Epipolar-Plane Image Analysis: An approach to Determining Structure from Motion," International Journal of Computer Vision, Issue 1, pp. 7-55, 1987.

On the other hand, the accumulated motion parallax method involves matching a frame image and a slice image using a dynamic programming (DP) method (a line-to-image DP matching method) to be discussed later. The slice image indicates accumulated motion parallax explicitly and statically in accordance with the compression state. The distance to an object can be obtained using the compression state. The dynamic range of the obtained distance is characterized in that it is wider than that of the stereo vision method.

As described above, FIG. 3 shows a case in which the camera 200 captures images of an object while moving at the constant velocity v. On the other hand, if the coordinates (x, y) of the camera 200 in a three-dimensional space varies depending on time t, the amount of variation $v(x, y, t)\Delta t$ represents the velocity (the motion parallax of the pixel velocity). The velocity of the camera 200 can be considered as the moving speed of the pixels on the screen. Accordingly, the movement $\Delta x(t, y)=x(t+\Delta t, y)-x(t, y)$ of an image $(x, y)$ in the x-axis direction serves as the speed. For this reason, as in FIG. 3, $\Delta x(t, y)\sin \theta=(x(t+1, y)-x(t, y))\sin \theta=d\Delta\theta$ holds.

What is noted here is that the accumulated motion parallax (AMP) at the end time T is first calculated as x(T, y') Then, each x(T, y') that determines x(T, y') is obtained by a back-trace process. FIGS. 5(*a*) and 5(*b*) are shown as models for generating the time difference subsequently. On the other hand, FIG. 3 is a diagram assuming that $\Delta\theta$ is obtained as disparity. Accordingly, stereo vision shown in FIG. 3 does not have the concept of the accumulation of disparity.

In the image distance calculator 100 according to the present embodiment, a concept called "accumulated motion parallax" is considered. First, a pixel of a frame image corresponding to a pixel g(t, y) of a slice image is represented by f(x(t, y), y, t0). A pixel of the frame image corresponding to a pixel g(t+1, y) of the slice image is represented by f(x(t, y)+$\Delta$x(t, y), y, t0). The camera 200 captures images while moving in the transverse direction (approximately in the horizontal direction). For this reason, if t is incremented by 1 on the transverse axis t of the slice image, the coordinate (the x-axis coordinate) of a pixel f of the frame image moves by $\Delta$x(t, y).

The value of the moving distance $\Delta$x(t, y) in the x-axis direction of a pixel of the frame image greatly varies with the distance from the camera 200 to the object. Specifically, if the object shown on the pixel (x, y) of the frame image is distant from the camera 200, the value of the moving distance $\Delta$x(t, y) of the pixel of the frame image takes a value close to 1; if the object is close to the camera 200, the value of the moving distance $\Delta$x(t, y) of the pixel of the frame image takes a value more than 1.

Figure 7:
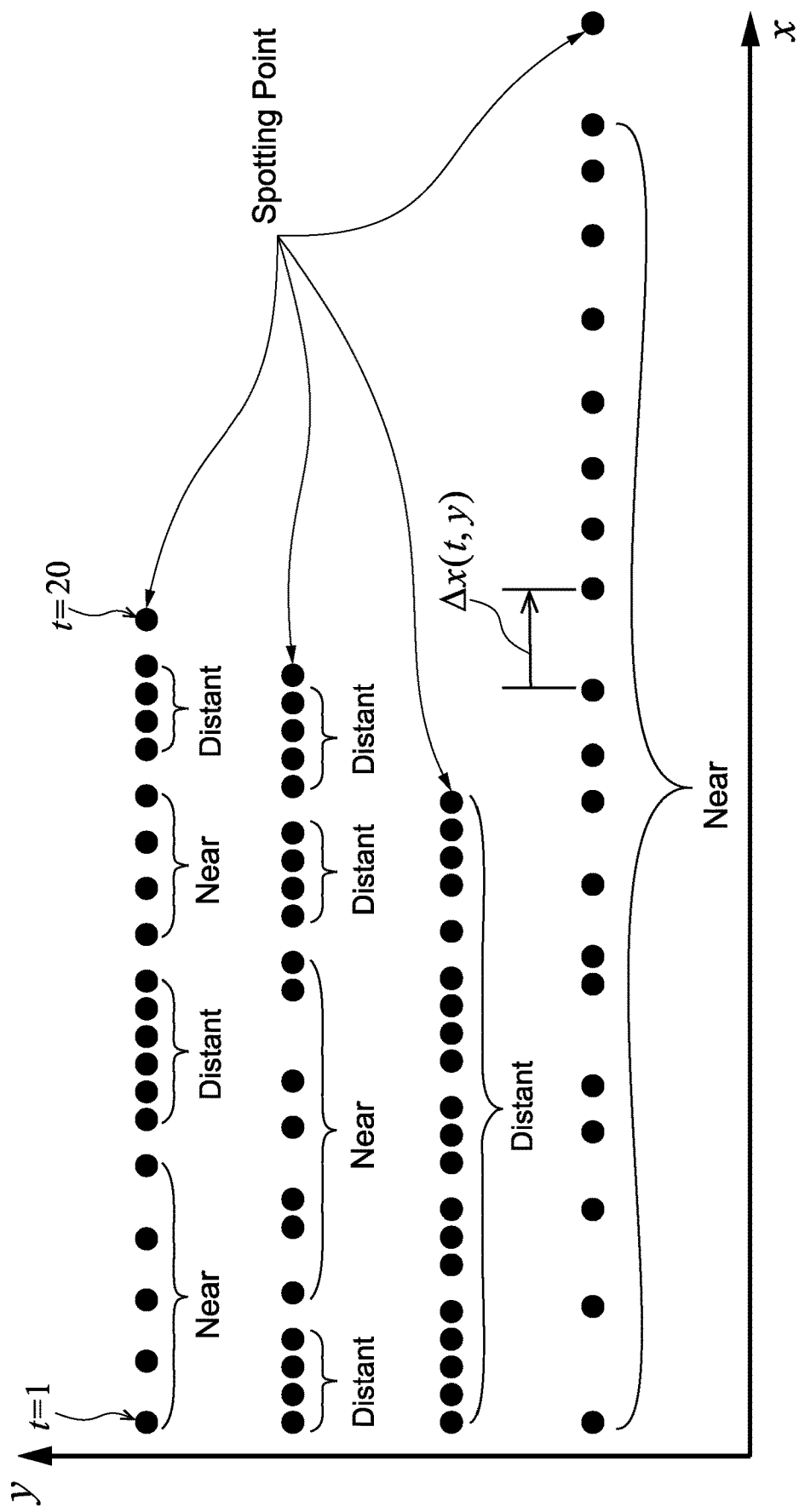
FIG. 7 is a diagram schematically showing the positions of pixels of the frame image corresponding to pixels of the slice image using black circles.

FIG. 7 is a diagram schematically showing the positions of pixels of the frame image corresponding to pixels of the slice image using black circles (●). The longitudinal axis of FIG. 7 corresponds to the y-axis of the frame image, and the transverse axis of FIG. 7 corresponds to the x-axis of the frame image. The black circles show the pixels of the frame image corresponding to the pixels of the slice image. To simplify the description, 20 pixels (black circles) are shown in the transverse direction of FIG. 7, and there are long and short distances between adjacent pixels (black circles). One black circle schematically shows a pixel in the frame image corresponding to a pixel of the slice image at time t (t=1 to 20). The leftmost black circle on each line shows the position of a pixel of the frame image corresponding to a pixel of the slice image at time t=1. On the other hand, the rightmost black circle on each line shows the position of a pixel of the frame image corresponding to a pixel of the slice image at the last time t=20. The pixel points of the frame image corresponding to the pixel points of the slice image at the last time t(=20) are referred to as "spotting points."

Since the camera 200 captures images while moving in the transverse direction (approximately in the horizontal direction), pixels at 20 times from time t=1 to time t=20 are stored in the slice image in the transverse direction. On the other hand, as shown in FIG. 7, the distances between the pixels (black circles) in the frame image corresponding to the 20 pixels stored in the slice image differ from one another for each y-axis. The reason why the different distances occur is that $\Delta$x(t, y) varies with the distance from the camera 200 to the object, as described above. Accordingly, an object having short distances between adjacent black circles (pixels) in FIG. 7 indicates that the distant from the camera 200 to that object is long; an object having long distances between adjacent black circles (pixels) in FIG. 7 indicates that the distant from the camera 200 to that object is short.

The reason why the spotting points at time t=20 are located in different positions for each y-axis is that the accumulation of $\Delta$x(t, y) obtained for each y-axis varies. The difference between the coordinates x(t, y) of one pixel (black circle) and the coordinates x(t+1, y) of a pixel (black circle) on the right side thereof is $\Delta$x(t, y). Accordingly, the coordinates x(T, y) of a pixel (T=20) serving as a spotting point can be represented by the accumulation of the difference $\Delta$x(t, y) between adjacent pixels, that is, $\Sigma\Delta x(\Sigma, y)$ where $\tau$ is the sum of $\tau$=1 to $\tau$=t−1). As is obvious from the foregoing, the rightmost (the moving image at the last time) pixel (spotting point) of the slice image is a pixel having the accumulated motion parallax of the captured moving images.

Figure 8:
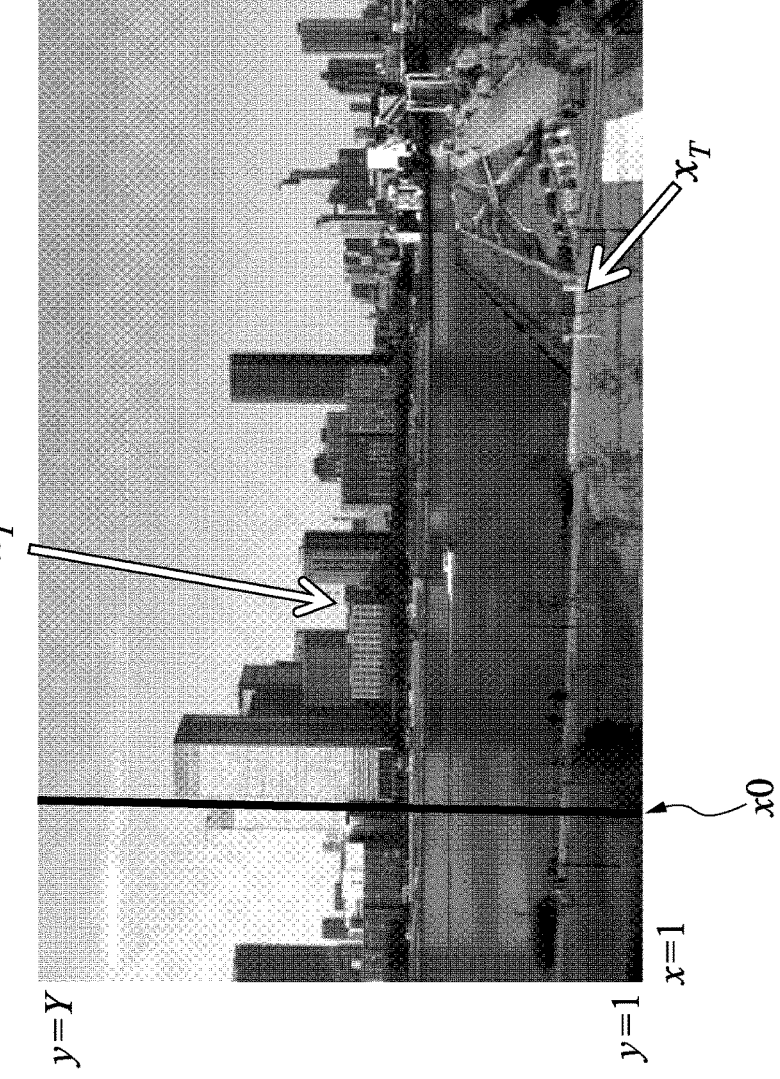
FIG. 8(a) is a diagram showing a frame image at time t=1 in moving images captured by the camera which is moved in horizontal direction.
FIG. 8(b) shows an example of a slice image generated from moving images at times t=1 to t=175 at a point (line) x0 shown in FIG. 8(a).

FIG. 8(*a*) shows a frame image at time t=1 obtained from moving images captured at 175 times from time t=1 to t=175 by the camera 200 moving in the transverse direction (approximately horizontal direction), as one example. FIG. 8(*b*) shows a slice image generated from images at times t=1 to t=175 at a point (line) x0 shown in FIG. 8(*a*), as one example.

The variation states at times t=1 to t=175 of the pixels on the line x0 of the frame image shown in FIG. 8(*a*) are statically stored in the slice image shown in FIG. 8(*b*). When the difference between the frame image and slice image is examined while viewing the slice image shown in FIG. 8(*a*) rightward from the line x0, it is recognized that a part of the slice image corresponding to the frame image is compressed (the pixels are compressed). The degree of compression varies with the distance from the camera 200 to each object.

A pair of upper and lower curves (curved dotted lines) L1 and L2 shown on the left side of FIG. 8(*b*) are curves obtained by extracting the positions of pixels of the slice image corresponding to two y-coordinate points on the line x0 of the frame image shown in FIG. 8(*a*). If the camera 200 moves completely horizontally with (in parallel with) the object, the lines (dotted lines) are obtained as horizontal straight lines (straight doted lines). However, the camera 200 captures moving images while vibrating in the upper direction (y-direction) rather than moving completely horizontally with (in parallel with) the object and therefore the lines are obtained as curves. Since the camera 200 does not seem to completely horizontally with the scene of the object, curves as described above are typically obtained.

Pixels $x_T$ corresponding to spotting points (time t=175=T) on the upper and lower curves are shown in upper and lower positions of the frame image in FIG. 8(*a*) by open-start arrows. The distances from the start points (the pixels at t=1) to the end points (the pixels at t=175=T) of the curves shown on the left side of FIG. 8(*b*) are approximately equal to the width of the slice image. On the other hand, in the frame image, the lengths from x0 to the respective spotting points (the positions of pixels at t=175=T) differ from each other. The length from x0 to the spotting point $x_T$ shown in a lower part of the frame image is longer than the length from x0 to the spotting point $x_T$ shown in an upper part of the frame image. This is because the accumulation of $\Delta$x(t, y) described above varies with the y-axis value.

For this reason, if pixels of the slice image corresponding to y value-fixed points x(1, y), x(2, y), . . . , and x(T, y) at times t from t=1 to t=T(=175) of the frame image can be obtained, correspondences between the pixels of the frame image and the pixels of the slice image can be obtained.

Figure 9:
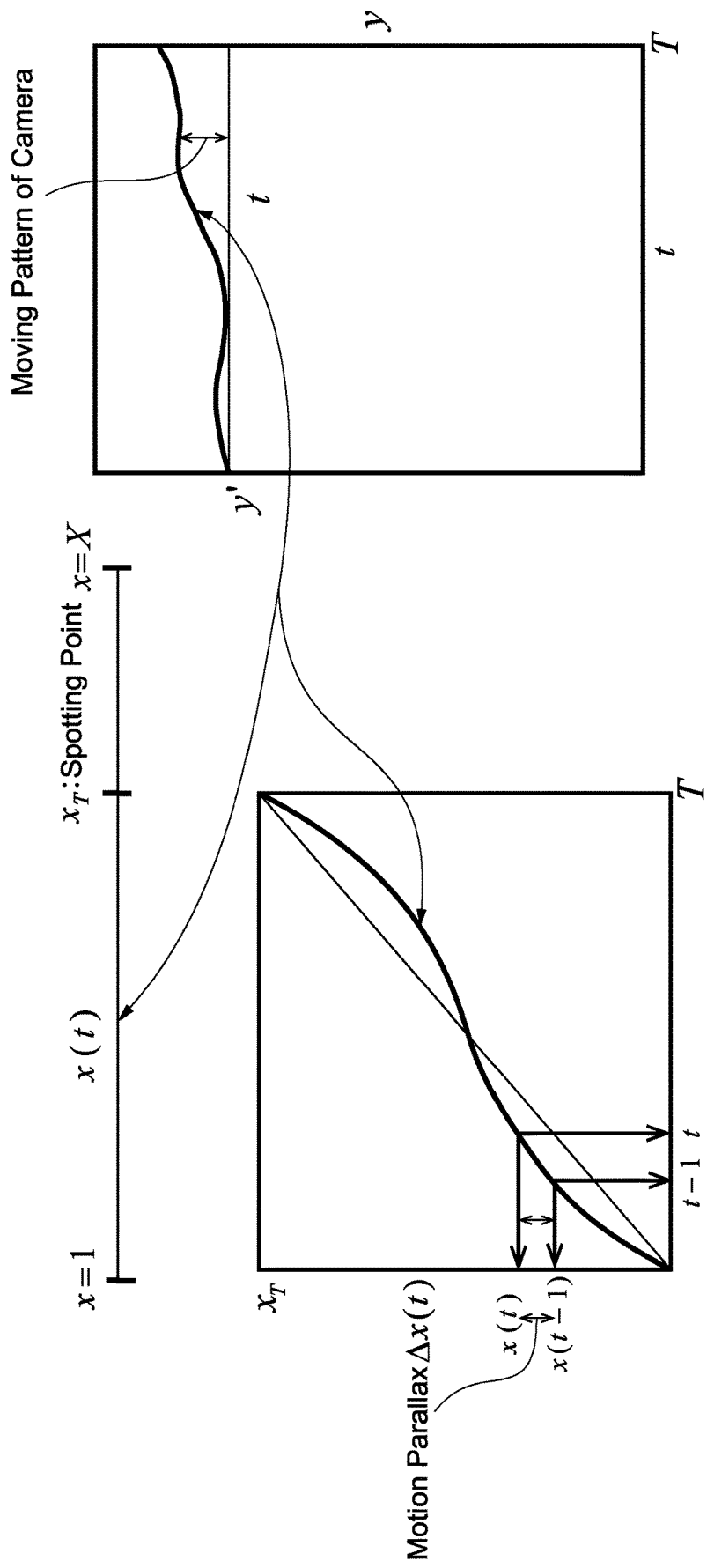
FIG. 9 is a diagram showing the correspondence between the frame image and slice image while schematically showing the relationship between a pixel x and time t in the frame image at predetermined y' and the relationship between y and time t at a pixel g(t, y) in the slice image.

FIG. 9 is a diagram schematically showing a correspondence between a pixel x(t) on a pixel line at predetermined y' of the frame image and a pixel g(t, y) of the slice image. The pixel x(t) on the pixel line in the frame image consists of the accumulation of motion parallax Δx(t) from t=1 to t=t−1. The lower-left diagram of FIG. 9 shows that the correspondence between x(t) and t is non-linear, but does not show the y-axis in the right diagram. To obtain the correspondence between the pixel points on the line at y' of the frame image and the slice image, the CPU 104 of the image distance calculator 100 uses a matching method called line-to-image DP (line-image continuous dynamic programming). First, the CPU 104 obtains a spotting point of the frame image at time t=T from the optimal pixel-to-pixel correspondences between x(t) values at y' of the frame image, that is, one-dimensional, accumulated motion parallax Δx(t) and pixels g(t, y) of the slice image consisting of two dimensions, the t-axis and y-axis, using the line-to-image DP (dynamic programming) matching method. The CPU 104 then performs a back-trace process of tracing the optimal points from the obtained spotting point toward t=1. Thus, the CPU 104 obtains all the correspondences between the pixels of the slice image and the pixels of the frame image, that is, all the corresponding points at t=1 to t=T.

The line-to-image DP matching method is characterized in that it involves applying dynamic programming to x values on the y-coordinate line fixed to y' in the frame image and the two-dimensional image consisting of (t, y). By fixing the y-axis value as described above, the start pixel on the line in the frame image and the start pixel in the slice image can be matched. Fixing the y-axis value in the frame image is a condition for the DP matching described above.

Figure 10:
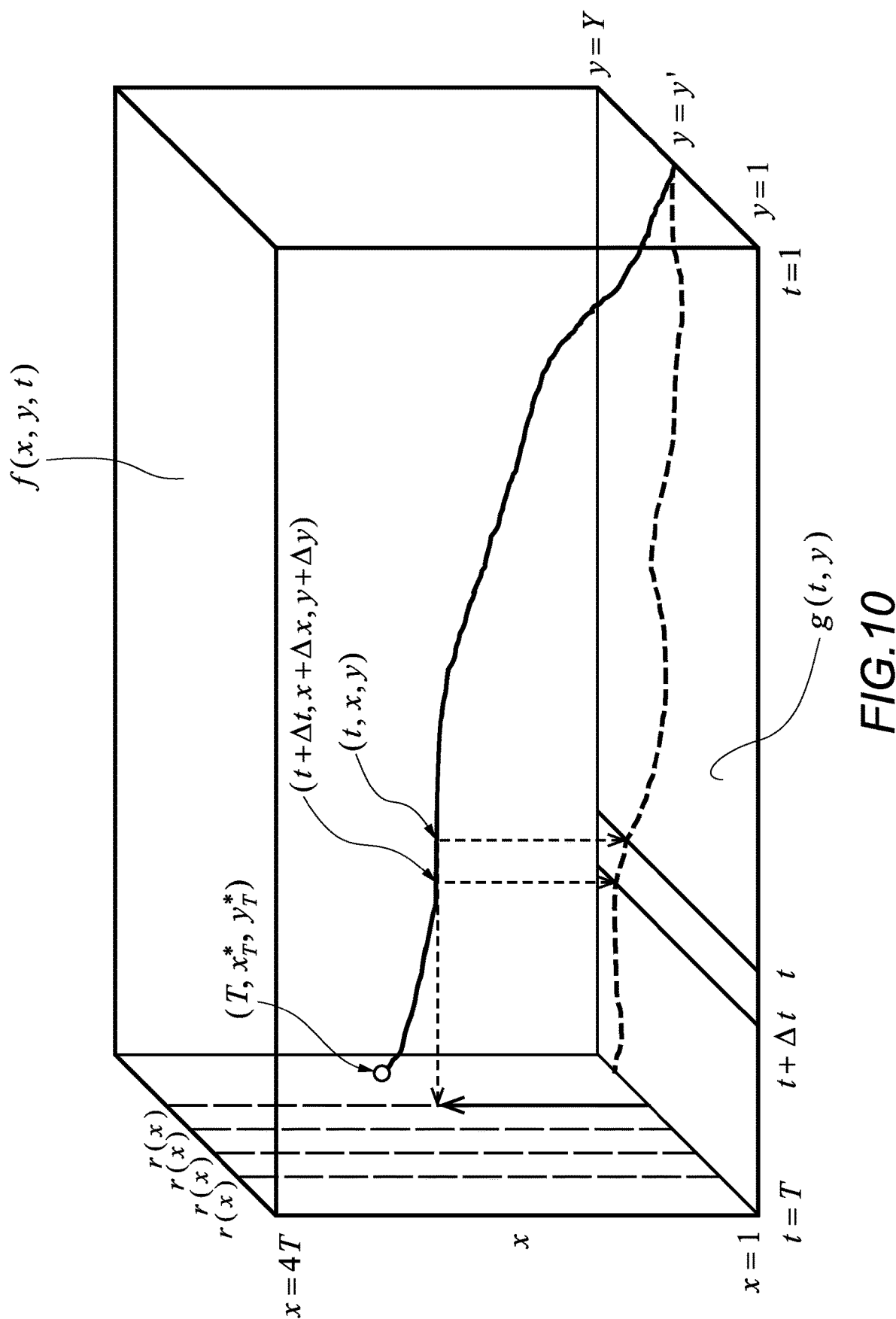
FIG. 10 is a diagram showing a line-to-image DP matching algorithm (DP matching algorithm having a spotting function).

The line-to-image DP matching method shown in FIG. 10 forms a side-surface image by longitudinally arranging only line patterns obtained by fixing the y-value of one image to y' while using the existing image-to-image DP matching method as a reference. Also, the optimal value in a three-dimensional space is calculated using y=y' of another image as the start point, and the optimal accumulated value is found at a point on the side surface. Thus, the point that gives the optimal accumulated value from the start point can be determined as a spotting point. The image forming the side surface is a two-dimensional image in terms of form, and the image forming another side surface is also a two-dimensional image. Accordingly, the images appear to be matching each other. However, the side-surface image is formed of only a single linear sequence and therefore the line and image are substantially matching each other. Also, the line-to-image DP matching method has a spotting function. This matching method is an algorithm that lies midway between the line-to-line DP matching method involving matching one one-dimensional line and another one-dimensional line and the image-to-image DP matching method involving matching one two-dimensional image and another two-dimensional image, both of which have been known.

The line-to-line DP matching method and the image-to-image DP matching method (dynamic programming for obtaining a correspondence between two-dimensional images) are described in detail in, for example, Ryuichi Oka et al. "General Scheme of Continuous Dynamic Programming—Optimal Full Pixel Matching for Spotting Image—," IEICE Technical Report, The Institute of Electronics, Information and Communication Engineers, PRMU2010-87, IBISML2010-59 (2010-09) or Japanese Unexamined Patent Application Publication No. 2010-165104 and are known technologies. By applying these DP matching methods, the line-to-image DP matching method can be implemented. Note that as described above, the implementation of the line-to-image DP matching method requires an idea such as "the use of only line patterns obtained by fixing the y-value of one image to y'."

FIG. 10 is a diagram showing the line-to-image DP matching algorithm. The line-to-image DP matching algorithm may be configuration taking various local paths. The diagram shown in FIG. 10 represents the exploration of the correspondence shown in FIG. 9. To obtain desired corresponding coordinates in a frame image, the following settings are made in FIG. 10: considering an operation space in a three-dimensional space, corresponding coordinates (t, y) in a slice image (coordinates in a two-dimensional flat image) are set on the bottom surface, and the same pixel lines as a pixel line (one-dimensional line) fixed to y' and having the length x of the frame image are arranged on the left side surface. Since the fixed y' substantially corresponds to a coordinate on the longitudinal axis of the frame image, the left side surface is a surface obtained by simply arranging the same line images as one line image of the frame image in the y-axis direction. The correspondence can be obtained by performing dynamic programming matching (DP matching) using (t, y')=(1, y') of the bottom surface as the start point. (T, x*, y*) that give the optimal accumulated value is one point on the side surface. It can be said that spotting is performed because x* is one point in a section [1, X].

As shown in FIG. 10, in the line-to-image DP matching algorithm of the present embodiment, the relationship between the t-axis, which represents the time axis, and x-axis is set such that a correspondence of up to 1:4 is allowed. Specifically, the t-axis value representing the time in FIG. 10 is set to a range of t=1 to t=T, and the x-axis value is set to a range of x=1 to x=4T. That is, the maximum x-axis value is four times as large as the maximum t-axis value T.

The relationship between the lengths of the x-axis value section and t-axis value section is determined on the basis of the degree of compression of each object image in the frame image and slice image. That is, this relationship is set on the basis of the ratio between short and long distances from objects to the camera 200. As described with reference to FIG. 7, this is because the distance between adjacent pixels (black circles) of the frame image corresponding to adjacent pixels of the slice image varies with the distance from the camera to the corresponding object and the difference in distance is represented by the difference between the distances from the camera to the objects. Accordingly, as described above with reference to FIG. 7, the difference between the distances from the camera to the objects can be obtained on the basis of by what pixels the adjacent two pixels in the slice image are spaced from each other in the frame image. The desired correspondence between the section lengths of the x-axis and t-axis can be obtained on the basis of the accumulation of this pixel expansion/contraction. What times T is the maximum x-axis value is determined on the basis of the maximum value of the accumulated frame length. The degree of local pixel expansion/contraction is obtained by Δx(t, y)=x(t, y)−x(t−1, y).

While the dynamic programming (DP) matching algorithm shown in FIG. 10 may be various combinations of local paths, the image distance calculator 100 uses a matching algorithm represented by the following formula as an example. This matching algorithm allows for local contraction of pixels and local expansion/contraction from a frame image to a slice image by a factor of 1 to 4. Since local expansion/contraction by a factor of 1 to 4 is allowed, global expansion/contraction by a factor of 1 to 4 is also allowed. The following DP matching formula shows that local variation by a factor of 1 to 4 is allowed. Typically, the range of the allowed factor can be freely set in the dynamic programming formula.

First, coordinates of the three-dimensional space shown in FIG. 10 are represented by (x, y, t). As described above, the lines (frame image) on the left side surface are lines obtained by setting a pattern of f(x, y', t0) where 1≤x≤X with the y value fixed to y' and placing the same patterns on the y-axis. If f(x, y', t0) is set to r(x) shown in FIG. 10, the side surface image is more precisely represented by r(x, y) where 1≤x≤X and 1≤y≤Y.

Note that a constraint r(1, y')=g(1, y') is set.

The slice image is represented by g(t, y). A local distance obtained by the DP matching algorithm is represented by d(t, x, y).

The local distance is obtained by d(t, x, y)=|g(t, y)−r(x)|. D(1, 1, y') is initialized to d(1, 1, y) at y=y.' D(t, x, y) is initialized to ∞ for all (t, x, y) except for (1, 1, y').

The values of t, x, y are represented as follows:

$$t \in [1,T]; y \in [\max(1,y'-t), \min(y'+t,y)]; \text{ and } x \in [t, 4t-3] (=[t, 4(t-1)]).$$

The value of D(t, x, y) is obtained using the following Formula 2 on the basis of these conditions:

$$D(t, x, y) = \min \begin{cases} D(t-1, x-1, y) + 2d(t, x, y) \\ D(t-1, x-1, y+1) + 3d(t, x, y) \\ D(t-1, x-1, y-1) + 3d(t, x, y) \\ D(t-1, x-2, y) + 3d(t, x, y) \\ D(t-1, x-2, y+1) + 4d(t, x, y) \\ D(t-1, x-2, y-1) + 4d(t, x, y) \\ D(t-1, x-3, y) + 4d(t, x, y) \\ D(t-1, x-3, y+1) + 5d(t, x, y) \\ D(t-1, x-3, y-1) + 5d(t, x, y) \\ D(t-1, x-4, y) + 5d(t, x, y) \\ D(t-1, x-4, y+1) + 6d(t, x, y) \\ D(t-1, x-4, y-1) + 6d(t, x, y) \end{cases} \quad \text{Formula 2}$$

Then, w(1, 1, y') is initialized to 1 at y=y', and x(t, x, y) is initialized to 0 for all (t, x, y) except for (1, 1, y). w(t, x, y) is obtained by the following Formula 3 on the basis of these initial settings:

$$w(t, x, y) = \begin{cases} w(t-1, x-1, y) + 2 \\ w(t-1, x-1, y+1) + 3 \\ w(t-1, x-1, y-1) + 3 \\ w(t-1, x-2, y) + 3 \\ w(t-1, x-2, y+1) + 4 \\ w(t-1, x-2, y-1) + 4 \\ w(t-1, x-3, y) + 4 \\ w(t-1, x-3, y+1) + 5 \\ w(t-1, x-3, y-1) + 5 \\ w(t-1, x-4, y) + 5 \\ w(t-1, x-4, y+1) + 6 \\ w(t-1, x-4, y-1) + 6 \end{cases} \quad \text{Formula 3}$$

Formula 2 representing D(t, x, y) above means an accumulation formula based on non-linear matching between local distances. Details of the non-linear matching are as follows: the lines in the frame image are allowed to contract in the slice image in the x-axis direction by a factor of 1 to ¼ at time T; and with respect to the y-axis direction, the lines are allowed to move in the slice image in the upward direction from y' by up to T pixels and in the downward direction from y' by up to T pixels at time T. This movement in the y-axis direction is allowed assuming that the camera 200 does not move completely in parallel with the object.

The optimal accumulated value of the local distance is obtained in a range of x=T to x=4T on the left side surface shown in FIG. 10. The sum of coefficients used in the processes until reaching the optimal accumulated value is calculated with respect to all x, y, t. The above w(t, x, y) is a recurrence formula relating to the sum of coefficients. w(T, x, y), which is the end of time t of w(t, x, y), is used to normalize the accumulated value D(T, x, y). The term "normalize" here refers to normalizing the difference between the paths reaching the accumulated value.

After performing the above calculation in the three-dimensional space (x, y, t) (i.e., in the rectangular parallelepiped shown in FIG. 10), the CPU 104 calculates a spotting point (T, x*$_T$, y*$_T$) by Formula 4 below (S.3 in FIG. 2). As described with reference to FIG. 7, a spotting point represents a pixel of the frame image corresponding to a pixel of the slice image at the last time T. However, it is not previously known which pixel in the x-axis direction (to which pixel in the pixel line) at predetermined y' in the frame image corresponding line end of the matching corresponding line (corresponding line r(x)) from (t, y)=(1, y') to t=T of the slice image matches. For this reason, a spotting point is calculated to determine (spot) the matching point. The spotting point is calculated by the following Formula 4:

$$(T, x_T^*, y_T^*) = \arg \min_{\max(1, y'-T) \leq y \leq \min(Y, y'+T), T \leq x \leq 4T} \frac{D(T, x, y)}{w(T, x, y)} \quad \text{Formula 4}$$

In the spotting point calculation formula (Formula 4), "arg" represents a function for extracting a variable corresponding to the minimum value.

After having calculated the spotting point (T, x*$_T$, y*$_T$), the CPU 104 of the image distance calculator 100 obtains a trajectory starting from (t, y)=(1, y') and reaching the spotting point by a back-trace process (S.4 in FIG. 2).

The term "back-trace process" here refers to a process of obtaining the trajectory from the spotting point (T, x*$_T$, y*$_T$) to (1, 1, y) by decrementing the t value by 1 so that t=T becomes T−1, T−2, . . . , and then 1 assuming that the last point of the back trace is (1, 1, y'). The back-trace process is performed using the following Formula 5:

$$D(T, x_T^*, y_T^*) = \min \begin{cases} D(T-1, x_T^*-1, y_T^*) + 2d(T, x_T^*, y_T^*) \\ D(T-1, x_T^*-1, y_T^*+1) + 3d(T, x_T^*, y_T^*) \\ D(T-1, x_T^*-1, y_T^*-1) + 3d(T, x_T^*, y_T^*) \\ D(T-1, x_T^*-2, y_T^*) + 3d(T, x_T^*, y_T^*) \\ D(T-1, x_T^*-2, y_T^*+1) + 4d(T, x_T^*, y_T^*) \\ D(T-1, x_T^*-2, y_T^*-1) + 4d(T, x_T^*, y_T^*) \\ D(T-1, x_T^*-3, y_T^*) + 4d(T, x_T^*, y_T^*) \\ D(T-1, x_T^*-3, y_T^*+1) + 5d(T, x_T^*, y_T^*) \\ D(T-1, x_T^*-3, y_T^*-1) + 5d(T, x_T^*, y_T^*) \\ D(T-1, x_T^*-4, y_T^*) + 5d(T, x_T^*, y_T^*) \\ D(T-1, x_T^*-4, y_T^*+1) + 6d(T, x_T^*, y_T^*) \\ D(T-1, x_T^*-4, y_T^*-1) + 6d(T, x_T^*, y_T^*) \end{cases} \quad \text{Formula 5}$$

By performing the back-trace process, the CPU 104 can calculate a pixel in a pixel line in the x-axis direction at predetermined y' of the frame image corresponding to a pixel of the slice image at time t. For convenience, the corresponding point (spotting point) of the frame image at time T is represented by x(T, y'). The spotting point is a pixel position that varies with predetermined y'.

If the spotting point of the frame image at y' is represented by x(1), x(2), . . . , and x(T) by omitting y', a change in the position of the spotting point of the frame image at time t can be represented by Δx(t). The formed angle from the camera 200 to the object at time t is represented by Δθ(t). The unit of Δθ (t) is radian. If a comparison is made between the formed angle Δθ (t) and the change Δx(t) in the position of the spotting point at time t, $\Delta\theta_x(t)$ in the x-direction of the frame image and the change Δx(t) in the position of the spotting point can be determined to have a relationship represented by the following Formula 6:

$$\Delta\theta_x(t) \approx \Delta x(t) = x(t) - x(t-\Delta t) \quad \text{Formula 6}$$

That is, Δx(t) can be determined to be equal to the motion parallax at time t. Accordingly, the accumulated motion parallax can be represented by Formula 7 below. What is important here is that the spotting point x(T) is first obtained and then x(t), t=1, . . . , and T−1 are obtained by the back-trace process. Accordingly, the relational expressions, Formula 6 above and Formula 7 below, can be said to hold ex post.

$$\sum_{t=1}^{T} \Delta\theta_x(t) \approx \sum_{t=1}^{T} (x(t) - x(t-1)) = x(T) = x_T \quad \text{Formula 7}$$

where x(0)=0; x(T) represents the motion parallax value accumulated until time T in the pixel line in the x-axis direction at predetermined y' in the frame image; and $x_T/T$ represents a standardized value of the accumulated motion parallax. The image distance calculator 100 according to the present embodiment is able to calculate the distance of each pixel of the frame image by using the accumulated motion parallax.

Next, a method for obtaining the distance of each pixel of the frame image will be described.

The slice image is an image obtained by non-linear contraction of the frame image (by compression of the inter-pixel distance, by compression of the image). By converting the degree of contraction (the compression of the inter-pixel distance) into a distance, the distance from the camera 200 to the object can be calculated for each pixel (each point) of the frame image. If the correspondence between the frame image and slice image is considered, an occlusion portion may exist between the two images. The term "occlusion" refers to a state in which a rear object is hidden behind a front object in a three-dimensional space so that the rear object is not seen. Specifically, occlusion refers to a state in which an object whose image has been captured by a moving camera is temporarily hidden behind a front object and thus the establishment of a one-on-one correspondence between a frame image and a slice image is prevented. However, occlusion occurs only in parts of the images, and the distances of the pixels are often similar due to the relationship between the previous and subsequent pixels. For this reason, a parameter that converts the pixels into distances is extracted considering correspondences between the two images. That is, if correspondences are established between the frame image and slice image, the distance from an object shown on each pixel of the frame image to the camera 200 can be obtained.

In the present embodiment, correspondences between the frame image and slice image are obtained in two stages. In a first stage, correspondences between "regions" each including multiple pixels are obtained. In a second stage, correspondences between pixels are obtained. The reason why correspondences are obtained in the two stages is that with respect to the first stage, the distances from the camera to a scene in each region are approximately similar and it is easier to obtain region-to-region correspondences than to first obtain pixel-to-pixel correspondences; and with respect to the second stage, more detailed correspondences can be obtained on the basis of the result of the first stage. The distance of each pixel is obtained in each stage. In the first stage, the same distance is obtained with respect to all the pixels in each region. Finally, the results of the two stages are combined.

The line-to-image DP matching method used by the image distance calculator 100 according to the present embodiment obtains pixel-to-pixel correspondences in principle. However, the line-to-image DP matching method has the problem of the occlusion between a frame image and a slice image and also has the non-linearity problem. Thus, this method has difficulty in obtaining complete and accurate pixel-to-pixel correspondences. For this reason, the determination of region-specific distance values based on the region-to-region correspondences (region segmentation process) is considered as the initial process of the first stage. A method called the mean-shift method is known as one of the most predominant region segmentation techniques. The mean-shift method is a well-known region segmentation technique. It is provided by a widely released open-source computer vision library called OpenCV (Open Source Computer Vision Library) and therefore is available to anyone.

The CPU 104 of the image distance calculator 100 applies the mean-shift method (region segmentation process) to the frame image and slice image (S.5 in FIG. 2). In the region segmentation process, the CPU 104 uses a common parameter (common segmentation criterion), since if it uses different parameters, it would have difficulty in obtaining corresponding segmented regions.

FIGS. 11(*a*) and 11(*b*) show images obtained by applying the mean-shift method to the frame image and slice image. As is obvious in a comparison between a frame image and a slice image shown in FIGS. 11(*a*), 11(*b*) and the frame image and slice image shown in FIGS. 5(*a*), 5(*b*), portions determined as being located in the same regions are filled in common colors in the frame image and slice image shown in FIGS. 11(*a*) and 11(*b*) subjected to the mean-shift method (region segmentation process). The color differences allow for determination of whether portions are located in the same region or in different regions.

Due to the application of the mean-shift method, portions determined as being located in the same region can be considered as having approximately the same distance (the distance from the camera 200 to the object). Also, a comparison between the frame image and slice image subjected to the mean-shift method suggests that while both images contain non-linearity, the segmented regions are formed in a similar manner in both images. For this reason, the CPU 104 of the image distance calculator 100 obtains region-to-region correspondences between the two images using the pixel-to-pixel correspondences obtained by the line-to-image DP matching process and back-trace process on the basis of the frame image and slice image which have been segmented by the mean-shift method.

Figure 12:
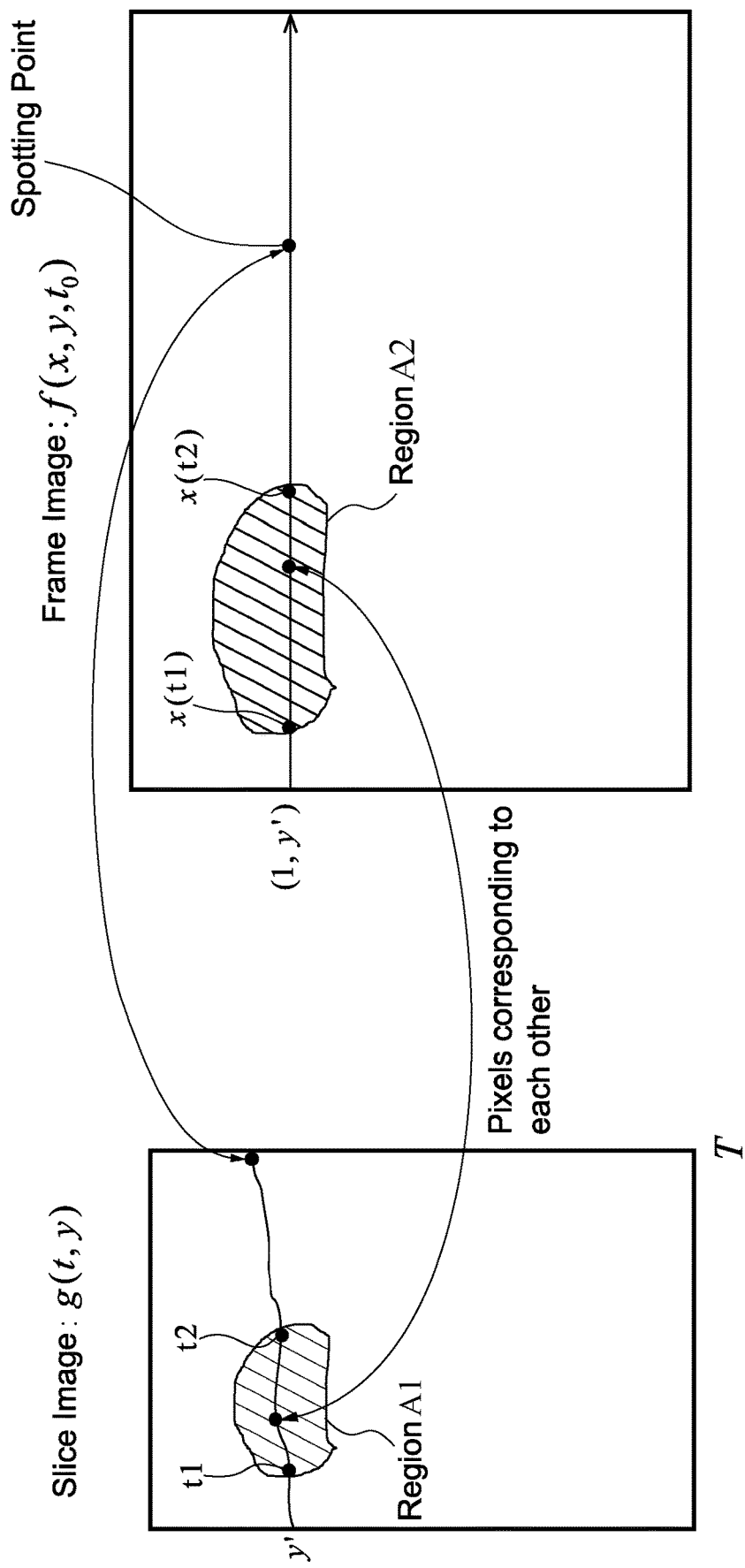
FIG. 12 is a schematic diagram showing a region-to-region correspondence between the slice image and frame image.

FIG. 12 is a schematic diagram showing a region-to-region correspondence between the slice image and frame image. The correspondences between the pixels of the slice image and the pixels of the frame image have been obtained by the line-to-image DP matching process and back-trace process. As shown in FIG. 12, first, the CPU 104 makes a comparison between the pixels in the regions of the slice image segmented by the mean-shift method and the pixels in the regions of the frame image segmented by the mean-shift method. The CPU 104 then determines that regions including the largest number of corresponding pixels are regions corresponding to each other (corresponding regions) (S.6 in FIG. 2: corresponding region determination process).

Figure 13A:
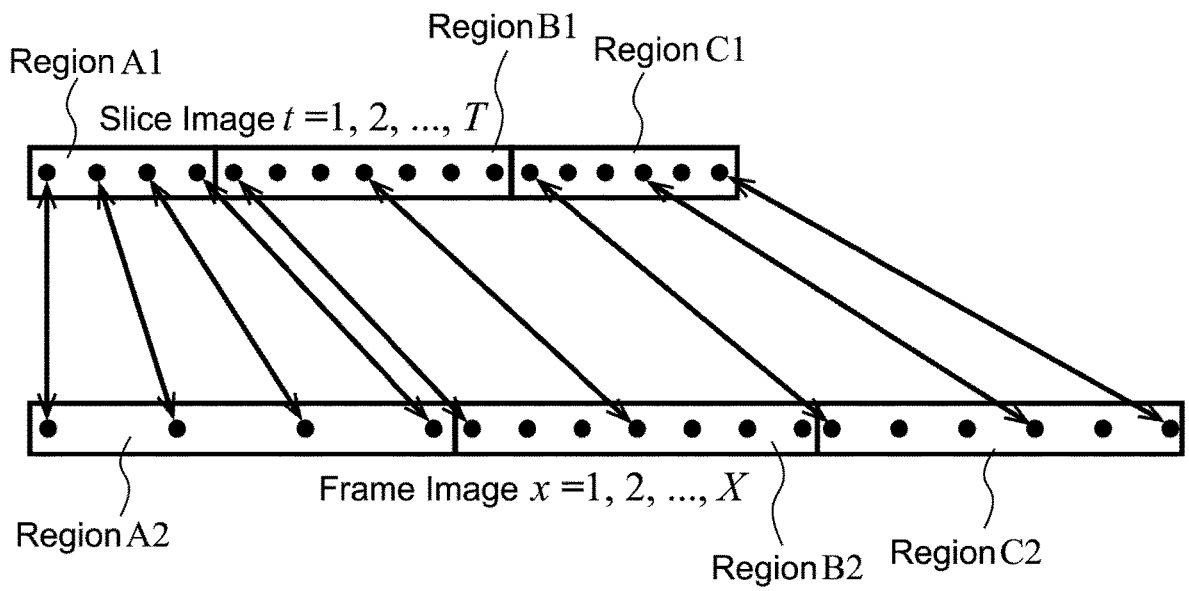
FIG. 13(a) is a schematic diagram showing that region-to-region correspondences between the slice image and frame image are determined by regions of the slice image and regions of the frame image including the largest number of corresponding points corresponding to the pixels in the regions of the slice image.
Figure 13B:
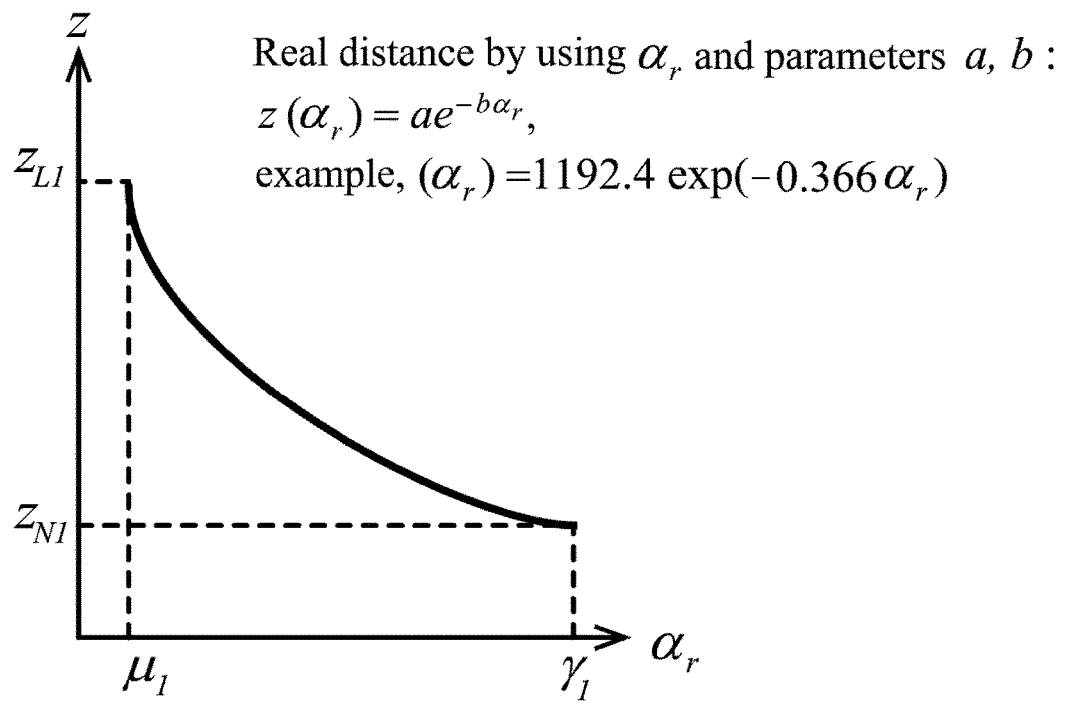
FIG. 13(b) is a graph showing that the relationship between the distance z and $\alpha_r$ is represented by $\alpha_r = q/p$ where q represents the average length of transverse-axis sections in a region of the slice image; and p represents the average length of transverse-axis sections in a corresponding region of the frame image.

Specifically, as schematically shown in FIG. 13(*a*), in order to obtain a region of the frame image corresponding to a region A1 of the slice image, the CPU 104 obtains pixels (black circles) of the frame image corresponding to four pixels (black circles) in the region A1 of the slice image and obtains a region of the frame image including the largest number of corresponding pixels (black circles). In FIG. 13(*a*), the region of the frame image including the largest number of pixels corresponding to the pixels (black circles) in the region A1 is a region A2. Accordingly, the CPU 104 determines that the corresponding region of the frame image corresponding to the region (segmented region) A1 of the slice image is the region (segmented region) A2. Similarly, the CPU 104 determines that a region B2 including the largest number of pixels (black circles) of the frame image corresponding to the pixels (black circles) in a region B1 of the slice image is a corresponding region. The CPU 104 also determines that a region C2 including the largest number of pixels (black circles) of the frame image corresponding to the pixels (black circles) in a region C1 of the slice image is a corresponding region.

Next, the CPU 104 calculates a distance value to be provided to each pixel of each region of the frame image. As described above, this distance is calculated in two stages. In the first stage, the CPU 104 calculates the distance value of each of the regions segmented by the mean-shift method (S.7 in FIG. 2). This distance value is referred to as global distance (outside-region distance). In the second stage, the CPU 104 calculates the distance value of each pixel in each region (S.8 in FIG. 2). This distance value is referred to as local distance (inside-region distance).

First, global distances are calculated. The differences between the sizes of the regions of the frame image segmented by the mean-shift method and the sizes of the regions of the slice image segmented by the mean-shift method relate to the distances from the camera 200 to the objects. If the distance from the camera 200 to an object is long, a region corresponding to the object, of the slice image maintains a certain size compared to the size of a region corresponding to the object, of the frame image, and its region size-based compression rate tends to be low. On the other hand, if the distance from the camera 200 to an object is short, the size of a region corresponding to the object, of the slice image has a larger size than the size of a region corresponding to the object, of the frame image, and its region size-based compression rate tends to be high. For this reason, the CPU 104 obtains the compression rate of the corresponding region on the basis of the ratio between the average length in the transverse-axis direction, of the corresponding region of the slice image and the average length in the transverse-axis direction, of the corresponding region of the frame image. The compression rate may be obtained by obtaining the most frequent length in the transverse-axis direction, of the region rather than the average length and then calculating the ratio therebetween.

For example, a transverse line in one region (region A2) of the frame image as shown in FIG. 12 is observed. If $x(t2)$ corresponding to time t2 of the slice image is present near the end point of the line in the region and $x(t1)$ corresponding to time t1 thereof is present near the start point, the difference in the accumulated motion parallax in this section is represented by $x(t2)-x(t1)$. On the other hand, the length of the corresponding line in the corresponding region (region A1) of the slice image is represented by $t2-t1$.

The average length in the transverse-axis direction, of the corresponding region of the slice image is represented by p, and the average length in the transverse-axis direction, of the corresponding region of the frame image is represented by q. Thus, the enlargement ratio of the frame image to the slice image can be represented by $q/p$. As shown in FIG. 10, in the line-to-image DP matching process performed by the image distance calculator 100 according to the present embodiment, the x-axis value of the frame image is 4 times as large as the value of the corresponding time t ($x=4T$). Accordingly, $q/p$ is $1 \leq q/p \leq 4$. If data indicating the correspondence between the distance from the camera 200 to the object in the real world and the value $q/p$ can be previously prepared, the distance of the segmented region (corresponding region) of the frame image can be obtained from the value $q/p$ (the ratio value $q/p$). FIG. 13(*b*) shows an example of the data indicating the correspondence between the value $q/p$ and the real distance from the camera 200 to the object.

The usage of p and q defined in a region r may be not only to obtain and use $q/p$ representing the ratio of q to p as a ratio value but also to obtain and use $\alpha r = p/q$ representing the ratio of p to q as a ratio value. In FIG. 13(*b*), the transverse axis is represented by $\alpha_r (=p/q)$, and the longitudinal axis is represented by the distance z.

Figure 14:
FIG. 14 is images showing the global distances of segmented regions calculated on the basis of calibration data.
Figure 15A:
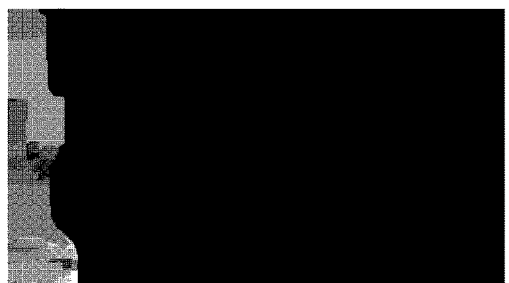
FIGS. 15(a) to 15(h) are diagrams showing a process of sequentially calculating region-specific distance data of the frame image using multiple slice images.
Figure 15B:
Figure 15C:
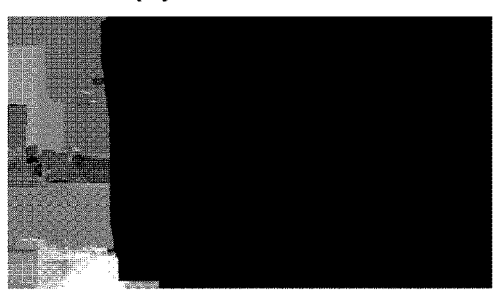
Figure 15D:
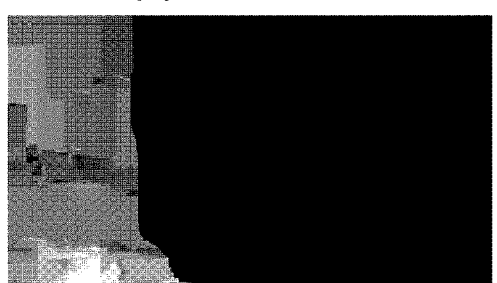
Figure 15E:
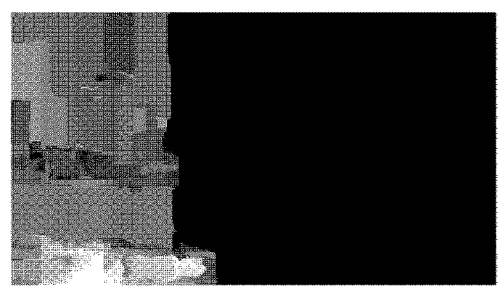
Figure 15F:
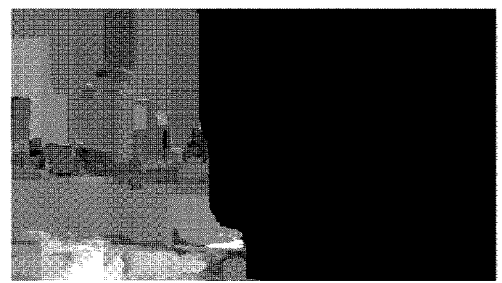
Figure 15G:
Figure 15H:
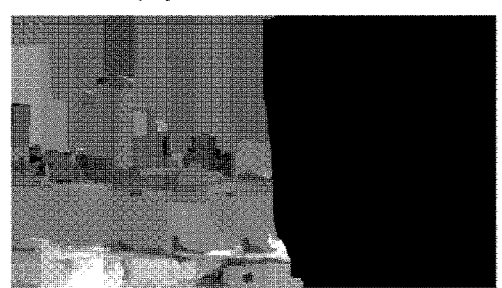

FIG. 14 is images showing, as an example, the global distances of the segmented regions (corresponding regions) obtained using a relational expression of p, q and the distance z. In the images shown in FIG. 14, those having shorter global distances of the regions segmented by the mean-shift method are shown in bright colors, and those having longer global distances thereof are shown in dark colors. Thus, the user can determine the distance from the camera 200 to the object for each segmented region (corresponding region) by checking the global distances corresponding to the colors of the segmented regions.

Next, the calculation of local distances will be described. The distance of a segmented region (corresponding region) can be calculated by calculating the global distance. However, obtaining a precise distance of each pixel in the segmented region (corresponding region) requires performing a further process. To obtain a precise distance of each pixel in the segmented region (corresponding region) as a relative distance in the segmented region (corresponding region), the CPU 104 calculates a local distance.

Consider lines in corresponding segmented regions of the frame image and slice image. The start points and end points of the lines in the segmented regions are already determined. This is because the clear correspondences between the segmented regions of the slice image obtained by the mean-shift method and the corresponding regions (segmented regions) of the frame image have been already obtained and therefore the clear corresponding edges of the segmented regions can be obtained. Accordingly, correspondences between the pixels (corresponding pixels) from the start point to the end point (from the edge of one end to the edge of the other end) of the lines in the corresponding segmented regions can be obtained by a start-end point-fixed DP matching process and a back-trace process, both of which have been used conventionally.

For example, the line in the corresponding segmented region of the slice image is represented by a(i) where i=1, 2, . . . , and I, and the line in the corresponding region (segmented region) of the frame image is represented by b(j) where j=1, 2, . . . , and J. The local distance d(i, j) is represented by d(i, j)=|a(i)−b(j)|. D(I, J) is obtained by the following Formula 8 by performing a DP matching process.

$$D(i, j) = \min \begin{cases} D(i-1, j-1) + 2d(i, j) \\ D(i-1, j-2) + 3d(i, j) \\ D(i-2, j-3) + 4d(j, j) \\ D(i-1, j-4) + 5d(i, j) \end{cases} \quad \text{Formula 8}$$

After having obtained D(I, J) by Formula 8, a back-trace process from (I, J) to (1, 1) is performed. Thus, correspondences between elements of the two lines in the segmented regions of the slice image and frame image can be obtained.

In this case, if the corresponding sequence of a j-axis is represented by a*(1), a*(2), a (3), . . . , and a*(I), the local motion parallax is represented by a*(j)−a*(j−1). The local motion parallax is motion parallax on a pixel basis, and the pixel-specific distances in the corresponding region can be obtained using the local motion parallax. As described with reference to FIG. 7, long and short distances occur between adjacent pixels in the corresponding region of the frame image due to the differences in motion parallax.

Specifically, a short distance between adjacent pixels means that the distance from the camera 200 to the object is long; a long distance between adjacent pixels means that the distance from the camera 200 to the object is short. For this reason, the difference between relative distances in the corresponding region (segmented region) can be determined from the distance between adjacent pixels (inter-pixel distance) in the corresponding region (segmented region) in the frame image.

The distance from the camera 200 to the object shown on the corresponding pixel can be obtained for each pixel of the frame image on the basis of the global distances and local distances thus obtained. Specifically, the CPU 104 calculates a precise distance of each pixel of the frame image by providing the local distance obtained in the corresponding region (segmented region) to the global distance of the corresponding region (segmented region) including the corresponding pixel (S.9 in FIG. 2).

If the distance from the camera to the object is actually calculated for each pixel of the frame image, it is preferred to cope with occlusion described above. In the present embodiment, the slice image has been generated from the moving images captured at times t of 1 to 175. In other words, the slice image has been generated from 175 frame images. For this reason, an object shown in a frame image may not be shown in the slice image; an object which is not shown in a frame image may be shown in the slice image. Such occlusion may occur more frequently as moving images from which a slice image is generated are captured over a longer time. Occurrence of occlusion may reduce the accuracy of the correspondence between the segmented region in the slice image and the corresponding region in the frame image.

FIGS. 15(a) to 15(h) are diagrams showing a case in which coordinate $x^S_0$ (S=1, 2, 3, . . . ) on the x-axis is sequentially determined in a frame image and distance data of each pixel of the frame image is sequentially calculated using multiple slice images. Note that each pixel of the frame image corresponds to multiple slice images being used in the distance data calculation. A spotting point of a frame image first calculated by a dynamic programming matching process is represented by x(T, y) (the spotting point x(T, y) corresponds to a pixel (T, y) of a slice image). A point sequence (x(T, 1), x(T, 2), x(T, 3), . . . , x(T, y), . . . , and x(T, Y)) on the y-axis of the spotting point x(T, y) is smoothed using a median filter. Then, a section-fixed dynamic programming matching process is performed between a section [1, T] of a subsequent slice image and a section [$x_0$, $x_0$+x(T, y)] of a subsequent frame image corresponding to the section of this slice image. Thus, corresponding points in the section of the frame image are calculated. By repeating this process, distance data of each corresponding pixel of the frame image is sequentially calculated using the multiple slice images. Note that the minimum value of the spotting points of the frame image obtained after having smoothing the point sequence using the median filter serves as the start value $x_0$ of a section of the frame image in a subsequent process. FIGS. 15(a) to 15(h) show a coordinate $x^S_0$ (where S represents the frequency with which the process has been repeated; S=1, 2, 3, . . . ) on the x-axis of the frame image. FIGS. 15(a) to 15(h) show a state in which the range of the frame image whose distance has been calculated is expanded little by little on the basis of the slice images.

Figure 16A:
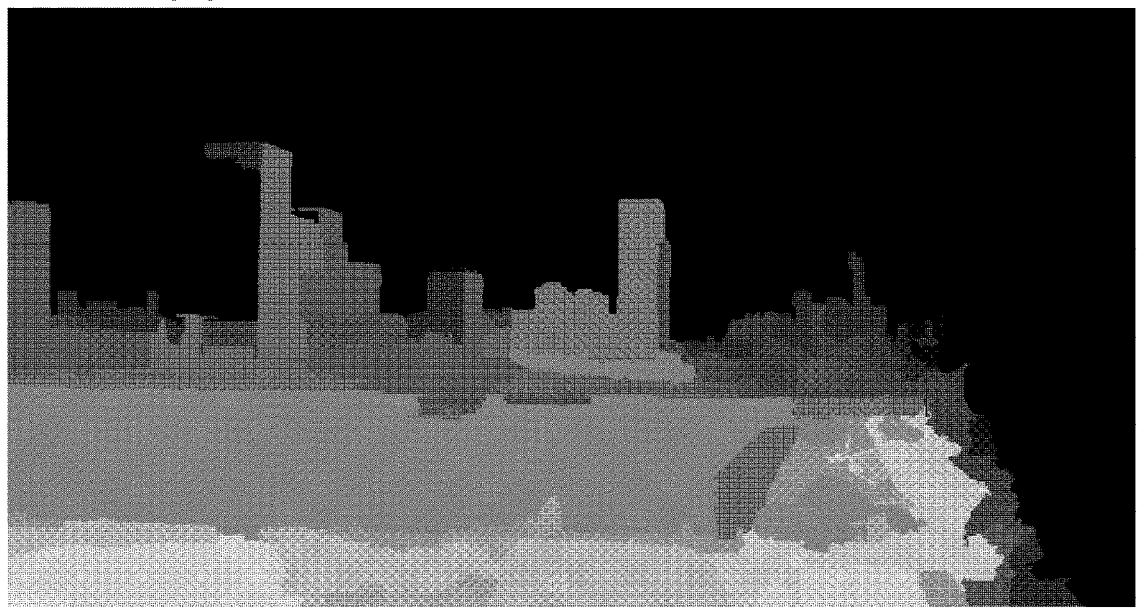
FIG. 16(a) is a diagram showing an image obtained by mosaicing multiple images (distance image sequence) obtained on the basis of FIGS. 15(a) to 15(h)
Figure 16B:
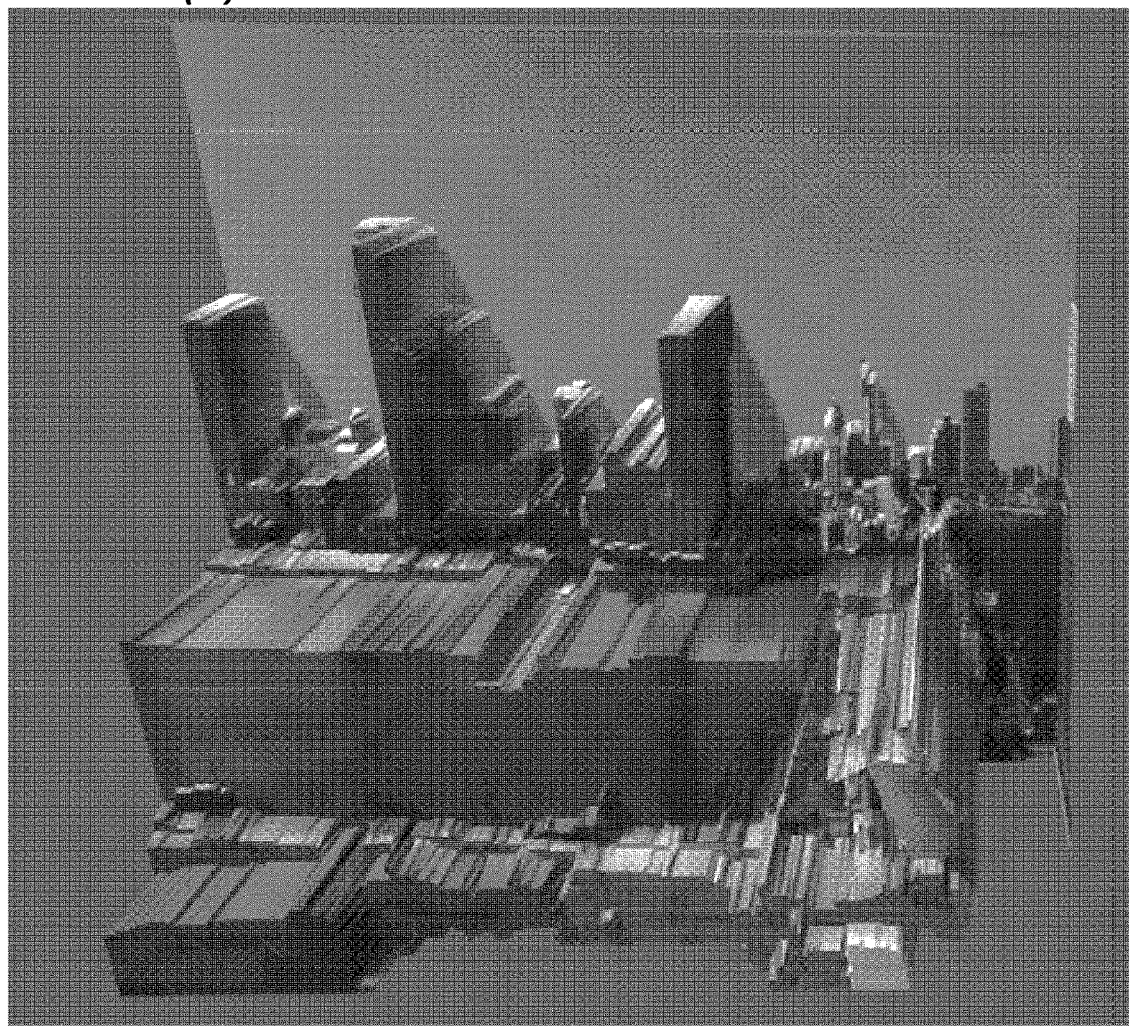
FIG. 16(b) is a perspective view obtained by providing the RGB values of pixels to a 3D image where the global distance of each region is calculated on the basis of the image shown in FIG. 16(a).

FIG. 16(a) shows an image obtained by mosaicing multiple images. FIG. 16(b) is a perspective view of data obtained by calculating the global distance of each region of the image shown in FIG. 16(a) and providing the R, G, B values of each pixel of a frame image to the resulting image. As shown in FIG. 16(b), three-dimensional distance information is extracted from each region.

The length of a frame image in the transverse-axis (x-axis) direction may be increased as the camera moves. In this case, the following method may be used: a frame image captured after the camera has moved for a predetermined time is used as a new frame; a slice image is obtained on the basis of the new frame image; and the distance of each pixel is calculated. As seen above, by reproducing slice images on the basis of multiple frame images and calculating the distance of each pixel, the distance from the camera 200 to the object can be calculated in a wider image-capture range. On the other hand, if the distance of each pixel is calculated on the basis of multiple frame images as described above, mosaicing has to be performed considering the range of the pixels whose distances have been calculated, of the frame images.

However, the pixels of an image to be mosaiced each have a total of four element values: an R value, a G value, a B value (RGB information), and a distance value (distance information). Accordingly, a stitching algorithm, which is a typical mosaicing method, cannot be used. For this reason, a new method is proposed below.

Consider a case in which frame images that have common image portions and have been captured at different times are combined by an overlapping process. A stitching algorithm is known as a typical method of generating one image from two images by performing an overlapping process on common image portions. A stitching algorithm is a well-known image combination technique, and is provided by a widely released open-source computer vision library called OpenCV (Open Source Computer Vision Library) and therefore is available to anyone. A stitching algorithm involves combining images using color information (hereafter referred to as "RGB information") of the images.

As described above, the distance information is provided to the corresponding pixels of the frame image matched with the slice image. That is, a frame image according to the present embodiment is characterized in that RGB information is provided to all pixels and, further, distance information is provided to matched pixels thereof.

However, the above stitching algorithm combines images on the basis of RGB information alone. Accordingly, if two frame images are simply combined using the stitching algorithm, the images are combined without considering distance information. For this reason, it is not possible to determine that the combined frame images sufficiently reflect (or maintain) the distance information of the yet-to-be-combined frame images.

In view of the foregoing, there will be described a combination process of generating one panorama image that sufficiently reflects (or maintains) not only RGB information but also distance information correspondence by applying a stitching algorithm to two frame images storing RGB information and distance information.

Two frame image combination processes are conceivable. A first process is a process of combining frame images whose pixels are provided with RGB information and distance information of the segmented regions. For example, this process is a process in which the image distance calculator 100 combines frame images obtained by obtaining correspondences between the regions of a slice image and the regions of a frame image and calculating the global distance of each region. In this case, the local distance of each pixel of each region is not calculated. Accordingly, distance information of the pixels in the same region can be determined to represent the same distance value.

A second method is a process of combining frame images whose all pixels are provided with RGB information and precise distance information. For example, this process is a process of combining frame images whose pixels are provided with precise distance values obtained by calculating not only the global distance of each region but also the local distance of each pixel of each region and providing the local distances to the global distance. In this case, all the pixels of the frame images are provided with the precise distances from objects shown on the pixels to the camera 200 (global distance+local distance).

A combination process considering distance information will be described with respect to each of the above two processes.

Figure 17:
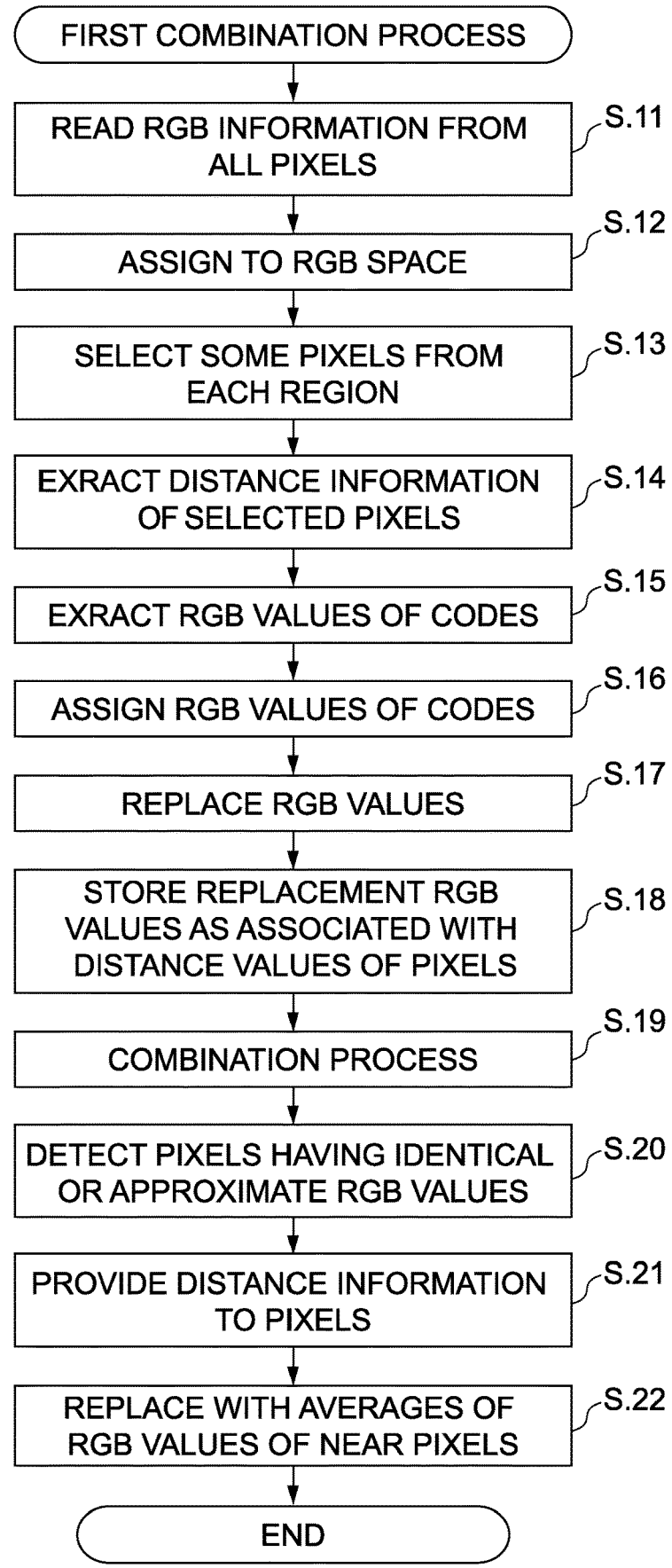
FIG. 17 is a flowchart showing a first combination process.

(1) A Process of Combining Frame Images Whose Pixels are Provided with RGB Information and Distance Information of the Segmented Regions FIG. 17 is a flowchart showing a process of combining frame images whose pixels are provided with RGB information and distance information of the segmented regions (first combination process). The CPU 104 of the image distance calculator 100 reads RGB information from all pixels of two frame images to be combined (S.11 in FIG. 17). The CPU 104 then assigns the read RGB information to an RGB space consisting of an R-axis, a G-axis, and a B-axis (S.12 in FIG. 17).

Figure 18:
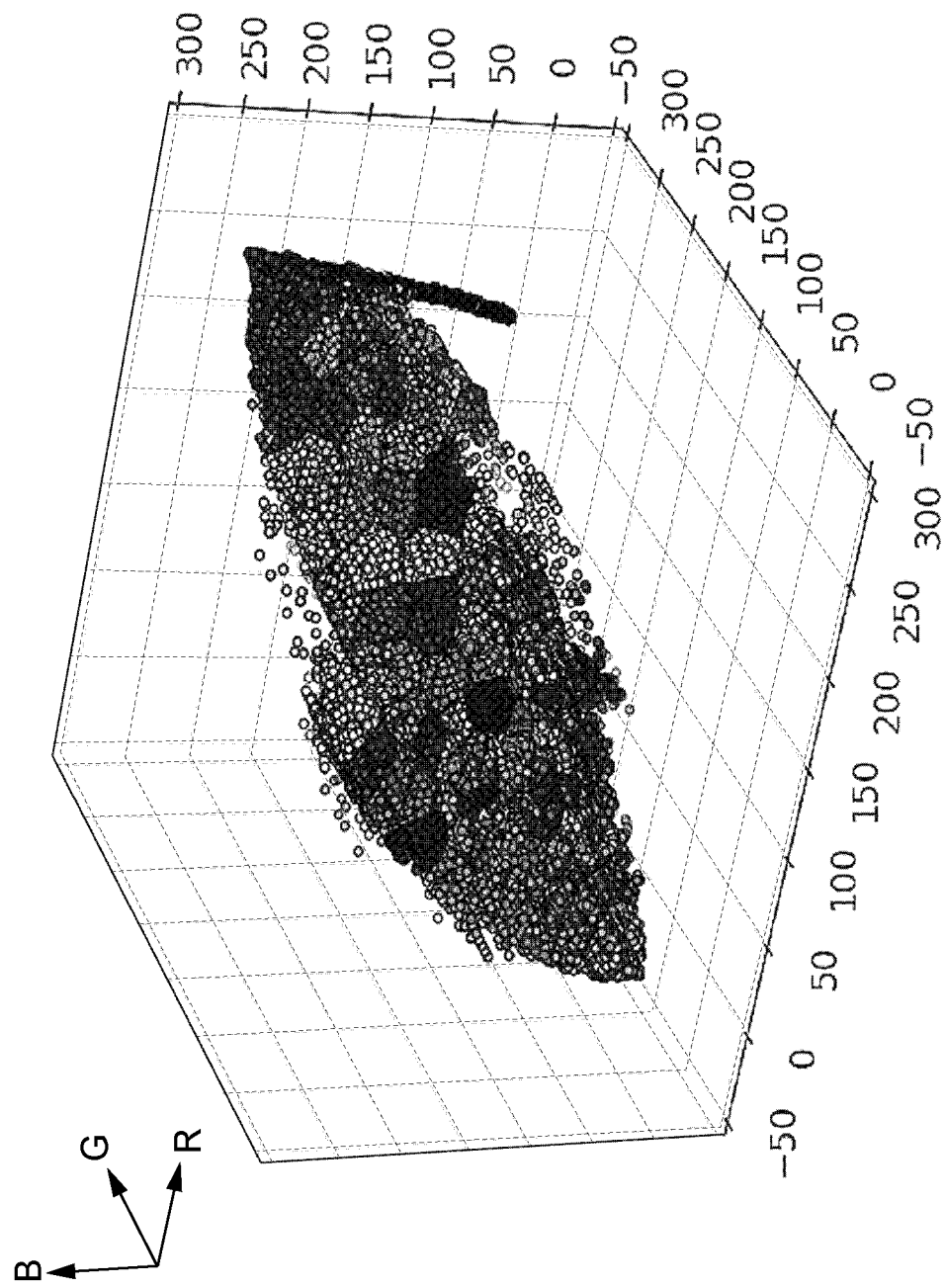
FIG. 18 is a diagram showing a state in which RGB information of all the pixels of two frame images is assigned to an RGB space.

FIG. 18 is a diagram showing a state in which the RGB information of all the pixels of the two frame images is assigned to the RGB space consisting of the R-axis, G-axis, and B-axis. As shown in FIG. 18, even if the RGB information of all the pixels of the frame images is assigned to the RGB space, there exist unused RGB space coordinates. For example, RGB information in positions around the outside of the RGB space is unused in the two frame images. Hereafter, points in the RGB space that represent RGB values unused in the frame images will be referred to as codes.

As described above, the pixels in each region of the frame images are considered as having the same distance information (distance value). For this reason, the CPU 104 selects some (e.g., 3 to 5) pixels from each region (S.13 in FIG. 17) and extracts distance information of the selected pixels (the global distance of the region in which the selected pixels exist) (S.14 in FIG. 17, pixel distance value extraction step, pixel distance value extraction function).

The CPU 104 then extracts multiple pieces of RGB information (R value, G value, B value) of the codes (S.15 in FIG. 17, code detection step, code detection function). The CPU 104 then assigns the extracted RGB information values of the codes (the RGB values of the codes) to the distance information values (distance values) (S.14 in FIG. 17) extracted from each region of the frame images (S.16 in FIG. 17, code RGB value assignment step, code RGB value assignment function). Note that the extracted RGB information values of the codes are RGB information values of codes which are yet to be assigned to the distance information values.

The CPU 104 then obtains pixels having the same distance values as the distance values to which the RGB values of the codes have been assigned, from the pixels of the two frame images and replaces the RGB values of the obtained pixels with the RGB values of the codes assigned to the distance values (S.17 in FIG. 17, RGB value replacement step, RGB value replacement function).

The CPU 104 then stores the RGB values as replacements in the RAM 103 or storage 101 in such a manner that the RGB values are associated with the distance values of the pixels whose RGB values have been replaced (S.18 in FIG. 17, pixel information storage step, pixel information storage function).

Figure 19:
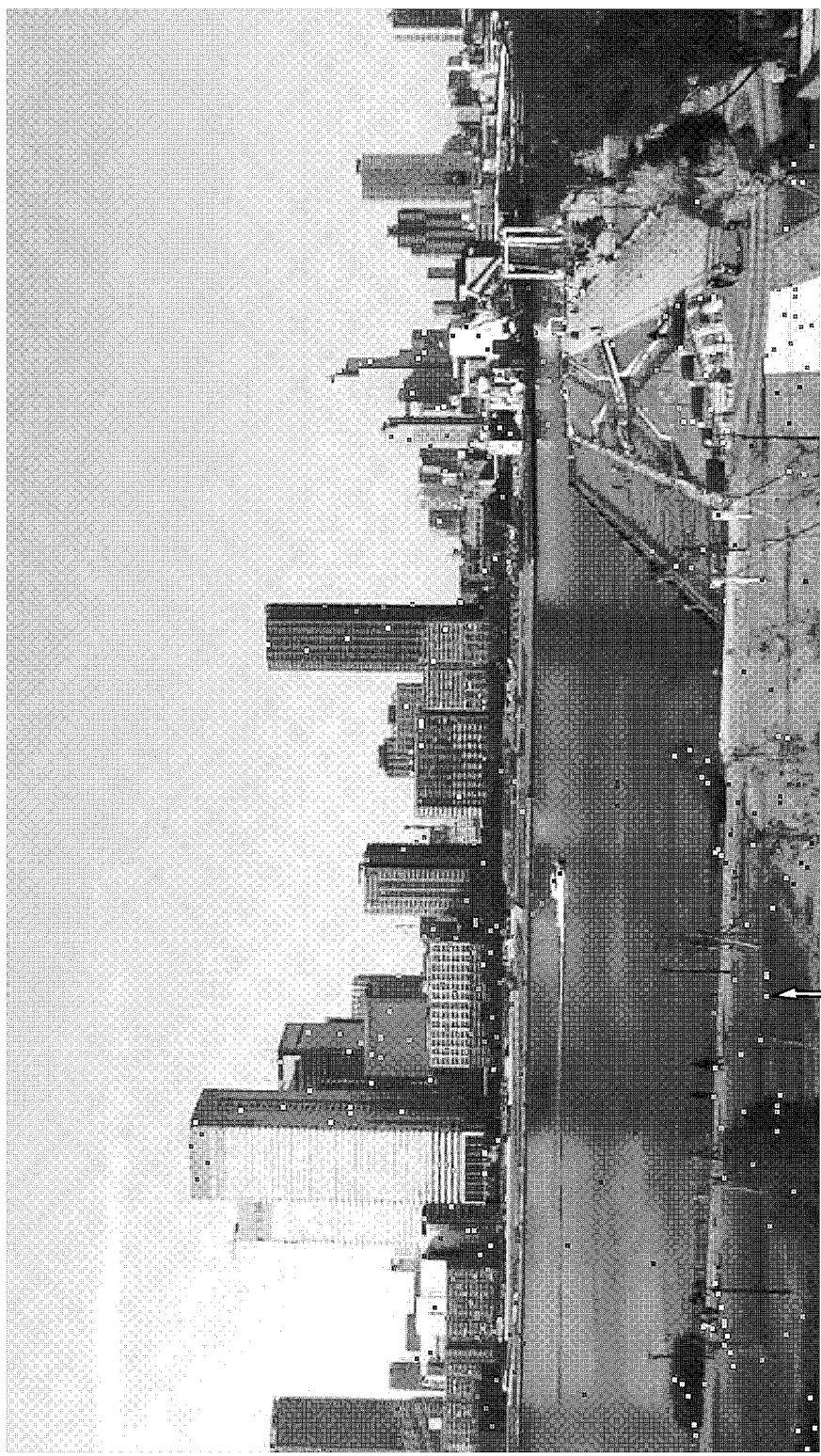
FIG. 19 is a diagram showing one frame image where the RGB information values of some pixels have been replaced with the RGB information values of codes.
Figure 20:
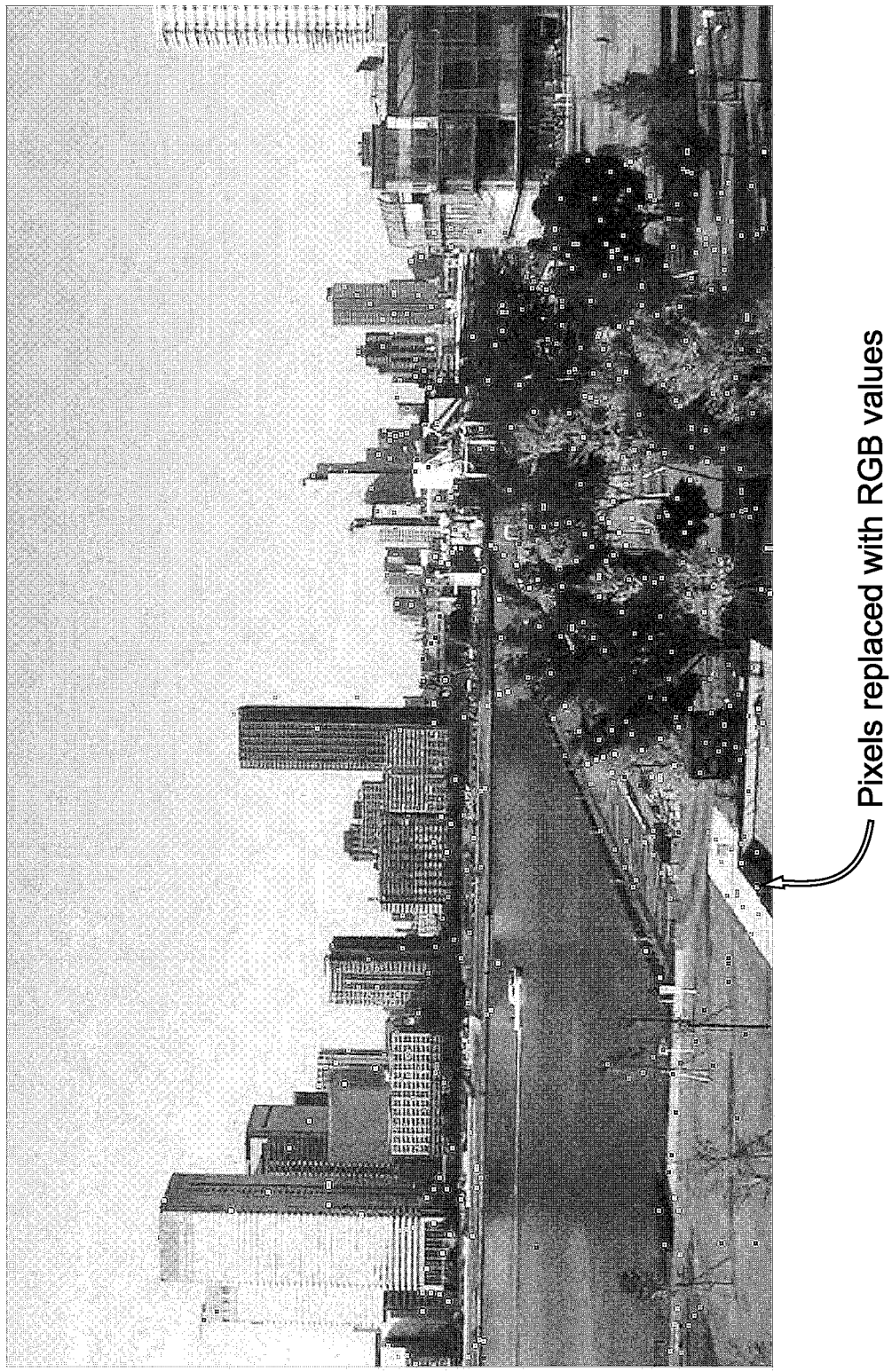
FIG. 20 is a diagram showing another frame image where the RGB information values of some pixels have been replaced with the RGB information values of codes.

FIG. 19 shows one frame image the RGB values of whose some pixels have been replaced with the RGB values of the codes. FIG. 20 shows another frame image the RGB values of whose some pixels have been replaced with the RGB values of the codes. Since the new RGB values are RGB values that are unused in the original frame images, the colors of those pixels obviously differ from the colors (RGB values) of the other pixels in the same region.

As shown in FIGS. 19 and 20, in the two frame images to be combined, the RGB information of some pixels in the same region is replaced with the RGB values of the codes. By replacing the RGB values in this manner, there are generated RGB images (frame images) where the distance information (distance values) is associated with the RGB values of the codes.

The CPU 104 then combines the generated two RGB images (frame images) by applying a stitching algorithm to the two RGB images (S.19 in FIG. 17, combination image generation step, combination image generation function). For convenience, the image resulting from the combination by the stitching algorithm will be referred to as the "combination image."

The single combination image is generated from the two RGB images by the combination process. The combination image includes the pixels having the distance information associated with the RGB values of the codes. The associated RGB values of the pixels tend to vary somewhat by the combination process. However, the RGB values of the codes are RGB values unused in the frame images and are assigned to the distance values without overlap. For this reason, even if the RGB values vary somewhat by the combination process, it is easy to guess the pixels concerned from the RGB values of the combination image and to extract them. The CPU 104 then detects pixels having RGB values equal or approximate to the RGB values (color values) in the combination image from the RGB values of the codes assigned to the distance information (S.20 in FIG. 17, RGB value detection step, RGB value detection function).

The CPU 104 provides the distance values associated with the RGB values stored in the RAM 103 or storage 101 to the detected pixels as distance information of the pixels (S.21 in FIG. 17, distance information providing step, distance information providing function).

As described above, the RGB values of the pixels provided with the distance information are replaced with the RGB values unused in the frame images and then a combination process is performed using the stitching algorithm. Thus, the two frame images can be combined in such a manner that not only the RGB information (RGB values) but also the distance information (distance values) is sufficiently reflected (or maintained).

The color information (RGB information) of the pixels provided with the distance information in the combination image is RGB color information unused in the frame images to which the stitching algorithm has yet to be applied. Accordingly, the pixels are shown in colors (RGB values) that obviously differ from those of neighboring pixels. For this reason, the CPU 104 replaces the RGB values of the pixels provided with the distance information with the averages of the RGB values of pixels (e.g., neighboring four or eight pixels) near the pixels (S.22 in FIG. 17, RGB value change step, RGB value change function). By replacing the RGB values of the pixels provided with the distance information with the averages of the RGB values of the near pixels, the user would not feel the difference between the color information (RGB values) of the pixels concerned and neighboring colors.

Figure 21:
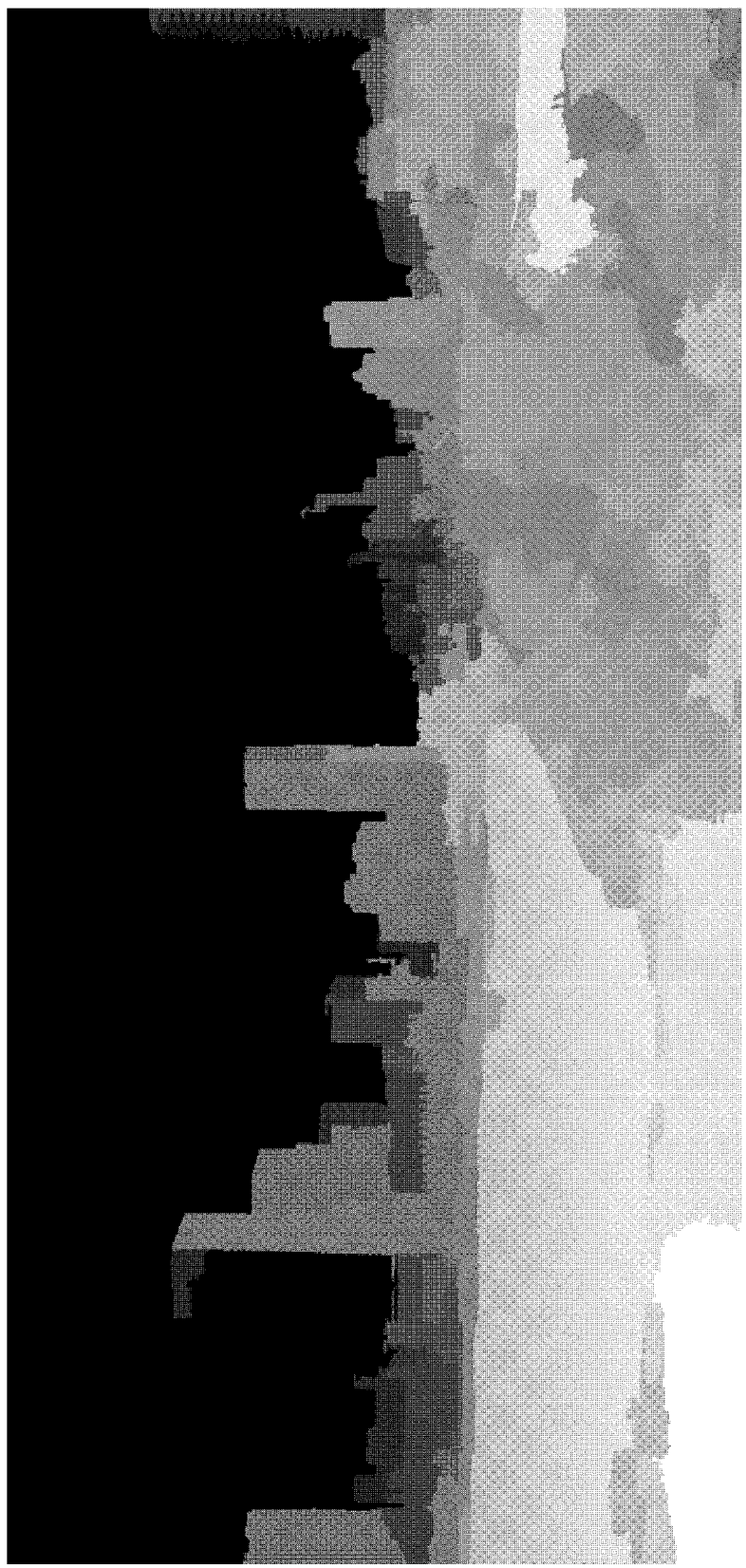
FIG. 21 is a diagram obtained by applying the mean-shift method to a combination image.

After having replaced the RGB values of the pixels to which the RGB values of the codes have been assigned, with the averages of the RGB values of the near pixels in the combination image, the mean-shift method is applied to the combination image again. By applying the mean-shift method, the segmented regions of the frame image can be obtained on the basis of RGB information. FIG. 21 is a diagram showing an example of a slice image that has been segmented into regions by applying the mean-shift method to the combination image. By obtaining the average of the distances using the pixels provided with the distance information, of the pixels in the regions, the distance of each region (global distance) can be obtained.

Figure 22:
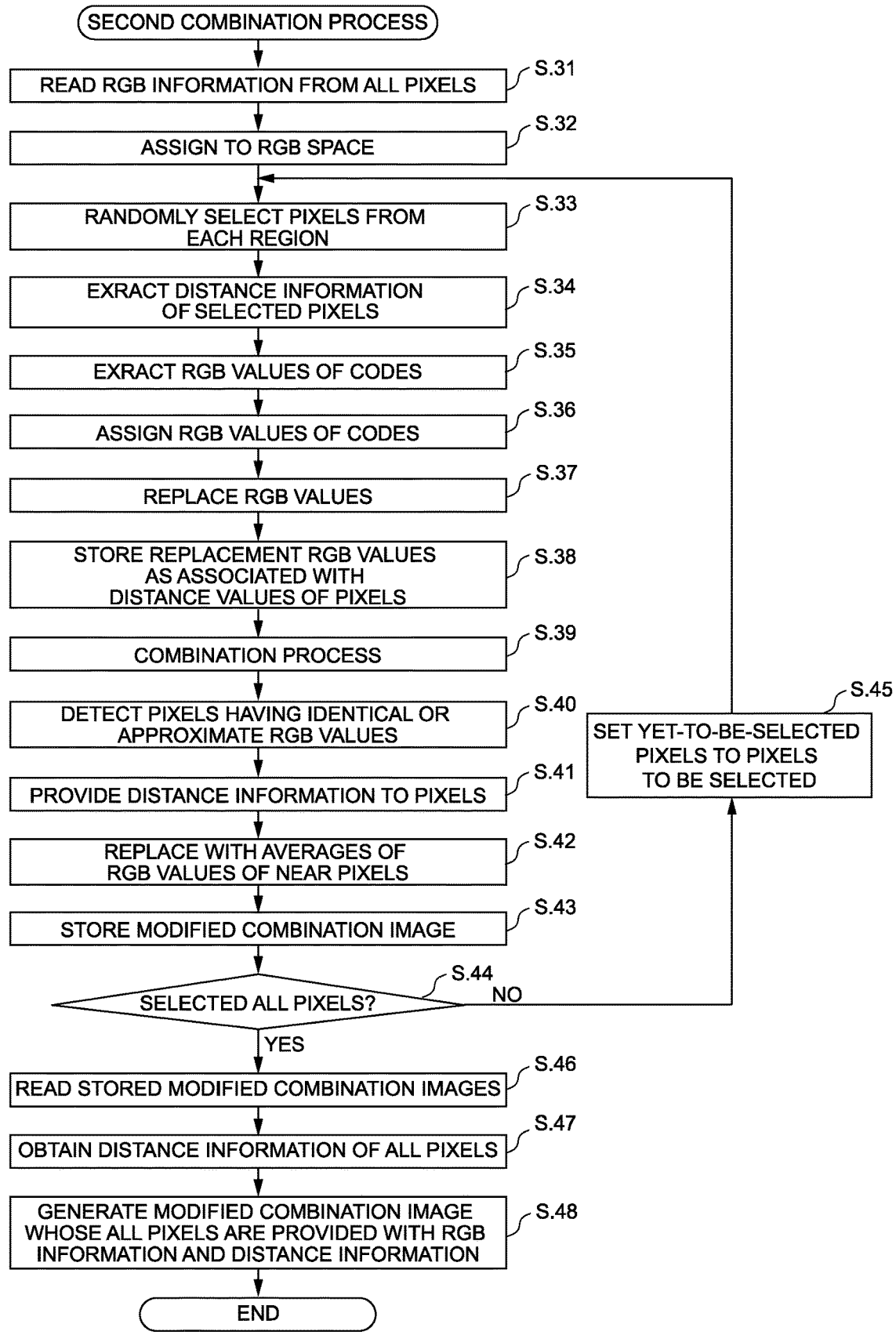
FIG. 22 is a flowchart showing a second combination process.

(2) A Process of Combining Frame Images Whose all Pixels are Provided with RGB Information and Precise Distance Information FIG. 22 is a flowchart showing a process of combining frame images whose pixels are provided with RGB information and distance information (second combination process). First, as in "(1) A process of combining frame images whose pixels are provided with RGB information and distance information of the segmented regions" described above, the CPU 104 reads RGB information from all pixels of two frame images to be combined (S.31 in FIG. 22). The CPU 104 then assigns the read RGB information to an RGB space consisting of an R-axis, a G-axis, and a B-axis (S.32 in FIG. 22). Even if the RGB information is assigned to the RGB space, there exist coordinates unused in the RGB space. As described above, points in the RGB space representing the R, G, B values unused in the frame images are referred to as codes.

All pixels of the frame images to be combined are provided with RGB information (RGB values) and distance information (distance value). This distance information does not represent the distance of a region. Accordingly, it is not possible to use a method of selecting some pixels having the same distance information, such as the above method (1).

For this reason, the CPU 104 randomly selects a certain percentage, for example, 5% (if N=20, 1/N=5% where N is an integer) of the pixels of the two frame images to be combined (S.33 in FIG. 22) and extracts distance information (distance value) of the selected pixels (S.34 in FIG. 22, pixel distance value extraction step, pixel distance value extraction function).

The CPU 104 then extracts multiple pieces of RGB information (R value, G value, B value) of the codes (S.35 in FIG. 22, code detection step, code detection function). The CPU 104 then assigns the extracted RGB information values of the codes (the RGB values of the codes) to the extracted distance information values (distance values) of the pixels (S.36 in FIG. 22, code RGB value assignment step, code RGB value assignment function). Note that the extracted RGB information values of the codes are RGB information values of codes which are yet to be assigned to the distance information values.

The CPU 104 obtains pixels having the same distance values as the distance values to which the RGB values of the codes have been assigned, from the pixels of the two frame images and replaces the RGB values of the obtained pixels with the RGB values of the codes assigned to the distance values (S.37 in FIG. 22, RGB value replacement step, RGB value replacement function). By replacing the RGB values, there are generated RGB images (frame images) where the distance information is associated with the RGB values of the codes.

The CPU 104 then stores the RGB values as replacements in the RAM 103 or storage 101 in such a manner that the RGB values are associated with the distance values of the pixels whose RGB values have been replaced (S.38 in FIG. 22, pixel information storage step, pixel information storage function).

The CPU 104 then combines the two RGB images (frame images) where color information (RGB values) of 5% of the pixels has been replaced, by applying a stitching algorithm to the two RGB images (S.39 in FIG. 22, combination image generation step, combination image generation function). As described above, the image resulting from the combination by the stitching algorithm is referred to as the "combination image."

The single combination image is generated from the two RGB images by the combination process. The combination image includes the pixels that have the distance information associated with the RGB values of the codes and whose percentage with respect to the total pixel number is 5%. As described above, the associated RGB values of the pixels tend to vary somewhat by the combination process. The CPU 104 then detects pixels having RGB values equal or approximate to the RGB values (color values) in the combination image from the RGB values of the codes assigned to the distance information (S.40 in FIG. 22, RGB value detection step, RGB value detection function).

The CPU 104 then provides the distance values associated with the RGB values stored in the RAM 103 or storage 101, to the detected pixels as distance information of the pixels (S.41 in FIG. 22, distance information providing step, distance information providing function).

The color information (RGB information) of the pixels provided with the distance information in the combination image is shown in colors (RGB values) that obviously differ from those of neighboring pixels. For this reason, the CPU 104 replaces the RGB values of the pixels provided with the distance information with the averages of the RGB values of pixels (e.g., neighboring four or eight pixels) near the pixels (S.42 in FIG. 22, modified combination image generation step, modified combination image generation function). By replacing the RGB values of the pixels provided with the distance information with the averages of the RGB values of near pixels, the user would not feel the difference between the color information (RGB values) of the pixels concerned and neighboring colors. The combination image whose RGB values have been modified using the averages of the RGB values of the near pixels, as described above, is referred to as the "modified combination image."

As described above, the RGB values of the randomly selected some pixels (5% of all the pixels) are replaced with the RGB values unused in the frame images and then a combination process is performed using the stitching algorithm. Thus, the two frame images can be combined in such a manner that not only the RGB information but also the distance information (distance values) is reflected (or maintained).

Note that while 5% of all the pixels of the modified combination image is provided with RGB information and distance information, the remaining 95% pixels are provided with RGB information alone. Accordingly, sufficient distance information is not reflected (or maintained) on all the pixels.

After having replaced the RGB values (S.42 in FIG. 22), the CPU 104 stores the modified combination image in the RAM 103 or storage 101 (S.43 in FIG. 22). The CPU 104 then determines whether all the pixels of the two frame images have been selected by the process of randomly selecting 5% of all the pixels (S.33) (S.44 in FIG. 22). If not all the pixels have been selected (No in S.44 of FIG. 22), the CPU 104 sets the yet-to-be-selected pixels of all the pixels to pixels to be selected in S.33 (S.45 in FIG. 22) and proceeds to S.33. That is, if not all the pixels have been selected, the CPU 104 randomly selects 5% of all the pixels of the frame images from the yet-to-be-selected pixels (S.33 in FIG. 22). Then, the CPU 104 repeats the above modified combination image generation process (S.34 to S.44 in FIG. 22).

If all the pixels are selected (Yes in S.44 of FIG. 22), the CPU 104 reads all the modified combination images (20 modified combination images if 5% of all the pixels are selected) stored in the RAM 103 or storage 101 (S.46 in FIG. 22). The read 20 modified combination images are provided with the distance information in such a manner that pixels provided with the distance information in one modified combination image are not provided with the same distance information in another modified combination image. Five percent of all the pixels of each modified combination image are provided with the distance information. Thus, the CPU 104 obtains the distance information of all the pixels without overlap by stacking the 20 modified combination images (S.47 in FIG. 22). The CPU 104 then provides the distance information of all the pixels to one modified combination image and thus generates a modified combination image in which all the pixels are provided with the RGB information and distance information (S.48 in FIG. 22, distance-provided combination image generation step, distance-provided combination image generation function).

As described above, by replacing the RGB values provided with the distance information with the RGB values (RGB information) of the codes and then applying the stitching algorithm, the multiple frame images can be combined considering the RGB information and distance information. Thus, one panorama image can be generated on the basis of wide-range moving images captured by the camera.

For example, in obtaining the distance to the object on the basis of moving images of a wide scene or the like captured by a moving camera, multiple frame images storing RGB information and distance information can be extracted in accordance with the time during which the moving images have been captured. Of the extracted multiple frame images, previous and subsequent frame images have common image portions. Thus, by combining the frame images using the common image portions as references, the captured wide-range moving images can be formed into one panorama image. Also, by using this panorama image, the distances to objects in a wider range than that of each yet-to-be-combined frame image can be obtained.

As described above, the CPU 104 of the image distance calculator 100 according to the present embodiment obtains a frame image at a particular time from moving images captured by one moving camera. The CPU 104 then generates a slice image consisting of the longitudinal axis (y-axis) of the frame image and the time axis (t-axis) of the captured moving images, using any x-coordinate position on the transverse axis (x-axis) of the frame image as a reference. The CPU 104 then obtains correspondences between pixels of the slice image at time t and pixels on a pixel line on the longitudinal axis (y-axis) at a predetermined x-coordinate in the frame image by a line-to-image DP matching process and calculates a spotting point in the frame image. The CPU 104 then obtains clear pixel-to-pixel correspondences between the frame image and slice image by performing a back-trace process from the obtained spotting point.

The CPU 104 then segments the frame image and slice image into regions by applying the mean-shift method thereto and then obtains correspondences between the segmented regions of the slice image and the segmented regions of the frame image on the basis of pixel-to-pixel correspondences between the frame image and slice image. The CPU 104 then obtains the global distance and local distances of the corresponding region of the frame image and adds up the global distance and local distances. Thus, the CPU 104 can calculate the distance from the camera 200 to the object for each pixel of the frame image.

In particular, the image distance calculator 100 according to the present embodiment can calculate the distance of each pixel of the moving images (frame images) captured by the single camera alone. Thus, unlike in the stereo vision method, it is not necessary to simultaneously capture images of objects using two cameras or to keep the distance between two cameras constant. As a result, it is easy to simplify the image-capture equipment and to reduce the image capture-related burden compared to when calculating the distance to an object using the stereo vision method.

Also, a frame image and a slice image can be easily generated from moving-image data as long as moving images are captured by one camera which is moving relative to objects in any direction.

Also, as long as moving images are captured by the camera 200 which is moving relative to objects in any direction, motion parallax accumulated with the movement is stored in a slice image as a compressed image (pixels). For this reason, the distance of each pixel of a frame image can be easily calculated on the basis of moving images captured by a typical camera without having to use dedicated image-capture equipment or the like.

Since the distance of each pixel can be easily obtained on the basis of moving images captured by a typical camera, the distance of each pixel can be obtained on the basis of, for example, moving images captured in the past. Thus, it is possible to easily calculate the distance from the camera to an object on the basis of an enormous amount of moving-image data captured in the past and thus to reproduce the then image-capture environments.

There has been actively studied and applied in recent years the virtual reality (VR) technology that causes the user wearing goggles to experience a pseudo-three-dimensional world by causing the user to view moving images that uses the disparity between the left and right eyes. The three-dimensional world experienced by the user through the VR technology only looks three-dimensional and does not exist actually. One application of the VR technology can involve calculating the distances to objects shown in moving images captured by a camera, using the image distance calculator 100 and constructing a wide-range three-dimensional data world, such as an indoor space, outdoor space, urban area, or mountainous area, in which a human can move actually, on the basis of the calculated distances. By constructing such a data world on the basis of moving images captured by a camera, the application field or use field of the VR technology can be greatly changed. Use of the image distance calculator 100 according to the present embodiment can facilitate the construction of such a three-dimensional space.

Since a three-dimensional space can be easily constructed on the basis of moving images captured by a typical camera, for example, three-dimensional space data based on a real streetscape can be constructed on the basis of moving images captured from a traveling vehicle, or a wide-range situation in the air can be constructed as three-dimensional space data on the basis of moving images captured by a camera mounted on a drone.

The image distance calculator and the computer-readable, non-transitory storage medium storing an image distance calculation program according to the present invention have been described in detail with reference to the drawings. However, the image distance calculator and the computer-readable, non-transitory storage medium storing an image distance calculation program according to the present invention are not limited to the examples described in the embodiment. Those skilled in the art can conceive of various changes or modifications thereto without departing from the scope set forth in the claims.

The image distance calculator 100 according to the embodiment has been described assuming that the camera 200 is moved in the transverse direction. However, the image distance calculator and the computer-readable, non-transitory storage medium storing an image distance calculation program according to the present invention can calculate the distance to an object as long as a frame image and a slice image are generated on the basis of moving images captured by a moving camera and the object shown in the frame image is stored in the slice image in a compressed state with the movement of the camera.

Accordingly, the moving direction of the camera capturing moving images need not necessarily be the transverse direction and may be the vertical direction or oblique direction. Also, even if the camera is moved with the lens thereof directed in an oblique direction (e.g., the camera is moved with the lens directed in a front-left direction, front-right direction, rear-left direction, or rear-right direction with respect to the traveling direction of the camera), an object shown in a frame image is stored in a slice image in a compressed state with the movement of the camera. Thus, the distance from the camera to the object can be calculated for each pixel.

Also, the method by which the image distance calculator 100 according to the embodiment calculates a global distance, which represents the distance from the camera 200 to an object, for each of the segmented regions obtained using the mean-shift method has been described. That is, first, the enlargement ratio q/p of a frame image to a slice image is obtained where p represents the average length in the transverse direction of one region of the slice image and q represents the average length in the transverse direction of the corresponding region of the frame image; a formula representing the correspondence between the region-specific distance from the camera 200 to an object in the real world and the value q/p is theoretically calculated (see FIG. 13(b)); and the distance from the camera 200 to the object is calculated for each region using this correspondence formula. A distance range required to generate the correspondence formula can be said to be more often determined by human intuition than by measuring the distance range directly.

Examples of a distance function include:

Distance $Z(p,q)=1192.4 \cdot \exp(-0.366(q/p))$

A method for determining the distance function on the basis of a new theoretical ground rather than by human intuition will be described below.

[Distance Function for Obtaining Global Distance]

Figure 23:
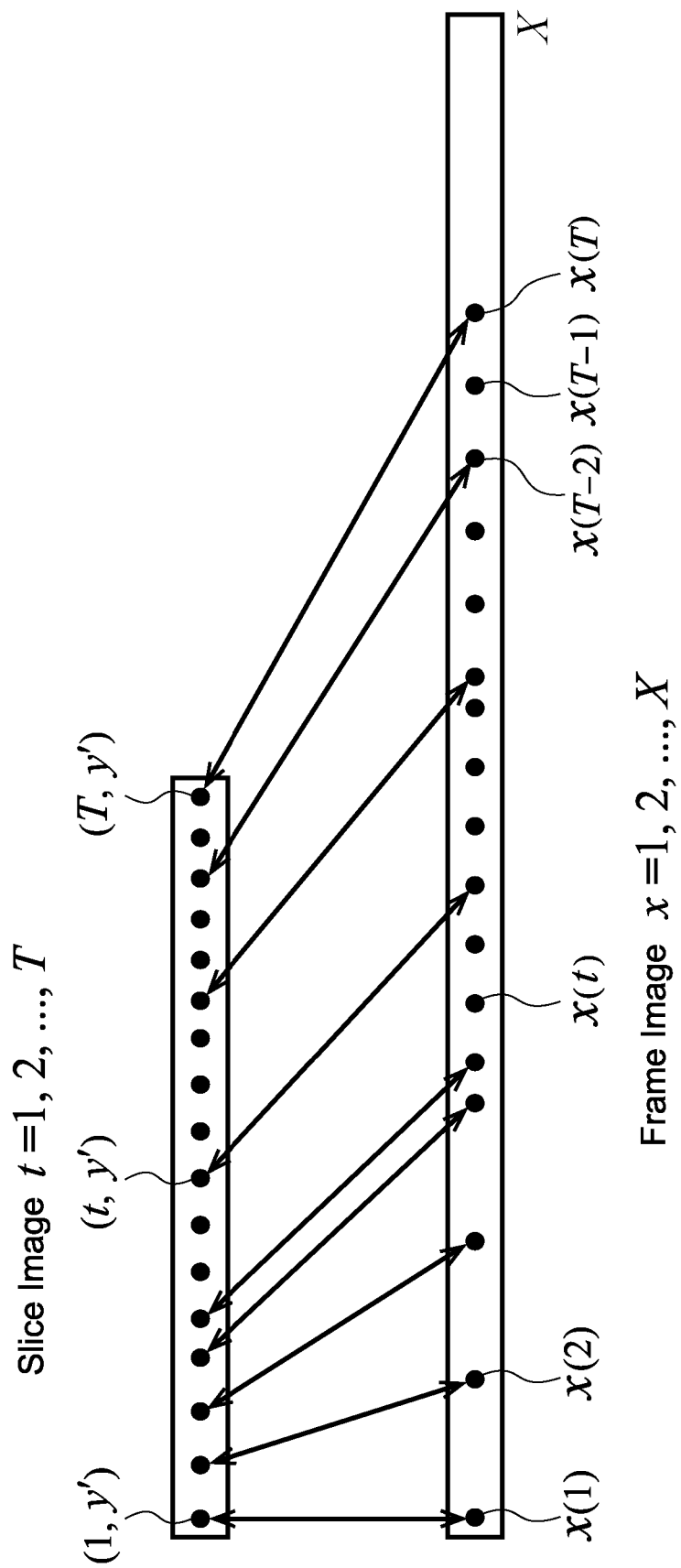
FIG. 23 is a diagram showing correspondences between multiple pixels on the transverse axis of the slice image and corresponding multiple pixels on the transverse axis of the frame image.

FIG. 23 is a diagram showing the relationship between multiple pixels on the transverse axis (t-axis direction) from coordinates (1, y) to coordinates (T, y') of a slice image and multiple pixels on the transverse axis (x-axis direction) of a frame image corresponding to the pixels of the slice image. A black-circle pixel shown in the frame image in FIG. 23 is represented by x(t). A black-circle pixel x(t) is a pixel in which motion parallax has been accumulated from time t=1 to time t=t. That is, x(t) represents accumulated motion parallax. Since the number of black-circle pixels x(t), which each represent accumulated motion parallax, corresponds to the number of times t (t=1, 2, . . . , and T) on the time axis of the slice image, there are T number of pixels x(t). While the number of the pixels on the transverse axis of the slice image is T, the number of the pixels on the transverse axis of the frame image is more than T. Accordingly, not all pixels on the transverse axis of the frame image are shown as black-circle pixels x(t) in FIG. 23.

Figure 24:
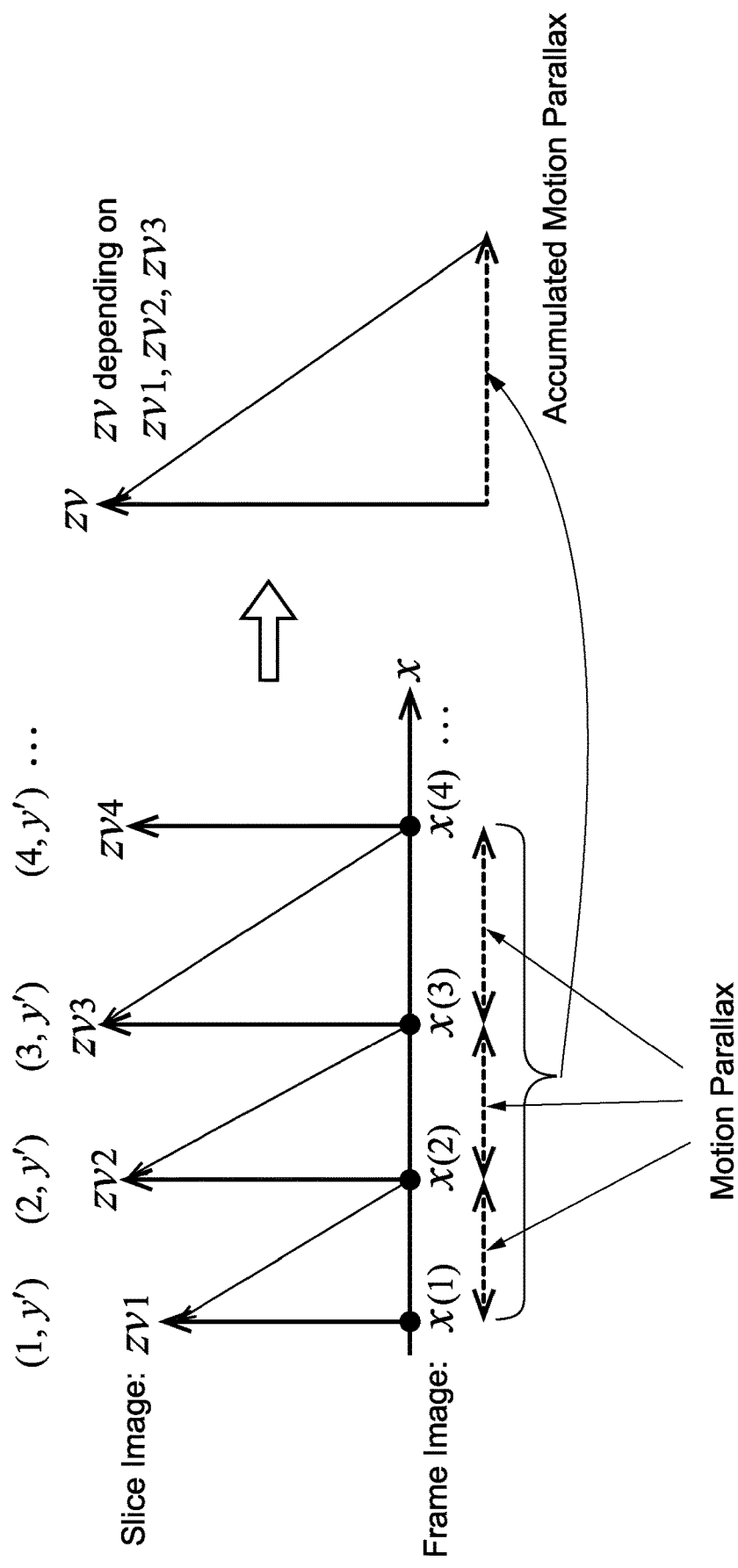
FIG. 24 is a diagram showing the relationship between motion parallax on the frame image corresponding to pixels adjacent in the transverse direction in the slice image and accumulated motion parallax obtained by accumulating each motion parallax.

FIG. 24 includes diagrams showing the relationship between motion parallax and accumulated motion parallax. As an example, a left diagram of FIG. 24 shows correspondences between pixels (1, y') to (4, y') on the transverse axis (t-axis) of a slice image and pixels (x(1), y') to (x(4), y') on the transverse axis (x-axis) of a frame image. Black circles shown in the left diagram of FIG. 24 represent pixels in the frame image, and distances exist between adjacent previous and subsequent pixels. On the other hand, the pixels in the slice image are continuously adjacent to each other. Accordingly, no distance exists between previous and subsequent pixels, and the four pixels are continuous. For convenience, the pixels of the slice image are not shown in the left diagram of FIG. 24.

While the moving camera 200 captures images of an object, the image-capture position is moved at predetermined time intervals, as shown in the left diagram of FIG.

24. The distances between the black-circle pixels of the frame image shown in the left diagram of FIG. 24 correspond to the amounts of change in the moving image-capture position. The amount of change in the image-capture position corresponds to motion parallax. For this reason, the distance between pixel (black circle) positions of the frame image represents motion parallax relative to an object when one pixel varies in the slice image.

Since motion parallax relative to an object is represented by the distance between adjacent black-circle pixels (inter-pixel distance), the position of a pixel of the frame image shown by a black circle represents motion parallax accumulated with the movement of the image-capture position. The reason why the distances between the black circles differ from each other is that the camera 200-to-object distances corresponding to the respective black circles differ from each other.

The distance to an object that is present in front of the camera is changed with the movement of the image-capture position. As an example, the left diagram of FIG. 24 shows a case in which when the position of a black-circle pixel of the frame image is changed from x(1) to x(4) in accordance with the image-capture position of the camera 200, the distance from the camera 200 to the object is changed from zv1 to zv2, zv3, and then zv4.

A right diagram of FIG. 24 is a diagram showing an aspect in which when the positions of the four pixels of the frame image corresponding to the four points, t=1, t=2, t=3, and t=4, on the transverse axis (t-axis) of the slice image are changed from x(1) to x(4), the distance differences between adjacent black circles are accumulated in x(1) to x(4). The right diagram of FIG. 24 shows the distance obtained by subtracting the pixel position represented by x(1) from the pixel position represented by x(4), as the length of the transverse line. The length of the transverse line of the right diagram corresponds to a length obtained by accumulating the distance differences between adjacent pixels (black circles) x(1) to x(4) and therefore corresponds to the sum of motion parallax from x(1) to x(4), that is, the accumulated motion parallax.

What is noted is that the positions of these black circle points are positions back-traced from a spotting point x(T), which are the results of optimal matching previously performed between the slice image and frame image using dynamic programming (DP). The distance from the camera 200 to an object group corresponding to the accumulated motion parallax (a group of each object displayed on the pixels x(1), x(2), and x(3) of the frame image is the object group) can be called virtual distance. The accumulated motion parallax shown in the right diagram of FIG. 24 represents the sum of the motion parallax (the motion parallax in the pixels x(1) to x(4) of the frame image) at the three object points (the pixel points of the object displayed on the pixels x(1), x(2), and x(3) of the frame image) and is not motion parallax at a particular one object point. The distance from the camera 200 to the object corresponding to the three object points is represented by a virtual distance zv.

The virtual distance zv can be considered as a distance depending on the distances zv1, zv2, and zv3 from the three black circles (x(1), x(2), and x(3)) shown in the left diagram of FIG. 24 to the object. The three pixel points of the slice image correspond to the three object points. Motion parallax is accumulated in and added to the three pixel points. The pixels to which motion parallax has added do not correspond to the pixels to which the distances zv1, zv2, and zv3 of the three object points have been added. This also applies to the stereo vision method. In the stereo vision method also, the addition of three disparities does not correspond to the addition of distances. In the stereo vision method, a disparity is obtained with respect to one object point. For this reason, in the embodiment, a distance corresponding to the accumulated motion parallax is defined as a virtual distance. The virtual distance only means a distance relating to the distances zv1, zv2, and zv3. Since the virtual distance zv is a distance depending on the distances zv1, zv2, and zv3 from the camera 200 to the object, it does not necessarily directly represent the real distance but rather is virtual. Conversion of the virtual distance into a real distance will be described later.

Figure 25:
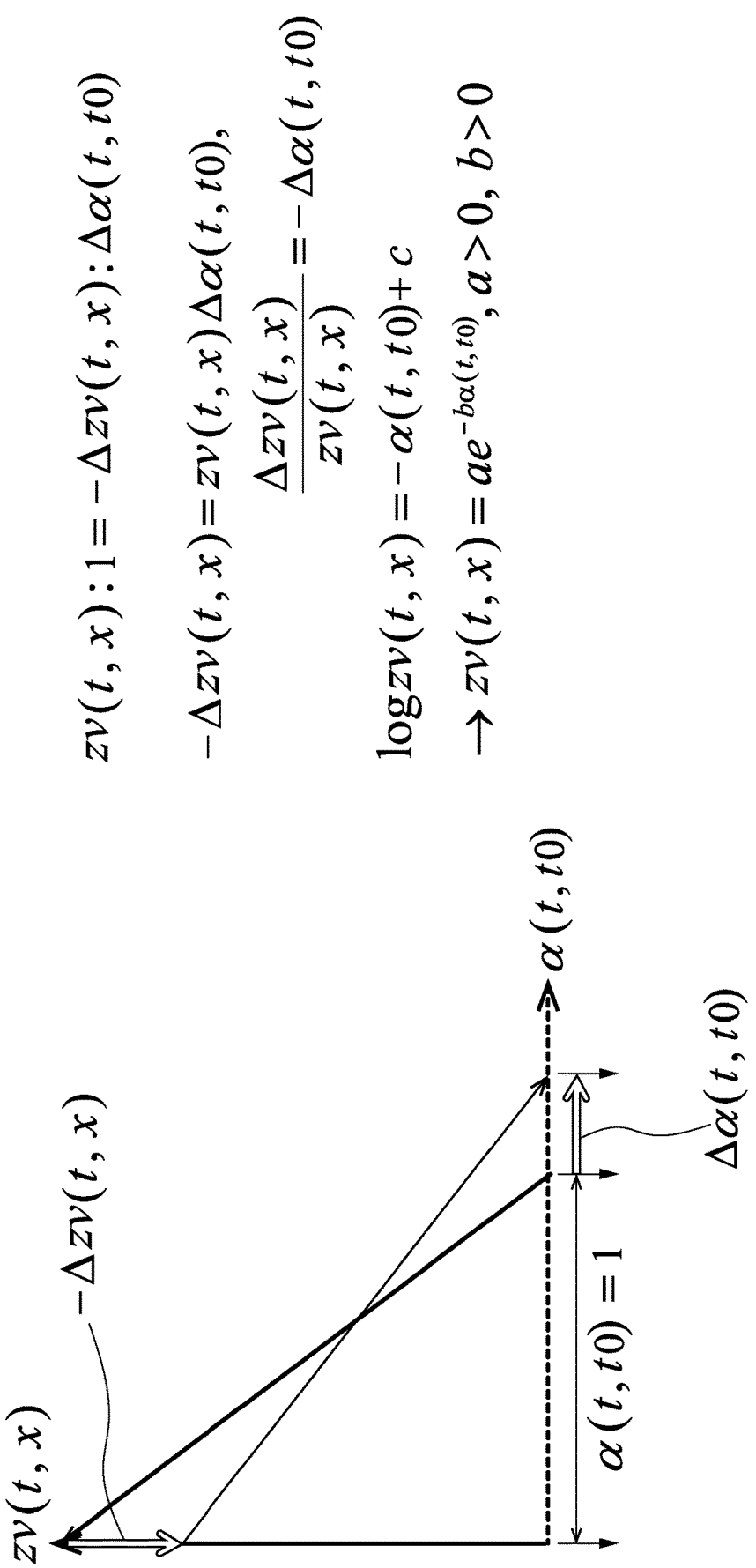
FIG. 25 is a diagram of a model showing the derivation of a calculation formula indicating whether the accumulated motion parallax corresponds to the real distance.

FIG. 25 is a diagram of a model showing the derivation of a calculation formula indicating whether the accumulated motion parallax corresponds to the real distance. In FIG. 25, the virtual distance zv(t, x) is a distance (virtual distance) obtained from the motion parallax accumulated at x(t0) to x(t) of the frame image. That is, the virtual distance zv(t, x) is obtained from the accumulated motion parallax of the frame image corresponding to the pixels of the slice image. The virtual distance zv(t, x) corresponds to a global distance representing the distance from the camera 200 to the object obtained for each region. In FIG. 25, the longitudinal axis is set as the z-axis. The motion parallax accumulated at x(t0) to x(t) is represented by α(t, t0).

With respect to the accumulated motion parallax α(t, t0), the following relationship holds:

$$\alpha(t, t0) = \sum_{\tau=t0}^{\tau=t} \Delta x(\tau) \qquad \text{Formula 9}$$

where $\Delta x(\tau)$ represents the motion parallax from τ=t0 until τ=t. The motion parallax $\Delta x(\tau)$ accumulated from τ=t0 until τ=t corresponds to the accumulated motion parallax α(t, t0).

A small increase Δα(t, t0) in the amount of the accumulated motion parallax α(t, t0) can be represented by the following expression:

$$\Delta\alpha(t,t0)=\alpha(t+\Delta t,t0)-\alpha(t,t0)$$

Assume that the accumulated motion parallax α(t, t0) has been increased by a small amount Δα(t, t0) where Δα(t, t0)>0. In this case, Δα(t, t0) corresponds to x(t+Δt)−x(t) and also corresponds to a small change in the amount of the distance between adjacent pixels of the frame image. Accordingly, the motion parallax is increased as the distance between adjacent pixels of the frame image is increased. Due to the phenomenon of the accumulated motion parallax, the increase in motion parallax slightly reduces the distance from the camera 200 to the object. That is, it is conceivable that the value of the virtual distance zv(t, x) to the object has been reduced by a small amount Δzv(t, x).

With respect to zv(t, x), −Δzv(t, x), α(t, t0), and Δα(t, t0) thus defined, a proportionality represented by an expression below holds, as is obvious in the relational graph shown in FIG. 25.

$$zv(t,x):\alpha(t,t0)=-\Delta zv(t,x):\Delta\alpha(t,t0)$$

Assuming that the value α(t, t0) of the accumulated motion parallax corresponding to the virtual distance zv(t, x) is 1, the following expression holds from the above proportionality:

$$zv(t,x):1=-\Delta zv(t,x):\Delta\alpha(t,t0)$$

It is conceivable that−Δzv(t, x) corresponds to Δα(t, t0).

The reason why it must be assumed in the above proportionality that α(t, t0) is 1 will be described below. The virtual distance zv(t, x) and the value α(t, t0) of the accumulated motion parallax are not simply inversely proportional to each other. In the stereo vision method, the distance and disparity are simply inversely proportional to each other.

Also, in the stereo vision method, it is assumed that one object point is displayed on two cameras. The inter-camera distance (base line) is constant. In the embodiment, on the other hand, the accumulated motion parallax corresponding to the disparity in the stereo vision method corresponds to multiple object points. Also, one moving camera is used and therefore the "inter-camera distance" considered as being constant in the stereo vision method is not constant. Also, the accumulated motion parallax is the optimal addition of motion parallax by dynamic programming (DP) and differs from the simple addition of disparity by the stereo vision method, where a single object point is captured by cameras in two positions. That is, the accumulated motion parallax is the optimal addition of motion parallax considering the varying baseline. In view of the foregoing, there must be made an assumption that a given value of the accumulated motion parallax corresponds to the virtual distance $zv(t, x)$. By assuming that the accumulated motion parallax varies from this given value by $\Delta\alpha(t, t0)$ and the virtual distance $zv(t, x)$ varies by $\Delta zv(t, x)$ in response to this variation, on that assumption, the phenomenon of motion parallax can be expressed as a proportionality. A differential equation is derived from this proportionality. By solving the differential equation, an expression having two coefficients and indicating the relationship between the motion parallax and the distance is obtained. The two coefficients are determined by giving boundary conditions to individual targets. A function where the coefficients are determined under the boundary conditions do not represent a virtual distance but rather gives the actual distance.

The following differential equation is generated from the above proportionality:

$-\Delta zv(t,x) = zv(t,x) \cdot \Delta\alpha(t,t0)$

Then the following equation is obtained by deforming the above differential equation:

$\Delta zv(t,x)/zv(t,x) = -\Delta\alpha(t,t0)$

Using this deformed equation, the following relational equation is obtained:

$\log zv(t,x) = -\alpha(t,t0) + c$ where $c$ is a constant.

Thus, $zv(t, x)$ can be represented by the following formula:

$zv(t,x) = a \cdot \exp(-b \cdot \alpha(t,t0))$   Formula 10 where coefficients a and b are separately determined coefficients.

When the coefficients a and b are determined, a distance function $zv(t, x) = a \cdot \exp(-b \cdot \alpha(t, t0))$ can be regarded as an actual distance function indicating the actual distance rather than a virtual distance function indicating a virtual distance. Accordingly, when the coefficients a and b are given to Formula 10 above, the actual distance can be determined to be obtained from the function based on the theoretical ground. The distance thus obtained from the actual distance function corresponds to the global distance described above. Accordingly, the global distance zg of a region including a pixel $x(t)$ of the frame image can be represented by the following formula based on Formula 10:

$zg = a \cdot \exp(-b \cdot \alpha(t,t0))$   Formula 11

A challenge that occurs when the distance is obtained using Formulas 10 and 11 above is a method for accumulating motion parallax. Specifically, how to determine [t0, t] (a range from t0 to t), which is the addition section of Formula 9 above, is a challenge.

The method described in the embodiment includes applying the mean-shift method, which is a region segmentation technique, to both a slice image and a frame image to obtain the corresponding regions of the respective images and defining addition sections in the obtained regions.

Figure 26:
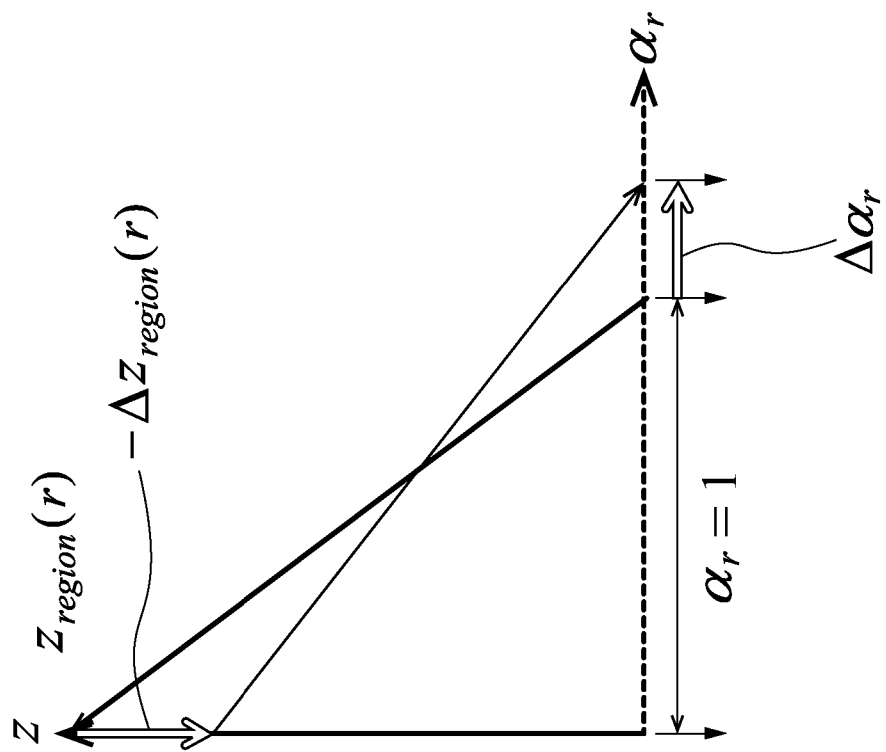
FIG. 26 is a diagram showing a method of calculating the distance $z_{region}(r)$ of a region using the average length in the transverse-axis direction of the slice image and the corresponding average length in the transverse-axis direction of the frame image.

FIG. 26 is a diagram showing a method for calculating the distance $z_{region}(r)$ to an object for each region using the average length in the transverse direction, of a corresponding region r of a frame image and the average length in the transverse direction, of a corresponding region r of a slice image, which is the method described above. In FIG. 26, $z_{region}(r)$ represents the distance to the object obtained in the region r of the frame image; $L_1$ represents the number of section transverse lines (the number of section transverse lines connecting one endpoint and another endpoint of the region r; the number of section transverse lines arranged longitudinally) included in the region r of the frame image; and $L_2$ represents the number of section transverse lines included in the region r of the slice image.

The average $xa^r_{max-min}$ of the lengths of pixels from one end pixel to another end pixel (the lengths of section transverse lines) in the region r of the frame image can be represented by the following formula:

$$xa^r_{max-min} = \frac{1}{L_1}\sum_{i=1}^{L_1}(x^r_{i,max} - x^r_{i,min})$$

where $x^r_{i,\,min}$ represents the pixel position at one end of the i-th section transverse line in the region r of the frame image; and $x^r_{i,\,max}$ represents the pixel position at another end thereof.

The average $ta^r_{max-min}$ of the lengths of pixels from one end pixel to another end pixel (the lengths of section transverse lines) in the region r of the slice image can be represented by the following formula:

$$ta^r_{max-min} = \frac{1}{L_2}\sum_{i=1}^{L_2}(t^r_{i,max} - t^r_{i,min})$$

where $t^r_{i,\,min}$ represents the pixel position at one end of the i-th section transverse line in the region r of the slice image; and $t^r_{i,\,max}$ represents the pixel position at another end thereof.

To obtain the distance from the camera 200 to an object, first, the enlargement ratio $\alpha_r = q/p$ of a frame image to a slice image is obtained. In $\alpha_r = q/p$, p represents the average length in the transverse direction of one region r of the slice image; and q represents the average length in the transverse direction of the corresponding region r of the frame image. The distance from the camera 200 to the object for each region is obtained from the value of $\alpha_r = q/p$ using an expression representing the relationship between the distance z and the accumulated motion parallax $\alpha_r$ shown in FIG. 13(b).

That is, in the above method, the distance is obtained on the basis of the average of the lengths of the pixels on the section transverse lines in the region r of the frame image with respect to the average of the lengths of the pixels on the section transverse lines in the region r of the slice image. Thus, the value $\alpha_r$ obtained by dividing "the average of the lengths of the pixels on the section transverse lines in the region r of the frame image" by "the average of the lengths of the pixels on the section transverse lines in the region r of the slice image" can be represented by the following formula:

$$\alpha_r = xa^r_{max-min}/ta^r_{max-min} \quad \text{Formula 12}$$

That is, the global distance is calculated by regarding $\alpha_r$ as the value $\alpha$ of the accumulated motion parallax corresponding to the distance zg from the camera 200 to the object for the region r. On the basis of this idea, the accumulated motion parallax $\alpha(t, t0)$ in the above distance zv(t, x) is regarded as $\alpha_r$ shown in Formula 12 and then the coefficients a and b are determined.

To determine the coefficients a and b, first, the variation sections of the distance $z_{region}(r)$ and $\alpha_r$ have to be determined. The variation section of the distance $z_{region}(r)$ is the variation section of the distance from the camera 200 to the object. The variation section of the distance $z_{region}(r)$ is intuitively determined by a human when he or she actually views a frame image of the scene of an urban area or street, the indoor scene, or the like captured by the camera 200. The variation section of the distance $z_{region}(r)$ can be represented by $z_{N1} \leq z_{region}(r) \leq z_{L1}$ where $z_{N1}$ represents the shortest distance from the camera 200 in the variation section; and $z_{L1}$ represents the longest distance from the camera 200 in the variation section.

For example, if the captured scene is the scene of an urban area and a human determines that the distance from the camera 200 to a near object is 10 m and the distance from the camera 200 to a distant object is 4 km, the variation section of the distance $z_{region}(r)$ is $[z_{N1}, z_{L1}]=[10 \text{ m}, 4 \text{ km}]$. Of course, if possible, the variation range may be determined by directly measuring the distance to the object using a laser distance measurement device or the like.

The variation section of $\alpha_r$ can be represented by $\mu_1 \leq \alpha_r \leq \gamma_1$ where $\mu_1$ and $\gamma_1$ are constants. As described above, $\alpha_r$ is a value obtained by dividing "the average of the lengths of the pixels on the section transverse lines in the region r of the frame image" by "the average of the lengths of the pixels on the section transverse lines in the region r of the slice image." For this reason, as described in the embodiment, the variation section of $\alpha_r$ is affected by the rate at which a slice image is expanded or contracted to a frame image, or the like. Accordingly, the value of $\alpha_r$ is set to $1 < \alpha_r < 4$, and the variation section of $\alpha_r$ becomes $1 < \mu_1 \leq \alpha_r, \gamma_1 < 4$.

As described above, the two coefficients a and b in the distance function $zv(t, x) = a \cdot \exp(-b \cdot \alpha(t, t0)) \ldots$ Formula 10 of the theoretically obtained virtual distance are determined using the parameters of the variation sections of $z_{region}(r)$ and $\alpha_r$. In this case, $z_{N1}$, which is the minimum section value of the distance $z_{region}(r)$, corresponds to $\gamma_1$, which is the maximum section value of $\alpha_r$, and $z_{L1}$, which is the maximum section value of the distance $z_{region}(r)$, corresponds to $\mu_1$, which is the minimum section value of $\alpha_r$. These correspondences can be determined to be appropriate, considering the phenomenon of the accumulated motion parallax. The reason is that if $\alpha_r$ has a large value, the distance between adjacent pixels of the frame image is increased and the average $xa^r_{max-min}$ of the lengths of the pixels on the section transverse lines is increased and thus the distance to the object is reduced and the value of $z_{region}(r)$ is reduced; if $\alpha_r$ has a small value, the distance between adjacent pixels of the frame image is reduced and the average $xa^r_{max-min}$ of the lengths of the pixels on the section transverse lines is reduced and thus the distance to the object is increased and the value of $z_{region}(r)$ is increased.

Accordingly, in order to determine the coefficients a and b, the following two equations can be used:

$$z_{L1} = a \cdot \exp(-b\mu_1)$$

$$z_{N1} = a \cdot \exp(-b\gamma_1)$$

Then, the value of $z_{N1}$, the value of $z_{L1}$, the value of $\mu_1$, and the value of $\gamma_1$ are set, and the coefficients a and b are obtained on the basis of the above two equations, the $z_{N1}$ equation and the $z_{L1}$ equation, as follows:

$$a = z_{L1} \cdot \exp((\mu_1/(\gamma_1 - \mu_1))\log(z_{L1}/z_{N1})$$

$$b = (1/(\gamma_1 - \mu_1))\log(z_{L1}/z_{N1})$$

Using the coefficients a and b thus obtained, the distance zv(t, x) of a pixel x(t) is obtained by the following formula:

$$zv(t, x) = a \cdot \exp(-b \cdot \alpha(t, t0)) \quad \text{Formula 10}$$

Thus, an actual distance function for obtaining the value of the distance (global distance zg) of each region can be calculated as follow:

$$zg = a \cdot \exp(-b \cdot \alpha(t, t0)) \quad \text{Formula 11}$$

As described above, this actual distance function is obtained mathematically. By using this actual distance function, the global distance can be determined on the basis of the theoretical ground rather than an observation of the object by a human or the intuition of a human.

As described above, the coefficients a and b for obtaining the distance zg of the actual distance function are obtained by setting the value of $z_{N1}$, the value of $z_{L1}$, the value of $\mu_1$, and the value of $\gamma_1$. Since Formula 11 is regarded as an actual distance function, the value of $z_{N1}$ and the value of $z_{L1}$ seem to correspond to the variation range of the distance zg of Formula 11 of the pixel x(t) as a result. Similarly, the value of $\mu_1$ and the value of $\gamma_1$ seem to correspond to the variation range of the accumulated motion parallax $\alpha(t, t0)$ of Formula 11 of the pixel x(t).

Figure 27A:
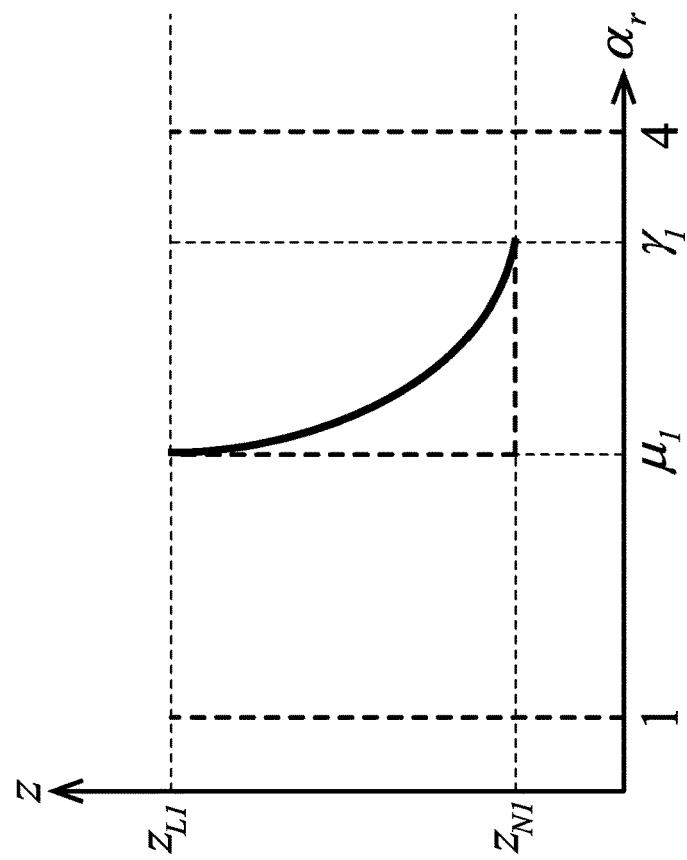
FIG. 27(a) is a graph showing the relationship between variation parameters $\mu_1$ and $\gamma_1$ of $\alpha_r$ and the distance z when a camera moves at low speed.
Figure 27B:
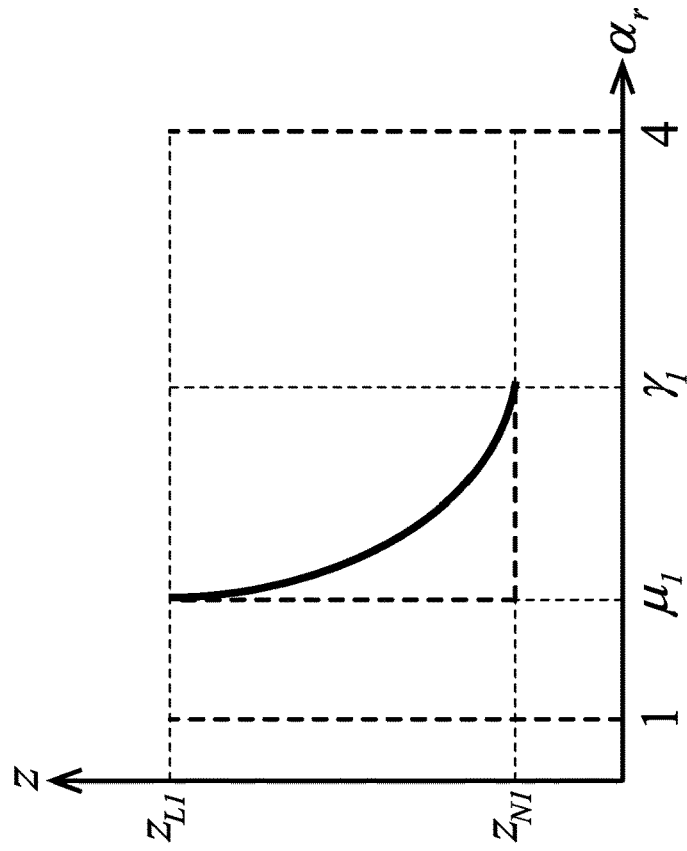
FIG. 27(b) is a diagram showing the relationship between the variation parameters $\mu_1$ and $\gamma_1$ of $\alpha_r$ and the distance z when the camera moves at high speed.

Even if moving images of the same object are captured by the camera 200, the values of $\mu_1$ and $\gamma_1$, which are section parameters of $\alpha_r$, vary with the moving speed of the camera 200. FIGS. 27(a) and 27(b) are graphs showing the relationship between the distance z and $\alpha_r$ in the region r using the value of $z_{N1}$, the value of $z_{L1}$, the value of $\mu_1$, and the value of $\gamma_1$. If the camera 200 moves at slow speed, the entire range of $\mu_1$ to $\gamma_1$ is closer to 1, as shown in FIG. 27(a); if the camera 200 moves at high speed, the entire range of $\mu_1$ to $\gamma_1$ is closer to 4, as shown in FIG. 27(b). By changing the range of $\mu_1$ to $\gamma_1$ as described above, the value of the distance z with respect to $\alpha_r$ is changed. Note that such changes in the distance are absorbed by the actual distance function.

As described in the embodiment, if the global distance of each region of the frame image is calculated using the mean-shift method, which is a region segmentation technique, the pixels of each region of the frame image would have the same distance value. However, by using the above actual distance function, the distance from the camera 200 to the object can be obtained for each of the pixels of the frame image corresponding to the pixels of the slice image.

This means that the distance value of each pixel of a texture image (an image indicating the surface state of an object) can be obtained. That is, use of the pixels whose distance values have been obtained facilitates texture mapping onto a three-dimensional image.

Conventional texture mapping onto a three-dimensional image assumes that a three-dimensional space (called "free space") containing an object is set and one point of the object is present among the points of the space. For this reason, how texture is attached (set) to the obtained object point group is a big challenge. On the other hand, use of a frame image whose pixels are provided with the distance values (distance information) allows texture to be attached using the distance values provided to the pixels. Such a challenge need not be addressed.

By combining frame images whose pixels are provided with distance values (distance information) using the stitching algorithm described above, one combination image can be generated. By obtaining the distance value of each pixel on the basis of the combination image, a wide-range three-dimensional image having an endless relationship can be obtained.

[Calculation of Distance of Each Pixel in Corresponding Region of Frame Image]

In the embodiment, there has been described the case in which the distance from the camera 200 to an object is obtained for each pixel of the frame image by obtaining the global distance of each region, then obtaining local distances representing relative distances of each region, and adding the local distances to the global distance. However, after determining the distance value of each region of the frame image, a different method may be used to obtain the distance from the camera 200 to the object for each pixel of each region.

A frame image refers to one frame extracted from moving images captured by the camera 200. Accordingly, the resolution of the frame image depends on the image-capture performance of the camera. A typical video camera stores color information whose pixel count is, for example, on the order of 1000×600 or 4000×2000, each pixel consisting of RGB values. Even if, in a frame image consisting of such many pixels, a global distance is simply provided to each pixel as region-specific distance information, the distance of the entire frame image would not be sufficiently accurate. For this reason, it is desirable to provide distance values which differ from the global distance in principle, to all pixels in each region, and such a distance value is meaningful as a representation of the real world. Hereafter, a method for performing the calculation of the distance of each pixel in each region described above more precisely will be described.

The distance of each segmented region is obtained using the global distance calculation method described above (the distance calculation method using the mean-shift method, which a region segmentation technique). A global distance obtained with respect to a region r is represented by zg. The region r includes some section transverse lines. As described above, multiple coordinate points obtained by a start-end point-fixed matching process and a back-trace process in the region are stored on the transverse axis of each section transverse line as a point line. The multiple points obtained by the back-trace process are represented by x(1), x(2), x(3), . . . , x(i−1), x(i), . . . , and x(G). The pixel-based average length of the section transverse lines included in the region r is represented by xa. Of the multiple points obtained by the back-trace process, adjacent two points are represented by x(I−1), x(i) where i is an integer and 2≤i≤G. The distance (pixel difference) between the adjacent pixels x(i) and x(i−1) can be represented by x(i)−x(i−1).

Using the section transverse line average length xa, the adjacent two-point distance x(i)−x(i−1), and the number G of back-traced coordinates thus set, a precise distance z(i) from the camera 200 to the object for the pixel x(i) is determined by the following formula:

$$z(i)=zg+\beta(x(i)-x(i-1)-xa/G) \quad \text{Formula 13}$$

where β represents a positive constant and is an empirically determined value.

Since xa represents the pixel-based average length of the section transverse lines included in the region r, xa/G represents the average pixel distance between adjacent two points of the points x(1), x(2), x(3), . . . , x(i−1), x(i), . . . , and x(G) (inter-pixel distance, coordinate position difference) in the region. In other words, xa/G represents the average value obtained by dividing the pixel distances between G number of pixels, x(1) to x(G), on the transverse axis in the region by G.

The global distance zg of the region r seems to be the average distance of the region r, and the average distance zg seems to correspond to the average pixel distance between adjacent two pixels. For this reason, if the pixel distance between two pixels, the pixel position x(i) and the adjacent pixel x(i−1), in the region r is longer than the average pixel distance between two pixels, that is, if x(i)−x(i−1) is larger than xa/G (i.e., x(i)−x(i−1)−xa/G>0), the pixel x(i) seems to be a pixel that has a shorter distance z(i) than the average distance zg of the region r and on which a closer object to the camera 200 is displayed.

On the other hand, if the pixel distance between two pixels, the pixel position x(i) and adjacent pixel position x(i−1), in the region r is shorter than the average pixel distance between two pixels, that is, if x(i)−x(i−1) is smaller than xa/G (i.e., x(i)−x(i−1)−xa/G<0), the pixel x(i) seems to be a pixel that has a longer distance z(i) than the average distance zg of the region r and on which a more distant object from the camera 200 is displayed.

Figure 28:
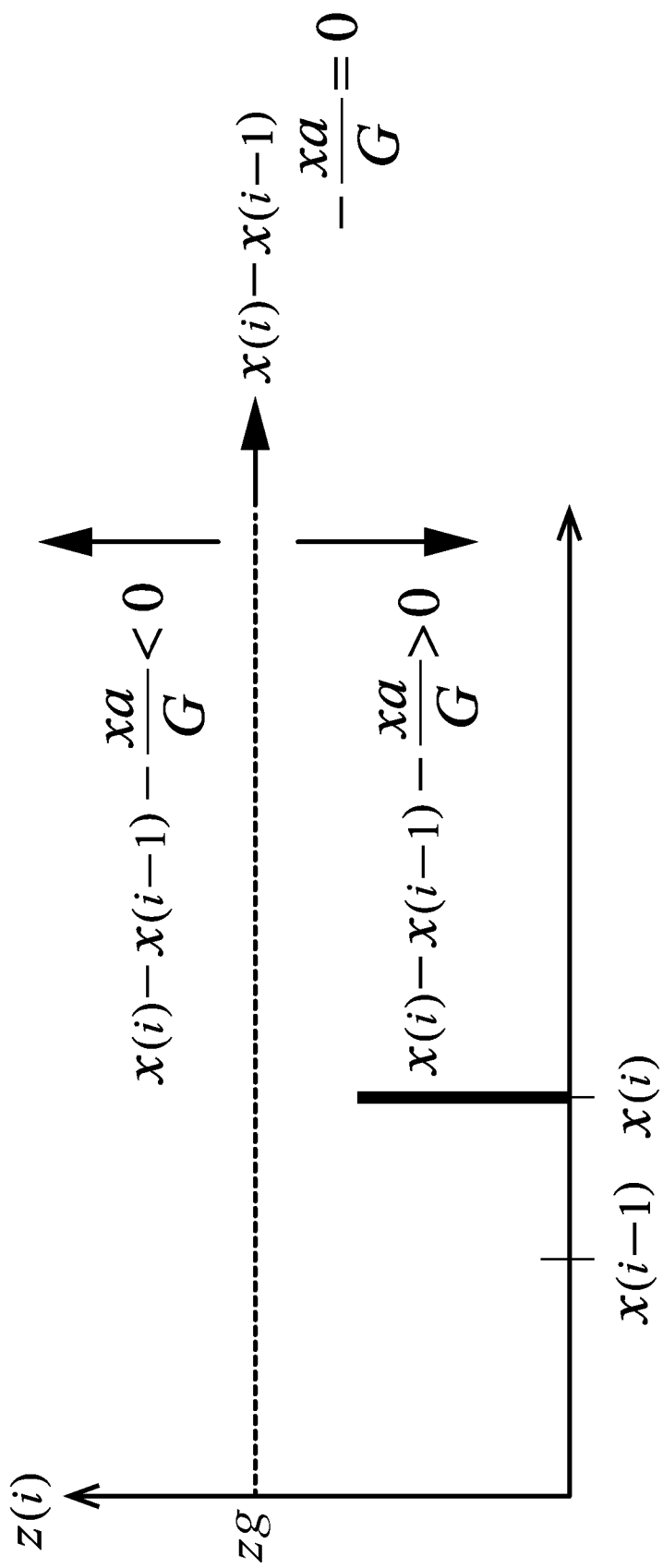
FIG. 28 is a diagram showing the relationship between the i-th pixel x(i) in a region and a precise distance z(i) of the pixel x(i).

FIG. 28 is a diagram showing the relationship between the i-th pixel x(i) in the region and the distance z(i) of the pixel x(i). As described above, the distance value z(i) of the i-th pixel x(i) is obtained by the following formula:

$$z(i)=zg+\beta(x(i)-x(i-1)-xa/G) \quad \text{Formula 13}$$

Accordingly, if the distance value z(i) of the i-th pixel x(i) matches the global distance zg of the region r, the value of x(i)−x(i−1)−xa/G described above is zero. That is, the distance z(i) of a pixel x(i) corresponding to x(i)−x(i−1)−xa/G=0 is the distance zg. On the other hand, the distance z(i) of a pixel x(i) where x(i)−x(i−1)−xa/G<0 holds is shorter than the distance zg. Also, the distance z(i) of a pixel x(i) where x(i)−x(i−1)−xa/G>0 holds is longer than the distance zg.

As seen above, by obtaining x(i)−x(i−1)−xa/G, a precise distance z(i) of a pixel x(i) in the region r can be obtained on the basis of the global distance zg, which can be regarded as the average distance of the region r.

[Method for Directly Obtaining Precise Distances of Each Pixel of Frame Image]

As described above, the method for obtaining a precise distance of each pixel of a frame image according to the embodiment includes first obtaining the distance (global distance) of each of segmented regions obtained by the mean-shift method, then obtaining the relative distance (local distance) of each pixel in each region, and adding the relative distance (local distance) of each pixel in each region to the distance (global distance) of each region. That is, the first stage involves obtaining the global distance of each region; the second stage involves obtaining the relative distance (local distance) of each pixel in each region; and the final stage involves obtaining a precise distance of each pixel. However, there may be used a method of obtaining a precise distance of each pixel of a frame image in one process using a median filter rather than the method of obtaining a precise distance of each pixel of a frame image in these multiple stages. In other words, the window size of the median filter corresponds to the regions obtained using the mean-shift method. The method using a median filter is a method for obtaining the distance more easily.

As described above, FIG. 23 is a diagram schematically showing correspondences between pixels on the transverse axis (t-axis) of a slice image and pixels on the transverse axis (x-axis) of a frame image corresponding to the pixels. In FIG. 23, one point y' on the longitudinal axis of the slice image is set to a fixed point (i.e., x=1, y=y'), and points on the transverse axis of the slice image with y=y', that is, points t=1 to t=T on the transverse axis t are shown by black circles. Pixels on an x-axis direction line in a frame image with y fixed to y' optimally matching the pixels on the transverse axis t of the slice image are obtained by the line-to-image continuous dynamic programming and are also shown by black circles in FIG. 23. For example, if a black-circle pixel is located at x(i) in the frame image, motion parallax accumulated from x(1)=1 to x(i) is represented by x(i)−x(1).

The line-to-image continuous dynamic programming matching method is performed before the mean-shift method is applied to the frame image and slice image (before a region segmentation process). That is, by obtaining the distance of each pixel using the pixels of the frame image shown by black circles in FIG. 23 (the pixels corresponding to the accumulated motion parallax) without region segmentation, the distance of each pixel can be obtained without having to perform the multiple stages.

First, without considering correspondences between segmented regions, points on the y-axis of a frame image are fixed to y', and pixels (black circles) corresponding to accumulated motion parallax on the x-axis with y=y' are considered. The pixels corresponding to the accumulated motion parallax on the x-axis of the frame image (the pixels matching the slice image) are represented by x(1), x(2), . . . , x(i−1), x(i), x(i+1), . . . , and x(T). These pixels are present in T number of positions, since the number of these pixels corresponds to the number of the pixels on the transverse axis (t-axis) of the slice image. A certain distance from an object to the camera 200 for a pixel x(i) is represented by zv(i, x) as a result of a median filter having a certain window size. As described above, i is i=1, 2, . . . , and T. As will be described later, the distance zv(i, x) is obtained by the accumulated motion parallax at x(i) through the median filter having the certain window size. Accordingly, as with the distance zv(t, x) of Formula 10 described above, the distance zv(i, x) can be considered as a virtual distance.

The accumulated motion parallax at the pixel x(i) is represented by α(i). α(i) is the accumulation of the pixel distances between every two adjacent pixels until x(i) (the accumulation of the distance differences between every two pixel points). The motion parallax accumulated from x(i) to x(i+K) can be considered as the accumulation of the distance differences (disparities) between every two adjacent pixels, that is, can be considered as the sum of x(i+1)−x(i), x(i+2)−x(i+1), . . . , and x(i+K)−x(i+K−1). The value of the pixel distance (the difference between two pixel points, the distance difference between adjacent pixels) varies among adjacent two pixels.

Considering the K number of inter-pixel distances (distance differences), the median of the inter-pixel distances is obtained using a median filter. The median obtained by applying the median filter to the K number of pixel distance values obtained on the basis of the pixel x(i) is represented by Med(i). Med(i) represents the median of the value of x(i+1)−x(i), the value of x(i+2)−x(i+1), . . . , and the value of x(i+K)−x(i+K−1).

For example, consider five pixels (accumulated motion parallax) relative to x(i): x(i+1), x(i+2), x(i+3), x(i+4), and x(i+5). The five distance differences (difference measure: motion parallax) are x(i+1)−x(i), x(i+2)−x(i+1), x(i+3)−x(i+2), x(i+4)−x(i+3), and x(i+5)−x(i+4). A comparison is made between the five distance differences, and the third largest distance difference value is used as Med(i). The value thus obtained is the output value of the median filter having a window of 5.

By using Med(i) thus obtained, motion parallax α(i) accumulated from x(i) to x(i+K) can be represented by the following formula:

$$\alpha(i) = Med(i) \cdot K \qquad \text{Formula 14}$$

On the other hand, a small amount Δα(i) of increase of the accumulated motion parallax can be represented by the following expression:

$$\Delta\alpha(i) = \alpha(i+\Delta i) - \alpha(i)$$

The relationship between the accumulated motion parallax α(i) and the precise distance zv(i, x) of the pixel x(i) can be represented by the relationship between the small amount Δα(i) of increase of the accumulated motion parallax and the amount −Δzv(i, x) of change of the distance associated with the small amount Δα(i) of increase of the accumulated motion parallax. As described above, the following correspondence holds due to characteristics of the accumulated motion parallax.

$$zv(i,x) : \alpha(i) = -\Delta zv(i,x) : \Delta\alpha(i)$$

When α(i)=1, the following correspondence can hold:

$$zv(i,x) : 1 = -\Delta zv(i,x) : \Delta\alpha(i)$$

The following equation is obtained on the basis of the above correspondence:

$$-\Delta zv(i,x) = zv(i,x) \cdot \Delta\alpha(i)$$

Then the following equation is obtained by deforming the above equation:

$$\Delta zv(i,x)/zv(i,x) = -\Delta\alpha(i)$$

Thus, the following relational equation is obtained:

$$\log zv(i,x) = -\Delta\alpha(i) + c$$

By deforming this relational equation, the distance zv(i, x) can be obtained by the following formula:

$$zv(i,x) = a \cdot \exp(-b \cdot \alpha(i)) \text{ where } a>0, b>0$$

By using the output value Med(i) of the median filter, α(i) can be represented by the following formula:

$$\alpha(i) = Med(i) \cdot K$$

Thus, the distance zv(i, x) of x(i) can be represented by the following formula:

$$zv(i,x) = a \cdot \exp(-b \cdot Med(i) \cdot K) \qquad \text{Formula 15}$$

The values of the coefficients a and b can be obtained on the basis of the concept described above.

By obtaining the coefficients a and b, a precise distance of x(i) in the frame image can be obtained using an actual distance function on the basis of the median (Med(i)) of the motion parallax. Specifically, the distance z(i, x) of x(i) can be obtained by the following actual distance function:

$$z(i,x) = a \cdot \exp(-b \cdot Med(i) \cdot K) \qquad \text{Formula 16}$$

More specifically, the accumulated motion parallax Med(i)·K is set to the following range using a constant $\mu_2$ and a constant $\gamma_2$:

$$\mu_2 \leq Med(i) \cdot K \leq \gamma_2$$

The distance z(i, x) of the actual distance function of the pixel x(i) is set to the following range using a constant $z_{N2}$ and a constant $z_{L2}$:

$$z_{N2} \leq z(i,x) \leq z_{L2}$$

Thus, the coefficient a is calculated by the following formula:

$$a = z_{L2} \cdot \exp((\mu_2/\gamma_2 - \mu_2)) \log(z_{L2}/z_{N2})$$

The coefficient b is calculated by the following formula:

$$b = (1/(\gamma_2 - \mu_2)) \log(z_{L2}/z_{N2})$$

Then, the distance z(i, x) is obtained by the actual distance function of Formula 16 above using the obtained coefficients a and b. In this way, a precise distance from the object to the camera 200 for the pixel x(i) of the frame image can be obtained. As seen above, the precise distance of the pixel x(i) of the frame image can be obtained without having to perform region segmentation using the mean-shift method as described in the embodiment.

Since a pixel x(i) is a pixel point corresponding to accumulated motion parallax, only the T number of pixels x(i) exist in the frame image. Accordingly, the distance z(i, x) can be obtained only with respect to the T number of pixel points, and it is difficult to obtain the distances of all the pixels of the frame image. However, a pixel x(i) is a texture pixel that determines a surface position of an object. For this reason, by using the distance of a pixel x(i) serving as texture, the distance values of pixels whose distances have yet to be obtained can be interpolated using the distance values of neighboring pixels whose distance values have been determined. Typically, interpolation refers to obtaining numbers that fill the ranges of the sections of a certain numeric data sequence or giving a function for obtaining such numerics.

By interpolating the distances of pixels for which distance values have yet to be set, using the distance value of the pixel x(i) of the frame image, precise distances of the pixels of the frame image can be obtained in one process without having to perform region segmentation, that is, without having to obtain distance values in multiple stages considering the regions.

Note that if the distance values of the pixels are calculated by extracting regions and causing the regions to correspond to each other, it may be possible to use the region-specific distance information as more stable information than the distances of the pixels obtained by interpolation. Also, depending on the target moving images, it may be possible to obtain more reliable distance values by extracting regions, causing the regions to correspond to each other, obtaining region-specific distance information, and then calculating the pixel-specific distance values rather than directly calculating the pixel-specific distance values. For this reason, in actually calculating the pixel-specific distance values, it is preferred to selectively use the method of calculating the region-specific distances and the method of directly calculating the pixel-specific distances using a median filter, as necessary. Which method should be used to obtain more accurate distances depends on the application purpose.

REFERENCE SIGNS LIST

100 image distance calculator
101 storage (pixel information storage)
102 ROM
103 RAM (pixel information storage)
104 CPU (frame image extractor, slice image generator, spotting point calculator, pixel matching unit, region segmentation unit, corresponding region determination unit, global distance calculator, local distance calculator, precise distance calculator, controller, code detector, pixel distance value extractor, code RGB value assignor, RGB value replacement unit, combination image generator, RGB value detector, distance information provider, RGB value changer, modified combination image generator, distance-provided combination image generator)
200 camera
210 monitor.

The invention claimed is:

1. A computer-readable, non-transitory storage medium storing an image distance calculation program of an image distance calculator that calculates a distance from a camera which is moved, to an object on the basis of moving images of the object captured by the camera, the program causing a controller of the image distance calculator to perform:

a frame image extraction function of extracting a frame image at any time from the moving images;

a slice image generation function of, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generating a slice image having the y-axis as a longitudinal axis and a t-axis as a transverse axis, t being $1 \leq t \leq T$;

a spotting point calculation function of, if a pixel in the slice image at a time t is represented by g(t, y), t being $1 \leq t \leq T$, and a pixel in an xyt space at a time t0 at a point y' on the y-axis of the frame image is represented by f(x, y', t0)=r(x), y' being $1 \leq y' \leq Y$, calculating coordinates of a pixel in the frame image corresponding to a pixel at a time T in the slice image as a spotting point by obtaining the pixel point r(x) in the frame image that is present at any point in a section [1, X] of x and corresponds to the pixel g(t, y) in the slice image, using a matching process based on dynamic programming;

a pixel matching function of obtaining pixels in the frame image corresponding to pixels at t=1 to t=T on the t-axis of the slice image by performing a back-trace process from the spotting point calculated by the spotting point calculation function from the time t=T until the time t=1;

a region segmentation function of segmenting the frame image and the slice image into regions on the basis of a common segmentation criterion by applying a mean-shift method to the frame image and the slice image;

a corresponding region determination function of detecting the pixels in the frame image corresponding to the pixels in the slice image obtained by the pixel matching function on the basis of pixels present in each of the segmented regions of the slice image obtained by the region segmentation function and determining, as a corresponding region, each of the segmented regions of the frame image corresponding to each of the segmented regions of the slice image by obtaining a segmented region including the largest number of detected pixels in the frame image; and a global distance calculation function of detecting an average q of the numbers of pixels in a direction of the x-axis in each of the corresponding regions of the frame image determined by the corresponding region determination function, detecting an average p of the numbers of pixels in a direction of the t-axis in each of the corresponding segmented regions of the slice image, calculating a ratio value of each corresponding region, the ratio value being obtained on the basis of a ratio of q to p or a ratio of p to q, and calculating a distance from the camera to the object captured in the frame image corresponding to the calculated ratio value of each of the corresponding regions as a global distance by using a distance function where a correspondence between the distance and the ratio value is defined in advance.

2. The computer-readable, non-transitory storage medium storing the image distance calculation program according to claim 1, the program causing the controller to perform:
   a code detection function of extracting RGB values of all pixels in two frame images captured by the camera at different times, the two frame images including a common image portion, and detecting RGB values that are not the extracted RGB values, as RGB values of codes;
   a pixel distance value extraction function of extracting distance values of pixels whose global distances have been calculated by the global distance calculation function, from the pixels in the two frame images;
   a code RGB value assignment function of assigning the RGB values of the codes yet-to-be-assigned to the distance values extracted by the pixel distance value extraction function;
   an RGB value replacement function of replacing RGB values of pixels in the two frame images having distance values identical to the distance values to which the RGB values of the codes have been assigned by the code RGB value assignment function, with the RGB values of the codes assigned to the distance values;
   a pixel information storage function of storing the RGB values as replacements provided by the RGB value replacement function in such a manner that the RGB values are associated with the distance values of the pixels whose RGB values have been replaced;
   a combination image generation function of combining the two frame images into one combination image by applying a stitching algorithm to the two frame images the RGB values of whose pixels have been replaced by the RGB value replacement function;
   an RGB value detection function of detecting RGB values equal or approximate to the RGB values stored by the pixel information storage function from RGB values of all pixels in the combination image generated by the combination image generation function;
   a distance information providing function of providing the distance values associated with the RGB values stored by the pixel information storage function to pixels having the RGB values detected by the RGB value detection function as distance information of the pixels; and
   an RGB value change function of changing the RGB values of the pixels to which the distance information has been provided by the distance information providing function, to averages of RGB values of pixels near the pixels.

3. The computer-readable, non-transitory storage medium storing the image distance calculation program according to claim 1, the program causing the controller to perform:
   a local distance calculation function of obtaining pixels in each of the corresponding regions of the frame image corresponding to pixels in each of the segmented regions of the slice image by obtaining correspondences between pixels from a start-point pixel to an end-point pixel in a direction of the t-axis in each of the segmented regions of the slice image and pixels from a start-point pixel to an end-point pixel in a direction of the x-axis in each of the corresponding regions of the frame image corresponding to the each of the segmented regions of the slice image using a start-end point-fixed matching process and back-trace process based on dynamic programming and calculating a relative distance of each pixel in each of the corresponding regions as a local distance on the basis of distances between the obtained pixels in the direction of the x-axis in each of the corresponding regions of the frame image; and
   a precise distance calculation function of calculating a precise distance from the camera to the object for each pixel in the frame image by providing the global distance of each of the corresponding regions in the frame image calculated by the global distance calculation function to the local distance of each pixel in the frame image calculated by the local distance calculation function.

4. The computer-readable, non-transitory storage medium storing the image distance calculation program according to claim 3, the program causing the controller to perform:
   a code detection function of extracting RGB values of all pixels in two frame images captured by the camera at different times, the two frame images including a common image portion, the two frame images being images where the distance from the object to the camera, of each pixel has been calculated by the precise distance calculation function, and detecting RGB values that are not the extracted RGB values, as RGB values of codes;
   a pixel distance value extraction function of randomly selecting 1/N of all pixels in the two frame images, N being an integer, and extracting the distance values of the selected pixels;
   a code RGB value assignment function of assigning the RGB values of the codes yet-to-be-assigned to the distance values extracted by the pixel distance value extraction function;
   an RGB value replacement function of replacing RGB values of pixels in the two frame images having distance values identical to the distance values to which the RGB values of the codes have been assigned by the code RGB value assignment function, with the RGB values of the codes assigned to the distance values;
   a pixel information storage function of storing the RGB values as replacements provided by the RGB value replacement function in such a manner that the RGB values are associated with the distance values of the pixels whose RGB values have been replaced;
   a combination image generation function of combining the two frame images into one combination image by applying a stitching algorithm to the two frame images whose RGB values have been replaced by the RGB value replacement function;
   an RGB value detection function of detecting RGB values equal or approximate to the RGB values stored by the pixel information storage function from RGB values of all pixels in the combination image generated by the combination image generation function;
   a distance information providing function of providing the distance values associated with the RGB values stored by the pixel information storage function to pixels having the RGB values detected by the RGB value detection function as distance information of the pixels;

a modified combination image generation function of generating a modified combination image whose RGB values have been modified, by changing the RGB values of the pixels to which the distance information has been provided by the distance information providing function, to averages of RGB values of pixels near the pixels; and a distance-provided combination image generation function of generating one combination image whose all pixels are provided with the distance information, on the basis of N number of modified combination images generated by the modified combination image generation function, wherein when the controller extracts distance values of pixels for the second time and later by performing the pixel distance value extraction function, the controller randomly selects 1/N of all the pixels from yet-to-be-selected pixels in the two frame images and extracts distance values of the selected pixels, the controller generates the N number of modified combination images by repeatedly sequentially performing the code RGB value assignment function, the RGB value replacement function, the pixel information storage function, the combination image generation function, the RGB value detection function, the distance information providing function, and the modified combination image generation function N times on the basis of the distance values selected by the pixel distance value extraction function for the second time and later, and in performing the distance-provided combination image generation function, the controller generates one combination image whose all pixels are provided with the distance information, by stacking all the N number of modified combination images where the distance information has been provided to 1/N of all the pixels and reading the distance information from the stacked modified combination images to obtain the distance information of all the pixels in the modified combination image and then providing the obtained distance information to the one combination image.

5. The computer-readable, non-transitory storage medium storing the image distance calculation program according to claim 1, the program causing the controller to perform a precise distance calculation function of obtaining pixels in a direction of the x-axis in each of the corresponding regions of the frame image corresponding to pixels in each of the segmented regions of the slice image, as $x(1), x(2), \ldots, x(i), \ldots, x(G-1)$, and $x(G)$ where $1 \le i \le G$, by obtaining correspondences between pixels from a start-point pixel to an end-point pixel in a direction of the t-axis in each of the segmented regions of the slice image and pixels from a start-point pixel to an end-point pixel in the direction of the x-axis in each of the corresponding regions of the frame image corresponding to the each of the segmented regions of the slice image using a start-end point-fixed matching process and back-trace process based on dynamic programming and calculating a precise distance $z(i)$ from the object to the camera, of the pixel $x(i)$ in the frame image by the following formula:

$$z(i) = zg + \beta(x(i) - x(i-1) - xa/G)$$

where xa represents an average of the numbers of the pixels from the start-point pixel to the end-point pixel in the direction of the x-axis in each of the corresponding regions of the frame image; $x(i)-x(i-1)$ represents the distance between the pixel $x(i)$ in each of the corresponding regions of the frame image and a pixel $x(i-1)$ adjacent to the pixel $x(i)$, the pixel $x(i-1)$ being obtained by the back-trace process; zg represents the global distance of each of the corresponding regions calculated by the global distance calculation function; and $\beta$ represents an positive constant.

6. The computer-readable, non-transitory storage medium storing the image distance calculation program according to claim 5, the program causing the controller to perform:

a code detection function of extracting RGB values of all pixels in two frame images captured by the camera at different times, the two frame images including a common image portion, the two frame images being images where the distance from the object to the camera, of each pixel has been calculated by the precise distance calculation function, and detecting RGB values that are not the extracted RGB values, as RGB values of codes;

a pixel distance value extraction function of randomly selecting 1/N of all pixels in the two frame images, N being an integer, and extracting the distance values of the selected pixels;

a code RGB value assignment function of assigning the RGB values of the codes yet-to-be-assigned to the distance values extracted by the pixel distance value extraction function;

an RGB value replacement function of replacing RGB values of pixels in the two frame images having distance values identical to the distance values to which the RGB values of the codes have been assigned by the code RGB value assignment function, with the RGB values of the codes assigned to the distance values;

a pixel information storage function of storing the RGB values as replacements provided by the RGB value replacement function in such a manner that the RGB values are associated with the distance values of the pixels whose RGB values have been replaced;

a combination image generation function of combining the two frame images into one combination image by applying a stitching algorithm to the two frame images whose RGB values have been replaced by the RGB value replacement function;

an RGB value detection function of detecting RGB values equal or approximate to the RGB values stored by the pixel information storage function from RGB values of all pixels in the combination image generated by the combination image generation function;

a distance information providing function of providing the distance values associated with the RGB values stored by the pixel information storage function to pixels having the RGB values detected by the RGB value detection function as distance information of the pixels;

a modified combination image generation function of generating a modified combination image whose RGB values have been modified, by changing the RGB values of the pixels to which the distance information has been provided by the distance information providing function, to averages of RGB values of pixels near the pixels; and a distance-provided combination image generation function of generating one combination image whose all pixels are provided with the distance information, on the basis of N number of modified combination images generated by the modified combination image generation function, wherein when the controller extracts distance values of pixels for the second time and later by performing the pixel distance value extraction function, the controller randomly selects 1/N of all the pixels from yet-to-be-selected pixels in the two frame images and extracts distance values of the selected pixels, the controller generates the N number of modified combination images by repeatedly sequentially performing the code RGB value assignment function, the RGB value replacement function, the pixel information storage function, the combination image generation function, the RGB value detection function, the distance information providing function, and the modified combination image generation function N times on the basis of the distance values selected by the pixel distance value extraction function for the second time and later, and in performing the distance-provided combination image generation function, the controller generates one combination image whose all pixels are provided with the distance information, by stacking all the N number of modified combination images where the distance information has been provided to 1/N of all the pixels and reading the distance information from the stacked modified combination images to obtain the distance information of all the pixels in the modified combination image and then providing the obtained distance information to the one combination image.

7. A computer-readable, non-transitory storage medium storing an image distance calculation program of an image distance calculator that calculates a distance from a camera which is moved, to an object on the basis of moving images of the object captured by the camera, the program causing a controller of the image distance calculator to perform:

a frame image extraction function of extracting a frame image at any time from the moving images;

a slice image generation function of, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generating a slice image having the y-axis as a longitudinal axis and a t-axis as a transverse axis, t being $1 \leq t \leq T$;

a spotting point calculation function of, if a pixel in the slice image at a time t is represented by $g(t, y)$, t being $1 \leq t \leq T$, and a pixel in an xyt space at a time t0 at a point y' on the y-axis of the frame image is represented by $f(x, y', t0) = r(x)$, y' being $1 \leq y' \leq Y$, calculating coordinates of a pixel in the frame image corresponding to a pixel at a time T in the slice image as a spotting point by obtaining the pixel point $r(x)$ in the frame image that is present at any point in a section $[1, X]$ of x and corresponds to the pixel $g(t, y)$ in the slice image, using a matching process based on dynamic programming;

a pixel matching function of obtaining pixels in the frame image corresponding to pixels at $t=1$ to $t=T$ on the t-axis of the slice image by performing a back-trace process from the spotting point calculated by the spotting point calculation function from the time $t=T$ until the time $t=1$; and a global distance calculation function of calculating a global distance zg which is the distance from the object to the camera, of a pixel $x(t)$ by the following formula, the pixel $x(t)$ being a pixel in a direction of the x-axis in the frame image at a time t obtained by the pixel matching function:

$$zg = a \cdot \exp(-b \cdot \alpha(t, t0))$$

where $x(t0)$ represents a pixel in the direction of the x-axis in the frame image at a time t0; $\alpha(t, t0)$ represents the distance between the pixel $x(t0)$ and the pixel $x(t)$ in the frame image obtained by subtracting the pixel $x(t0)$ from the pixel $x(t)$ and is regarded as accumulated motion parallax; the accumulated motion parallax $\alpha(t, t0)$ is set to a range of $\mu_1 \leq \alpha(t, t0) \leq \gamma_1$ where $\mu_1$ and $\gamma_1$ are constants; the global distance zg is set to a range of $z_{N1} \leq zg \leq z_{L1}$ where $z_{N1}$ and $z_{L1}$ are constants;

the coefficient a is calculated by $a = z_{L1} \cdot \exp((\mu_1/(\gamma_1 - \mu_1)) \log(z_{L1}/z_{N1}))$; and the coefficient b is calculated by $b = (1/(\gamma_1 - \mu_1))\log(z_{L1}/z_{N1})$.

8. The computer-readable, non-transitory storage medium storing the image distance calculation program according to claim 7, the program causing the controller to perform:

a code detection function of extracting RGB values of all pixels in two frame images captured by the camera at different times, the two frame images including a common image portion, and detecting RGB values that are not the extracted RGB values, as RGB values of codes;

a pixel distance value extraction function of extracting distance values of pixels whose global distances have been calculated by the global distance calculation function, from the pixels in the two frame images;

a code RGB value assignment function of assigning the RGB values of the codes yet-to-be-assigned to the distance values extracted by the pixel distance value extraction function;

an RGB value replacement function of replacing RGB values of pixels in the two frame images having distance values identical to the distance values to which the RGB values of the codes have been assigned by the code RGB value assignment function, with the RGB values of the codes assigned to the distance values;

a pixel information storage function of storing the RGB values as replacements provided by the RGB value replacement function in such a manner that the RGB values are associated with the distance values of the pixels whose RGB values have been replaced;

a combination image generation function of combining the two frame images into one combination image by applying a stitching algorithm to the two frame images the RGB values of whose pixels have been replaced by the RGB value replacement function;

an RGB value detection function of detecting RGB values equal or approximate to the RGB values stored by the pixel information storage function from RGB values of all pixels in the combination image generated by the combination image generation function;

a distance information providing function of providing the distance values associated with the RGB values stored by the pixel information storage function to pixels having the RGB values detected by the RGB value detection function as distance information of the pixels; and an RGB value change function of changing the RGB values of the pixels to which the distance information has been provided by the distance information providing function, to averages of RGB values of pixels near the pixels.

9. A computer-readable, non-transitory storage medium storing an image distance calculation program of an image distance calculator that calculates a distance from a camera which is moved, to an object on the basis of moving images of the object captured by the camera, the program causing a controller of the image distance calculator to perform:
- a frame image extraction function of extracting a frame image at any time from the moving images;
- a slice image generation function of, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generating a slice image having the y-axis as a longitudinal axis and a t-axis as a transverse axis, t being $1 \le t \le T$;
- a spotting point calculation function of, if a pixel in the slice image at a time t is represented by g(t, y), t being $1 \le t \le T$, and a pixel in an xyt space at a time t0 at a point y' on the y-axis of the frame image is represented by f(x, y', t0)=r(x), y' being $1 \le y' \le Y$, calculating coordinates of a pixel in the frame image corresponding to a pixel at a time T in the slice image as a spotting point by obtaining the pixel point r(x) in the frame image that is present at any point in a section [1, X] of x and corresponds to the pixel g(t, y) in the slice image, using a matching process based on dynamic programming;
- a pixel matching function of obtaining pixels in the frame image corresponding to pixels at t=1 to t=T on the t-axis of the slice image as x(1), x(2), x(3), . . . , x(i), . . . and x(T) where $1 \le i \le T$ by performing a back-trace process from the spotting point calculated by the spotting point calculation function from the time t=T until the time t=1; and
- a precise distance calculation function of calculating a distance z(i, x) that is a precise distance from the object to the camera, of a pixel x(i) by the following formula, the pixel x(i) in the frame image being obtained by the pixel matching function:

$$z(i,x)=a \cdot \exp(-b \cdot Med(i) \cdot K)$$

where the Med(i) represents a median of distance differences between K number of pixels continuing from the pixel x(i) and adjacent pixels, K being K<T, as x(i+1)−x(i), x(i+2)−x(i+1), x(i+3)−x(i+2), . . . , x(i+K−1)−x(i+K−2), and x(i+K)−x(i+K−1) where a distance difference between the pixel x(i) and an adjacent pixel x(i−1) is x(i)−x(i−1); the Med(i)·K represents accumulated motion parallax in the pixel x(i) and is set to a range of $\mu_2 \le Med(i) \cdot K \le \gamma_2$ where $\mu_2$ and $\gamma_2$ are constants; the distance z(i, x) of the pixel x(i) is set to a range of $z_{N2} \le z(i, x) \le z_{L2}$ where $z_{N2}$ and $z_{L2}$ are constants; the coefficient a is calculated by $a=z_{L2} \cdot \exp((\mu_2/(\gamma_2-\mu_2)) \log(z_{L2}/z_{N2})$; and the coefficient b is calculated by $b=(1/(\gamma_2-\mu_2))\log(z_{L2}/z_{N2})$.

10. The computer-readable, non-transitory storage medium storing the image distance calculation program according to claim 9, wherein in performing the precise distance calculation function, the controller interpolates distances of pixels other than the pixel x(i) in the frame image using a distance value of the obtained distance z(i, x) of the pixel x(i), i being $1 \le i \le T$.

11. The computer-readable, non-transitory storage medium storing the image distance calculation program according to claim 10, the program causing the controller to perform:
- a code detection function of extracting RGB values of all pixels in two frame images captured by the camera at different times, the two frame images including a common image portion, the two frame images being images where the distance from the object to the camera, of each pixel has been calculated by the precise distance calculation function, and detecting RGB values that are not the extracted RGB values, as RGB values of codes;
- a pixel distance value extraction function of randomly selecting 1/N of all pixels in the two frame images, N being an integer, and extracting the distance values of the selected pixels;
- a code RGB value assignment function of assigning the RGB values of the codes yet-to-be-assigned to the distance values extracted by the pixel distance value extraction function;
- an RGB value replacement function of replacing RGB values of pixels in the two frame images having distance values identical to the distance values to which the RGB values of the codes have been assigned by the code RGB value assignment function, with the RGB values of the codes assigned to the distance values;
- a pixel information storage function of storing the RGB values as replacements provided by the RGB value replacement function in such a manner that the RGB values are associated with the distance values of the pixels whose RGB values have been replaced;
- a combination image generation function of combining the two frame images into one combination image by applying a stitching algorithm to the two frame images whose RGB values have been replaced by the RGB value replacement function;
- an RGB value detection function of detecting RGB values equal or approximate to the RGB values stored by the pixel information storage function from RGB values of all pixels in the combination image generated by the combination image generation function;
- a distance information providing function of providing the distance values associated with the RGB values stored by the pixel information storage function to pixels having the RGB values detected by the RGB value detection function as distance information of the pixels;
- a modified combination image generation function of generating a modified combination image whose RGB values have been modified, by changing the RGB values of the pixels to which the distance information has been provided by the distance information providing function, to averages of RGB values of pixels near the pixels; and
- a distance-provided combination image generation function of generating one combination image whose all pixels are provided with the distance information, on the basis of N number of modified combination images generated by the modified combination image generation function, wherein when the controller extracts distance values of pixels for the second time and later by performing the pixel distance value extraction function, the controller randomly selects 1/N of all the pixels from yet-to-be-selected pixels in the two frame images and extracts distance values of the selected pixels, the controller generates the N number of modified combination images by repeatedly sequentially performing the code RGB value assignment function, the RGB value replacement function, the pixel information storage function, the combination image generation function, the RGB value detection function, the distance information providing function, and the modified combination image generation function N times on the basis of the distance values selected by the pixel distance value extraction function for the second time and later, and in performing the distance-provided combination image generation function, the controller generates one combination image whose all pixels are provided with the distance information, by stacking all the N number of modified combination images where the distance information has been provided to 1/N of all the pixels and reading the distance information from the stacked modified combination images to obtain the distance information of all the pixels in the modified combination image and then providing the obtained distance information to the one combination image.

12. An image distance calculator comprising:

a frame image extraction extractor configured to extract a frame image at any time from moving images of an object captured by a camera which is moved;

a slice image generator configured to, by extracting a temporal change in a pixel line on a y-axis at a point x0 on an x-axis of the frame image from a time t0+1 until a time t0+T, the x-axis being an axis extending in a moving direction of the camera in the frame image, the y-axis being an axis perpendicular to the x-axis, generate a slice image having the y-axis as a longitudinal axis and a t-axis as a transverse axis, t being $1 \leq t \leq T$;

a spotting point calculator configured to, if a pixel in the slice image at a time t is represented by g(t, y), t being $1 \leq t \leq T$, and a pixel in an xyt space at a time t0 at a point y' on the y-axis of the frame image is represented by f(x, y', t0)=r(x), y' being $1 \leq y' \leq Y$, calculate coordinates of a pixel in the frame image corresponding to a pixel at a time T in the slice image as a spotting point by obtaining the pixel point r(x) in the frame image that is present at any point in a section [1, X] of x and corresponds to the pixel g(t, y) in the slice image, using a matching process based on dynamic programming;

a pixel matching unit configured to obtain pixels in the frame image corresponding to pixels at t=1 to t=T on the t-axis of the slice image by performing a back-trace process from the spotting point calculated by the spotting point calculator from the time t=T until the time t=1;

a region segmentation unit configured to segment the frame image and the slice image into regions on the basis of a common segmentation criterion by applying a mean-shift method to the frame image and the slice image;

a corresponding region determination unit configured to detect the pixels in the frame image corresponding to the pixels in the slice image obtained by the pixel matching unit on the basis of pixels present in each of the segmented regions of the slice image obtained by the region segmentation unit and to determine, as a corresponding region, each of the segmented regions of the frame image corresponding to each of the segmented regions of the slice image by obtaining a segmented region including the largest number of detected pixels in the frame image; and a global distance calculator configured to detect an average q of the numbers of pixels in a direction of the x-axis in each of the corresponding regions of the frame image determined by the corresponding region determination unit, to detect an average p of the numbers of pixels in a direction of the t-axis in each of the corresponding segmented regions of the slice image, to calculate a ratio value of each corresponding region, the ratio value being obtained on the basis of a ratio of q to p or a ratio of p to q, and to calculate a distance from the camera to the object captured in the frame image corresponding to the calculated ratio value of each of the corresponding regions as a global distance by using a distance function where a correspondence between the distance and the ratio value is defined in advance.

13. The image distance calculator according to claim 12 comprising:

a code detector configured to extract RGB values of all pixels in two frame images captured by the camera at different times, the two frame images including a common image portion, and to detect RGB values that are not the extracted RGB values, as RGB values of codes;

a pixel distance value extractor configured to extract distance values of pixels whose global distances have been calculated by the global distance calculator, from the pixels in the two frame images;

a code RGB value assignor configured to assign the RGB values of the codes yet-to-be-assigned to the distance values extracted by the pixel distance value extractor;

an RGB value replacement unit configured to replace RGB values of pixels in the two frame images having distance values identical to the distance values to which the RGB values of the codes have been assigned by the code RGB value assignor, with the RGB values of the codes assigned to the distance values;

a pixel information storage configured to store the RGB values as replacements provided by the RGB value replacement unit in such a manner that the RGB values are associated with the distance values of the pixels whose RGB values have been replaced;

a combination image generator configured to combine the two frame images into one combination image by applying a stitching algorithm to the two frame images the RGB values of whose pixels have been replaced by the RGB value replacement unit;

an RGB value detector configured to detect RGB values equal or approximate to the RGB values stored by the pixel information storage from RGB values of all pixels in the combination image generated by the combination image generator;

a distance information provider configured to provide the distance values associated with the RGB values stored in the pixel information storage, to pixels having the RGB values detected by the RGB value detector as distance information of the pixels; and an RGB value changer configured to change the RGB values of the pixels to which the distance information has been provided by the distance information provider, to averages of RGB values of pixels near the pixels.

14. The image distance calculator according to claim 12 comprising:

a local distance calculator configured to obtain pixels in each of the corresponding regions of the frame image corresponding to pixels in each of the segmented regions of the slice image by obtaining correspondences between pixels from a start-point pixel to an end-point pixel in a direction of the t-axis in each of the segmented regions of the slice image and pixels from a start-point pixel to an end-point pixel in a direction of the x-axis in each of the corresponding regions of the frame image corresponding to the each of the segmented regions of the slice image using a start-end point-fixed matching process and back-trace process based on dynamic programming and to calculate a relative distance of each pixel in each of the corresponding regions as a local distance on the basis of distances between the obtained pixels in the direction of the x-axis in each of the corresponding regions of the frame image; and a precise distance calculator configured to calculate a precise distance from the camera to the object for each pixel in the frame image by providing the global distance of each of the corresponding regions in the frame image calculated by the global distance calculator to the local distance of each pixel in the frame image calculated by the local distance calculator.

15. The image distance calculator according to claim 14 comprising:

a code detector configured to extract RGB values of all pixels in two frame images captured by the camera at different times, the two frame images including a common image portion, the two frame images being images where the distance from the object to the camera, of each pixel has been calculated by the precise distance calculator, and to detect RGB values that are not the extracted RGB values, as RGB values of codes;

a pixel distance value extractor configured to randomly select 1/N of all pixels in the two frame images, N being an integer, and to extract the distance values of the selected pixels;

a code RGB value assignor configured to assign the RGB values of the codes yet-to-be-assigned to the distance values extracted by the pixel distance value extractor;

an RGB value replacement unit configured to replace RGB values of pixels in the two frame images having distance values identical to the distance values to which the RGB values of the codes have been assigned by the code RGB value assignor, with the RGB values of the codes assigned to the distance values;

a pixel information storage configured to store the RGB values as replacements provided by the RGB value replacement unit in such a manner that the RGB values are associated with the distance values of the pixels whose RGB values have been replaced;

a combination image generator configured to combine the two frame images into one combination image by applying a stitching algorithm to the two frame images whose RGB values have been replaced by the RGB value replacement unit;

an RGB value detector configured to detect RGB values equal or approximate to the RGB values stored in the pixel information storage from RGB values of all pixels in the combination image generated by the combination image generator;

a distance information provider configured to provide the distance values associated with the RGB values stored in the pixel information storage, to pixels having the RGB values detected by the RGB value detector as distance information of the pixels;

a modified combination image generator configured to generate a modified combination image whose RGB values have been modified, by changing the RGB values of the pixels to which the distance information has been provided by the distance information provider, to averages of RGB values of pixels near the pixels; and a distance-provided combination image generator configured to generate one combination image whose all pixels are provided with the distance information, on the basis of N number of modified combination images generated by the modified combination image generator, wherein when the pixel distance value extractor extracts distance values of pixels for the second time and later, the pixel distance value extractor randomly selects 1/N of all the pixels from yet-to-be-selected pixels in the two frame images and extracts distance values of the selected pixels, the code RGB value assignor, the RGB value replacement unit, the pixel information storage, the combination image generator, the RGB value detector, the distance information provider, and the modified combination image generator generate the N number of modified combination images by repeatedly sequentially performing respective processes N times on the basis of the distance values selected by the pixel distance value extractor for the second time and later, and the distance-provided combination image generator generates one combination image whose all pixels are provided with the distance information, by stacking all the N number of modified combination images where the distance information has been provided to 1/N of all the pixels and reading the distance information from the stacked modified combination images to obtain the distance information of all the pixels in the modified combination image and then provides the obtained distance information to the one combination image.

16. The image distance calculator according to claim 12 comprising a precise distance calculator configured to obtain pixels in a direction of the x-axis in each of the corresponding regions of the frame image corresponding to pixels in each of the segmented regions of the slice image, as $x(1)$, $x(2), \ldots, x(i), \ldots, x(G-1)$, and $x(G)$, i being $1 \leq i \leq G$, by obtaining correspondences between pixels from a start-point pixel to an end-point pixel in a direction of the t-axis in each of the segmented regions of the slice image and pixels from a start-point pixel to an end-point pixel in the direction of the x-axis in each of the corresponding regions of the frame image corresponding to the each of the segmented regions of the slice image using a start-end point-fixed matching process and back-trace process based on dynamic programming and to calculate a precise distance $z(i)$ from the object to the camera, of the pixel $x(i)$ in the frame image by the following formula:

$$z(i)=zg+\beta(x(i)-x(i-1)-xa/G)$$

where xa represents an average of the numbers of the pixels from the start-point pixel to the end-point pixel in the direction of the x-axis in each of the corresponding regions of the frame image; $x(i)-x(i-1)$ represents the distance between the pixel $x(i)$ in each of the corresponding regions of the frame image and a pixel $x(i-1)$ adjacent to the pixel $x(i)$, the pixel $x(i-1)$ being obtained by the back-trace process; zg represents the global distance of each of the corresponding regions calculated by the global distance calculator; and $\beta$ represents an positive constant.

17. The image distance calculator according to claim 16 comprising:

a code detector configured to extract RGB values of all pixels in two frame images captured by the camera at different times, the two frame images including a common image portion, the two frame images being images where the distance from the object to the camera, of each pixel has been calculated by the precise distance calculator, and to detect RGB values that are not the extracted RGB values, as RGB values of codes;

a pixel distance value extractor configured to randomly select 1/N of all pixels in the two frame images, N being an integer, and to extract the distance values of the selected pixels;

a code RGB value assignor configured to assign the RGB values of the codes yet-to-be-assigned to the distance values extracted by the pixel distance value extractor;

an RGB value replacement unit configured to replace RGB values of pixels in the two frame images having distance values identical to the distance values to which the RGB values of the codes have been assigned by the code RGB value assignor, with the RGB values of the codes assigned to the distance values;

a pixel information storage configured to store the RGB values as replacements provided by the RGB value replacement unit in such a manner that the RGB values are associated with the distance values of the pixels whose RGB values have been replaced;

a combination image generator configured to combine the two frame images into one combination image by applying a stitching algorithm to the two frame images whose RGB values have been replaced by the RGB value replacement unit;

an RGB value detector configured to detect RGB values equal or approximate to the RGB values stored in the pixel information storage from RGB values of all pixels in the combination image generated by the combination image generator;

a distance information provider configured to provide the distance values associated with the RGB values stored in the pixel information storage, to pixels having the RGB values detected by the RGB value detector as distance information of the pixels;

a modified combination image generator configured to generate a modified combination image whose RGB values have been modified, by changing the RGB values of the pixels to which the distance information has been provided by the distance information provider, to averages of RGB values of pixels near the pixels; and a distance-provided combination image generator configured to generate one combination image whose all pixels are provided with the distance information, on the basis of N number of modified combination images generated by the modified combination image generator, wherein when the pixel distance value extractor extracts distance values of pixels for the second time and later, the pixel distance value extractor randomly selects 1/N of all the pixels from yet-to-be-selected pixels in the two frame images and extracts distance values of the selected pixels, the code RGB value assignor, the RGB value replacement unit, the pixel information storage, the combination image generator, the RGB value detector, the distance information provider, and the modified combination image generator generate the N number of modified combination images by repeatedly sequentially performing respective processes N times on the basis of the distance values selected by the pixel distance value extractor for the second time and later, and the distance-provided combination image generator generates one combination image whose all pixels are provided with the distance information, by stacking all the N number of modified combination images where the distance information has been provided to 1/N of all the pixels and reading the distance information from the stacked modified combination images to obtain the distance information of all the pixels in the modified combination image and then provides the obtained distance information to the one combination image.

* * * * *